United States Patent [19]

Martin et al.

[11] 3,920,967

[45] Nov. 18, 1975

[54] COMPUTERIZED TRAFFIC CONTROL APPARATUS

[75] Inventors: Daniel T. Martin, Houston; Morton A. Serrell, Seabrook; Herbert C. Coleman, Houston; Donald L. Cooper, Houston; Robert M. Knox, Seabrook; Curtis L. Barnfield, Houston, all of Tex.; Robert J. Walinchus, Baltimore, Md.

[73] Assignee: TRW Inc., Redondo Beach, Calif.

[22] Filed: Feb. 22, 1974

[21] Appl. No.: 444,933

Related U.S. Application Data

[63] Continuation of Ser. No. 147,522, May 27, 1971, abandoned.

[52] U.S. Cl. ............... 235/150.24; 340/35; 340/36; 340/37; 340/38; 340/40; 340/172.5

[51] Int. Cl.² ........................................ G06F 15/48

[58] Field of Search ........... 235/150.24; 340/35, 40, 340/36–38; 444/1; 445/1

[56] References Cited

UNITED STATES PATENTS

| | | | |
|---|---|---|---|
| 3,533,086 | 10/1970 | Goetz | 444/1 |
| 3,828,307 | 8/1974 | Hungerford | 340/35 |

OTHER PUBLICATIONS

Tonik, A. B., *Development of Executive Routines*, in AFIPS Conf. Proc., (1967 FJCC), Vol. 31, pp. 401–402, Nov. 14–16, 1967.

Gazis; D. C. et al., Def. Pub. Search Copy of Serial No. 379,673, filed 9–14–1971, Def. Pub. No. T920,013.

*Primary Examiner*—R. Stephen Dildine, Jr.
*Attorney, Agent, or Firm*—Daniel T. Anderson; Stephen J. Koundakjian; Jerry A. Dinardo

[57] ABSTRACT

Disclosed is a computerized apparatus for controlling the flow of vehicular traffic through a network of intersections. Detectors in proximity to selected intersections generate electrical signals representative of the commencement and termination of vehicle presence. One or more field preprocessors receive these signals and responsively generate secondary signals representative of vehicle count and speed. These secondary signals are transmitted to a computer which analyzes them and responsively generates control signals which are transmitted to and govern the sequential operation of traffic signal heads at the controlled intersections.

21 Claims, 91 Drawing Figures

INVENTOR.
HERBERT C. COLEMAN
BY

INVENTOR.
HERBERT C. COLEMAN
BY

SYSTEM START UP ROUTINE

INVENTOR.
HERBERT C. COLEMAN
BY

INVENTOR.
HERBERT C. COLEMAN
BY

INVENTOR.
HERBERT C. COLEMAN
BY

*INVENTOR.*
HERBERT C. COLEMAN
BY

INVENTOR.
HERBERT C. COLEMAN
BY

CAL 4 PROCESSOR

INVENTOR.
HERBERT C. COLEMAN
BY

INTERRUPT SECTION

*INVENTOR.*
HERBERT C. COLEMAN
*BY*

*INVENTOR.*
HERBERT C. COLEMAN
BY

INVENTOR.
HERBERT C. COLEMAN
BY [signatures]

INVENTOR.
HERBERT C. COLEMAN
BY [signature]

LINE PRINTER BUFFER ROUTINE (CONTINUED)

INVENTOR.
HERBERT C. COLEMAN
BY [signatures]

INVENTOR.
HERBERT C. COLEMAN
BY

INVENTOR.
HERBERT C. COLEMAN
BY

RAD HANDLER
(CONTINUED)

INVENTOR.
HERBERT C. COLEMAN
BY

INVENTOR.
HERBERT C. COLEMAN
BY

RAD HANDLER
(CONTINUED)

INVENTOR.
HERBERT C. COLEMAN
BY

RAD HANDLER (CONTINUED)

RAD HANDLER
INTERRUPT ROUTINE

INVENTOR.
HERBERT C. COLEMAN
BY

INVENTOR.
HERBERT C. COLEMAN
BY

EDIT ROUTINE

INVENTOR.
HERBERT C. COLEMAN
BY

BLOCK DATA MOVE

INVENTOR.
HERBERT C. COLEMAN
BY Harry S. Jacobs
Jerry G. Wiviardo

INVENTOR.
HERBERT C. COLEMAN
BY

BLOCK DATA

INVENTOR.
HERBERT C. COLEMAN
BY

INVENTOR.
HERBERT C. COLEMAN
BY

DATA CONVERSION ROUTINE (CONTINUED)

KEY-IN PROCESSOR
(DUMP MONITOR)

*INVENTOR.*
HERBERT C. COLEMAN
BY

*INVENTOR.*
HERBERT C. COLEMAN
BY

INVENTOR.
HERBERT C. COLEMAN
BY Harry S. Jacobs
Jerry G. Dimardo

INVENTOR.
HERBERT C. COLEMAN
BY Harry E. Jacobs
Jerry A. Dinardo

*INVENTOR.*
HERBERT C. COLEMAN
BY

INVENTOR.
HERBERT C. COLEMAN
BY Harry S. Jacob
Jerry A. Dinardo

INVENTOR.
HERBERT C. COLEMAN
BY $N_S$ = NORTH APPROACH, STRAIGHT THROUGH LIGHT
$S_L$ = SOUTH APPROACH, LEFT TURN LIGHT

MAJOR INTERSECTION SPLIT ADJUSTMENT PROCESSOR

COMPUTERIZED TRAFFIC CONTROL APPARATUS

CROSS REFERENCE TO RELATED APPLICATIONS

This is a continuation of application Ser. No. 147,522, filed May 27, 1971 and abandoned at even date with the filing hereof. This application is related to application Ser. No. 147,340, filed May 27, 1971 (now abandoned) and to the following:

Application Ser. No. 147,461, filed May 27, 1971 (abandoned at even date with the filing of the continuation thereof, application Ser. No. 445,724);

Application Ser. No. 147,576, filed May 27, 1971 (abandoned at even date with the filing of the continuation thereof, application Ser. No. 445,723); and Application Ser. No. 147,446, filed May 27, 1971 (abandoned at even date with the filing of the continuation thereof, application Ser. No. 445,722).

Each of the aforementioned applications is assigned to the same assignee as is the above-captioned application.

BACKGROUND OF THE INVENTION

1. Field of the Invention

This invention relates to vehicular traffic control systems and more particularly to an apparatus dynamically controlling traffic in real time.

2. Description of the Prior Art

Cities around the world are being choked by vehicular traffic. Conventional traffic control signal systems are not maintaining satisfactory movement. A major contributor to the problem is the "open-loop" nature of conventional control systems; that is, there is no "feedback" of information on the conditions in the street to the decision making process. Open loop control systems are inherently satisfactory only when the process to be controlled is well defined and predictable. Now consider the problems involved in controlling vehicular traffic. Control is applied indirectly; that is, through visual signals. Reaction to control is unpredictable -- drivers differ in judgment, skill and reaction times. The flow to be controlled is not orderly -- drivers follow seemingly random routes, lose their tempers, and allow their attention to wander from the task at hand. In view of these facts, the lack of success of conventional, open-loop traffic control systems is not surprising.

The factors just discussed clearly demonstrate the need for a "closed-loop" traffic control system in which information concerning conditions in the street is continuously "fed back" to the decision making or control process. In this type of system vehicle sensors continually measure the characteristics of the vehicular traffic. This information is transmitted via a communications system to a central control facility. At the central facility the information is used to evaluate the performance of the system. Based on the results of this performance evaluation, a control strategy is developed and appropriate commands generated. The commands are transmitted to the signal lights via the communication system, and the measure-evaluate-control cycle is repeated.

The development of high speed, relatively inexpensive digital computers, and of efficient communication techniques and equipment make traffic responsive control systems feasible. Shortcomings in software and in surveillance philosophy have prohibited early computerized systems from fully utilizing the capabilities of the digital computer. However, these shortcomings are merely implementation characteristics, and not inherent difficulties in the computerized control concept. The traffic control system described herein is a second-generation computerized system designed to eliminate the majority of the shortcomings of earlier computerized systems and to provide truly traffic responsive control.

SUMMARY OF THE INVENTION

According to the present invention, at least one automated detector means is provided in proximity to each of selected ones of the intersections in a controlled network. Each of the detector means is adapted to generate, in response to the proximate presence of a vehicle, an electrical signal pulse, the commencement of which indicates the commencement of the vehicle presence and the termination of which indicates the termination of the vehicle presence.

At least one signal head is provided in proximity to each of the intersections. This signal head is adapted to successively display traffic flow directing lights, and its operation is governed by controller means.

Means are provided for electrical communication between the detector means and a computer and between the computer and the controller means. The communication means includes signal processor means adapted to receive the signal pulses from a plurality of the detector means and to generate, in response to these signal pulses, an encoded binary electrical signal representing both the total number of signal pulses received by said processor means during a specified time span, and the duration of each signal pulse. The total number of signal pulses indicates vehicle count, and each of the signal pulse durations is indicative of the speed of a vehicle in proximity to one of the detectors.

The computer receives the signals from the processor means and, in response thereto, generates operational signals which are transmitted to the controller means through the electrical communication means.

In the preferred embodiment of the present invention, the computer is configured to incorporate:

foreground computation means adapted to receive the encoded binary electrical signals from the processor means and, based thereupon, to generate the necessary operational electrical signals for the controllers;

background computation means in mutual electrical data signal communication with the foreground computation means, the background computation means being adapted, in response to data from the foreground computation means, to generate a plurality of electrical data signals together representing an optimized pattern of commands for those of the controllers which control the operation of those the signal heads in proximity with the selected ones of the intersections, and executive operational means adapted to schedule the operation and the mutual interaction of the foreground computation means and background computation means.

In this embodiment, the executive operational means operates in accordance with an executive routine; the foreground computation means operates in accordance with a surveillance routine, a PACKEM subprogram, and a COMMAND subprogram and DISC subroutine; and the background computational means operates in accordance with an ONPOP program.

The basic function of the executive routine is to automatically schedule and execute all foreground and background routines. The routines are organized in accordance with the frequency that they are required to be executed.

An execution cycle is the sum of the time allotted to each foreground task. Those routines that are not time critical are designated as background tasks. A background is partially executed during that portion of the execution cycle that is not used by a foreground task.

The timing for the foreground tasks is controlled by a clock which causes a program interrupt at the required frequency. When the interrupt occurs, the next foreground task in a schedule table is executed and the schedule table is updated. When the foreground task has completed its function, background execution is resumed at the point at which it was interrupted.

The basic function of the surveillance routine is to perform real-time construction, maintenance and updating of the traffic data base. Actual and predicted vehicle movement information is extracted from the data base for use by adaptive control algorithms and for system performance evaluation.

The surveillance routine comprises three basic subprograms: surveillance, minor intersection optimization and surveillance summary.

The surveillance subprogram applies the concept of micro-simulation of individual vehicle movements to achieve a unique balance between actual data collected from roadbed sensors and predicted data.

The minor intersection optimization subprogram computes the control parameters necessary to maintain the main street and/or preferred direction progressions established at the major intersection and network levels. The program also computes a pressure function based on the service demand for both main and side streets, expected time of platoon arrival on main street, and preferred flow direction.

The surveillance subprogram continuously sums input and output counts, number of stops and stopped delay time, and computer queue lengths and link travel times.

The PACKEM routine is entered every traffic terminal unit (TTU) scan cycle. The raw data from the TTU is in a buffer at the time the routine is entered.

A frame of data is loaded from the raw data buffer and checked for transmission errors. If the transmission was good, the data is unpacked. The vehicular speed is checked to see if it is within prescribed limits.

When all the frames are in, the program goes through a second loop which calculates new arrivals from three types of counters, namely, two-bit counters from treadles, two-bit shift registers and non-latch and latch status. After each type of new arrival is calculated, the counts are added to a pool count for use by the surveillance routine. The controller status is stored and subroutine COMVER is called in DISC to use the intersection status and then a transfer is made to the start of the PACKEM routine of the preferred embodiment of this invention for another frame of data.

The basic function of subprogram COMMAND is to perform command generation and verification for each intersection. The subprogram sets the intersection controller command bits and verifies controller status bits for correct controller functioning, whether under computer control or not. Both step and actuated controllers are handled by this subprogram. All intersections both major and minor, may be commanded. In addition, all intersections are monitored when not under computer control. The logic used to generate commands performs green shortening/green extension based on the intersection criticality set by subroutine DISC. Illegal controller steps are detected by this logic.

The function of subroutine DISC is to optimize the splits at major intersections on a cycle-by-cycle basis using three separate processors linked together.

The required green time processor determines the green times required per phase or subphase on the latest measurements of input volume and cycle failure.

The major intersection split adjustment processor computes a new split using three saturation criteria tests: no saturation, saturation in two directions and saturation on all four approaches.

The eight-link optimizer implements the splits while maintaining the optimum network progression.

The network transition logic updates the time in the network cycle, calls ONPOP and implements a new control pattern.

The basic function of ONPOP is to compute signal cycle lengths and offsets for each major intersection in the street network. These computations are based on splits, idealized offsets and other traffic data supplied by subprogram DISC.

The ONPOP subroutine may be executed every third cycle, and runs in the background mode in the system, that is, it is frequently interrupted during its execution so that the CPU may execute the foreground tasks. The background task is scheduled by this DISC subprogram.

Several subfunctions are performed by the subroutine to accomplish the basic function. These subfunctions are subroutine input/output, input error detection, subnetwork link and intersection numbering, signal cycle range selection, optimization decision, network optimization, solution evaluation and subnetwork interfacing.

DESCRIPTION OF THE PREFERRED EMBODIMENT

1. Introduction

Figure 1:
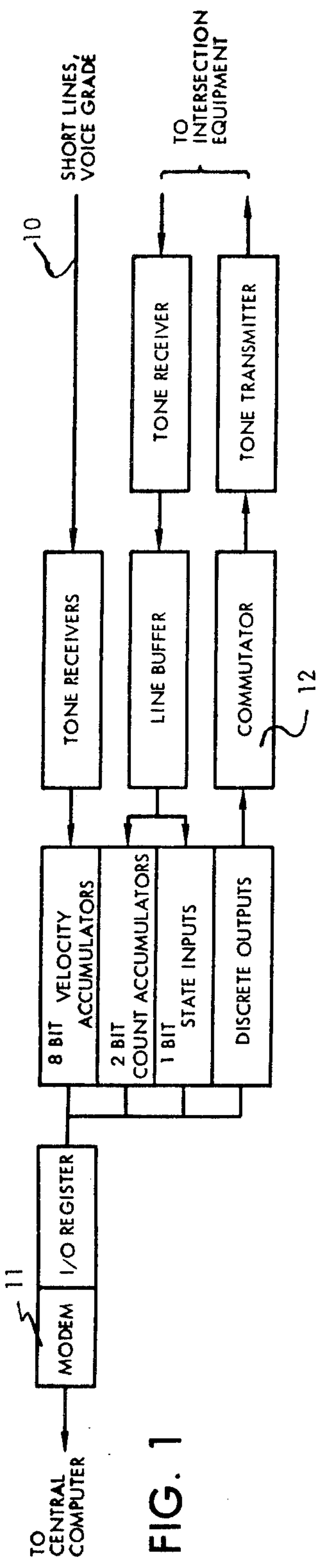
FIG. 1 is a block diagram of a data processor which may be used in coordination with the apparatus of the present invention.
Figure 2:
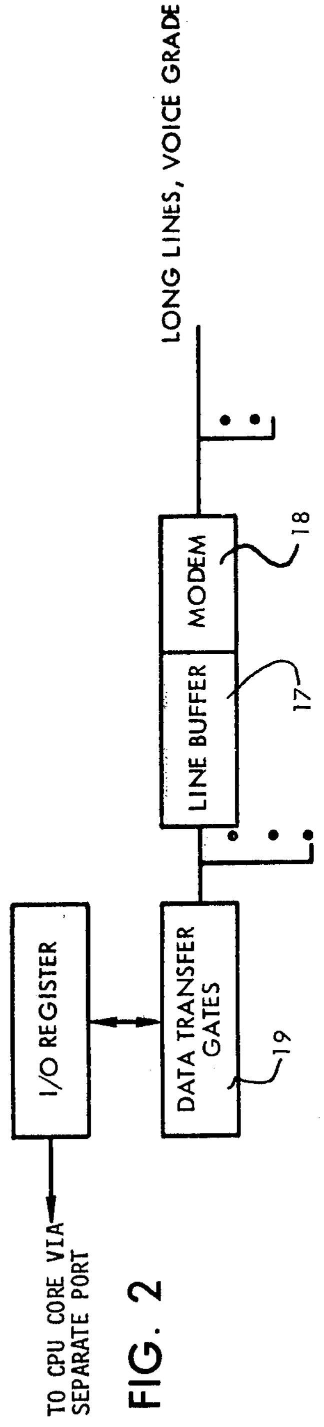
FIG. 2 is a block diagram of the computer-communications interface equipment.

When the first ox-cart rumbled over the toes of a careless pedestrian, the need arose for a traffic control system; a system that would separate conflicting flows of traffic. Initially control was applied to street intersections where conflicting flow existed. The simplest solution was to station a police officer at the intersection to alternately give the right of way to opposing traffic. Later, signal lights with fixed time controllers replaced the police officer. Initially, optimization of the fixed time controller consisted of selecting traffic control time parameters to favor the predominant traffic flow.

As traffic volumes increased and congestion grew worse, preventing conflicting flow was not a sufficient control philosophy. The traffic had to move more efficiently. It was discovered that coordinating several signals along an arterial could improve the flow of traffic significantly. Extensive traffic surveys were required to determine the most efficient means of coordination; but the details of conflict at an intersection were long ignored until actuated signal controllers were developed. These controllers used sensors to measure the traffic demand at an intersection and would set the signals accordingly, thus hopefully improving the flow. With the combining of coordinated arterials and actuated controllers, it became necessary to make quite extensive traffic surveys to determine the optimum signal settings. But, as traffic conditions changed, new surveys were required to fine-tune the system. An improvement to accommodate major daily flow changes was the introduction of sophisticated signal controllers that could implement several signal patterns. Recently, digital computers were added to control these coordinated arterial systems and introduce significant flexibility to control schemes.

The introduction of digital computers into traffic control systems opened up a whole new realm of possibilities. It was recognized that a new and more suitable control philosophy had to be developed to fully utilize the computer's capabilities. There resulted many ideas on how to best move traffic and many definitions of what constituted good traffic control. There was a general consensus that the flow should somehow be optimized. One generally accepted definition of optimum flow is that flow which obtains minimum travel time for all vehicles in the controlled system while achieving maximum flow smoothness. Present actuated controllers, with properly located sensors, can come close to achieving optimum flow at individual intersections. Coordinated actuated controllers being used for arterial control can work quite well when traffic demand is fairly constant and unsaturated. However, the basic signal settings must be determined by extensive study of existing traffic.

2. On-Line Realtime Dynamic Traffic Control

The possibility of obtaining optimal traffic flow in a network is realizable through the use of high speed digital computers. The system now to be described is designed around the basic premise that optimizing flow over an entire urban street network is a desirable control philosophy. The system is made up of three major parts: the instrumentation and communications equipment used to detect traffic, measure speeds and counts, and transmit that intelligence to a central facility; the software used to determine the effectiveness of traffic movement and implement the control algorithms; and the central computer facility that provides the input/output processing, computational power, and data storage facilities to support the surveillance and control software. These three major system components are described generally below.

A. Instrumentation and Communications Equipment

Sensors

Surveillance of vehicles within a controlled area begins with vehicle sensors installed in, on, or over the streets. A vehicle sensor can be used to determine when a vehicle has passed a given point, if a vehicle is present within a specified area, or how fast a vehicle is passing through a detection zone. There are basically five types of sensors in use today. The pressure sensitive sensor has been around the longest and is used by many traffic departments, but is relatively costly to install. Radar and ultrasonic sensors are even more expensive. Magnetic detectors are just coming into use and have not yet proven themselves in field use. The inductive loop sensor has gained widespread acceptance throughout the country for its virtues of simplicity and relatively low cost. As an average of four sensors per intersection are required in a system, sensor cost becomes quite significant.

Typically, sensors are located approximately 300 feet upstream from each intersection, one in each traffic lane, and one in each left turn lane.

Communications Equipment

A sensor can only detect a vehicle. The fact of that detection must be conveyed to the digital computer located at a central facility. A pair of wires from every sensor to the computer is a possible scheme. A reduction in the pairs of wires required, at the expense of additional hardware costs, can be obtained by using a Frequency Multiplexing System. If a data processor of some level of complexity and cost is used in the field, data from a large number of sensors could be sent over the single wire pair.

At this point the system designer must engage in trade-off analyses. As the complexity of the processor goes up, the hardware costs go up and hopefully the wireline costs go down. The designer then strives to reach the point of minimum total system cost. The ideal solution is to use a very simple, low cost processor that requires very few communication lines. The approach used herein was to design a processor that can do only three simple functions: remember the occurrence of an event (a one bit counter); count to three (a special two bit counter); and count the number of 1/60ths of a second elapsing during a four second period (an eight bit counter used to measure vehicle speed). All of these functions are accomplished using off-the-shelf integrated circuits. A key point in the system design was the requirement that all counting circuit contents are read by the central computer before they overflow, thereby obtaining an accurate low cost processor.

Data Processor

FIG. 1 shows the conceptual details of the data processor just described. Data from the various sensors is brought in over voice grade wirelines 10 using a combination frequency division/time division multiplexing scheme. Stored data is transmitted to a central computer via a modem 11 at fixed intervals using time division multiplexing. Commands are received from the computer and sent on to a desired signal controller via commutator 12. A simple data processor easily accommodates up to 10 signalized intersections and their associated sensor data.

Intersection Equipment

Figure 3:
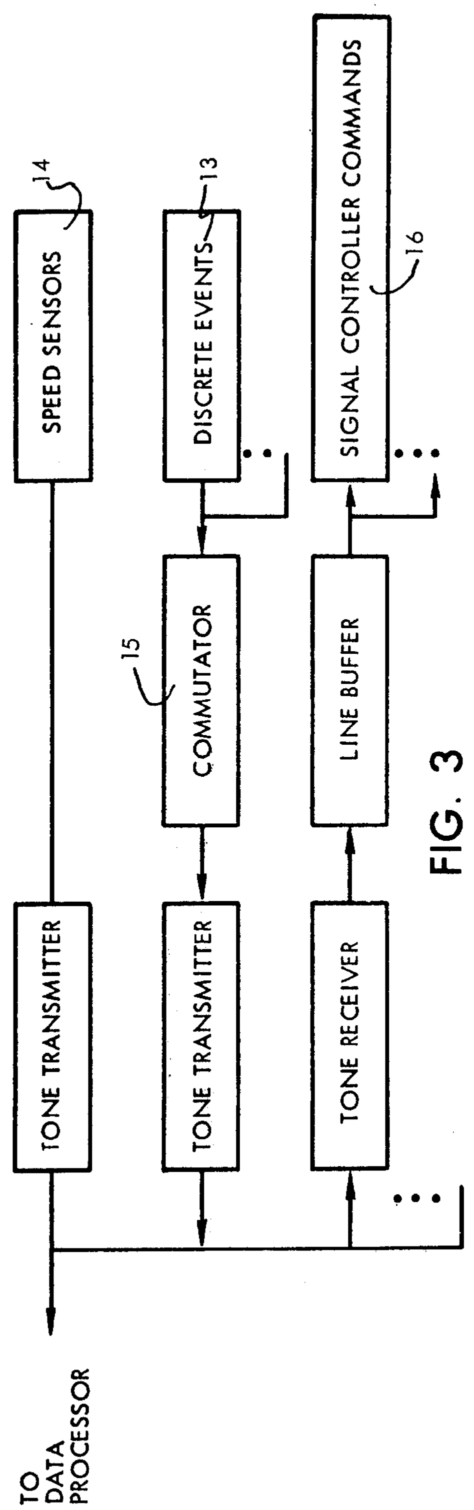
FIG. 3 is a block diagram of sensing equipment installed at each intersection.

FIG. 3 shows the small unit installed at every signalized intersection. The signal controller state 13 and the vehicle sensors 14 are monitored continuously and their state is transmitted to the data processor at ¼ second intervals. Sensor data being used for speed measurement by-passes the commutator 15 and is transmitted continuously to the data processor. Commands 16 to the signal controller are received from the data processor. See also FIG. 4.

Computer-Communications Interface Equipment

Figure 4:
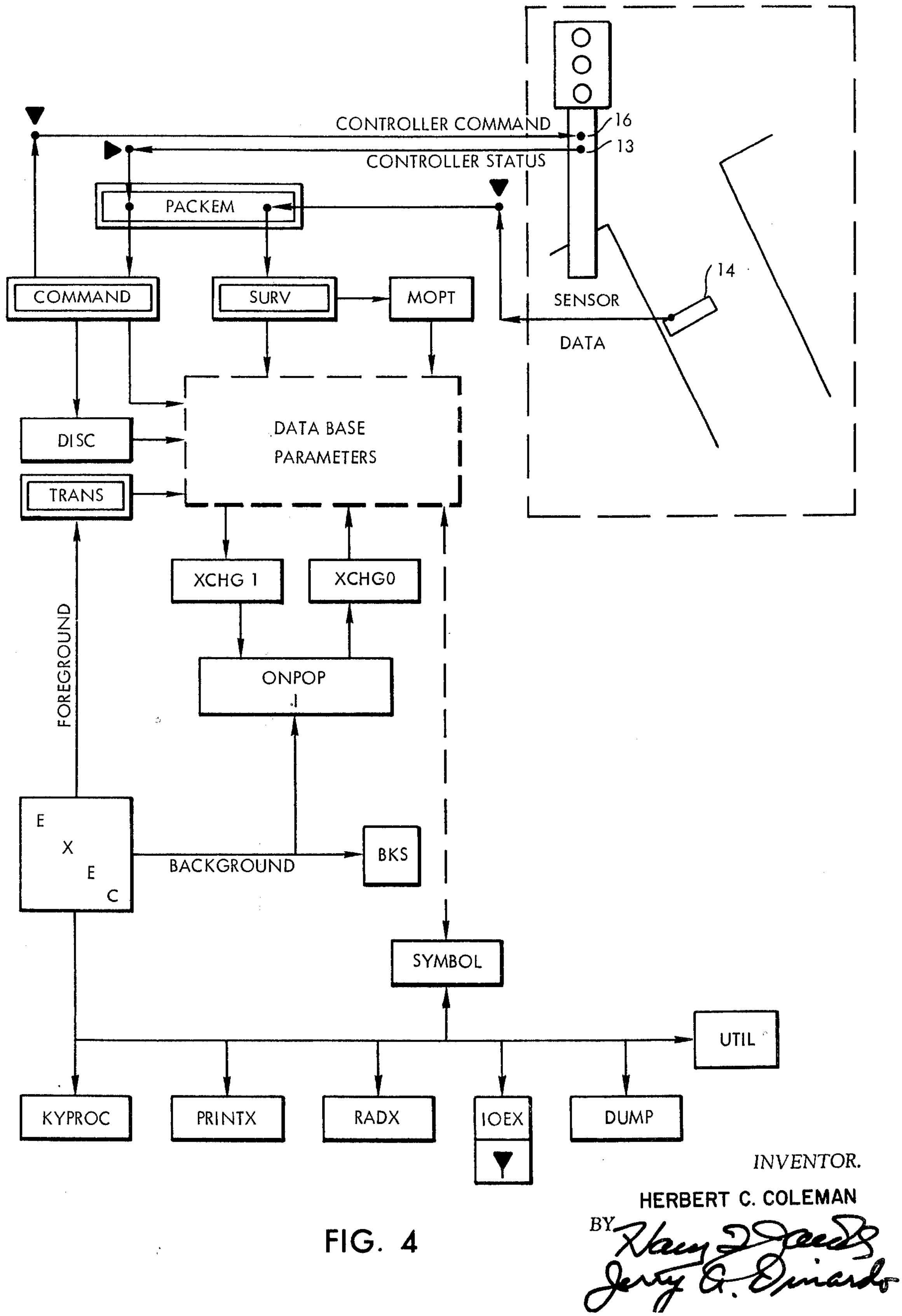
FIG. 4 is a block diagram showing the interrelationship of the software modules comprising said traffic control system.

FIG. 4 shows the last link in the communications chain, the interface to the computer. The Computer-Communications Interface Equipment (CCIE) has a line buffer 17, or storage register, for each line. The buffer 17 stores a block of data bits during transmission of commands or reception of data. The buffer 17 sends or receives data via a modem 18 at relatively low data rates, typically 1200 bits per second. However, the buffer 17, transfers data directly to or from the computer core, via data transfer gates 19, at well over 2 million bits per second. As each line buffer 17 operates independently during receive or transmit modes, each can operate at a different speed. That is, one buffer may operate at 100 bits per second, a second at 1200, and a third at 9600 bits per second. The modem 18 used and the wireline quality are the only data transfer speed limiting factors.

It should be noted that the CCIE data transfers to and from core do not interfere with computer processing. Each bank of 16K core has two ports. Thus the central processing unit (CPU) can address one core bank while at the same time the CCIE addresses another core bank. True simultaneous core access results.

B. Computer Software

The computer software of the traffic control system is designed around the requirement that the system must be truly traffic responsive; i.e., optimum signal light patterns must be generated on-line. Further, the system must use a computer which is within the financial capabilities of a typical medium to large city. Meeting these requirements is a task of considerable magnitude.

Optimization of Flow

First consider the optimization problem involved. The three control variables for each intersection involved are the cycle, split, and offset. The cycle length is the time between similar points in the sequence of signal light indications at a given intersection (e.g.; the time increment between a given main street green initiation and the next main street green initiation). The offset is the time increment between similar points (normally initiation of green) in the signal light sequence for different (e.g., neighboring) intersections. As an example, in a "progressive" system the signals are set such that the light turns green just as a platoon of cars arrives. The offset is the variable which fixes the relationship between intersections such that progressions are established. Finally, the split is the ratio of green time in a given direction to cycle length. It is seen that there can be hundreds, or even thousands of control variables to be optimized. In general, all intersections in an interconnected network have a common cycle length, thereby reducing the number of control variables somewhat; however, the number is still quite large for most networks.

The computational time required for state-of-the-art optimization techniques is quite non-linear (in fact nearly exponential in many cases) with respect to the number of control variables involved. Consequently, the computational time required can quite easily exceed the time available. In order to minimize computational time requirements, the system according to the invention incorporates the following features:

a. Use of multi-level control
b. Use of major (optimizable) and minor intersections
c. Use of network decomposition
d. Minimization of time required for input/output processing.

Multi-Level Control

The traffic control system provides control on both network and local levels. This feature is based on the fact that fluctuations of traffic characteristics can be divided into two general types: (a) relatively long period (e.g., a few cycle lengths) macroscopic fluctuations in which the basic character of the network or portions of the network change, and (b) short term localized fluctuations. Optimizing the network to account for macroscopic changes requires a relatively sophisticated optimization technique, whereas simple, rapid algorithms can be used to handle the localized fluctuations. The use of multi-level control minimizes computational requirements by fitting the complexity of the algorithm to the complexity of the problem to be solved. For example, once an optimum signal light pattern has been obtained using the network optimization routine, this pattern is modified to account for local fluctuations by the simpler local control algorithms until another significant change in macroscopic conditions is measured.

Major and Minor Intersections

In general, it is not necessary to include each intersection in a network optimization procedure. Instead, intersections which, in effect, control the operation of the network can be defined (major intersections) and used in the optimization procedure, with the remaining (minor) signals being set using simple interpolation/extrapolation algorithms. As an example, assume a network is composed of intersecting arterials with intervening intersections being minor side streets (e.g., feeding residential areas). In this case the intersections at which the arterials meet would be defined as major and the remaining intersections defined as minor.

Network Decomposition

Often large networks can be divided into subnetworks. Since most optimization routines are non-linear with respect to the number of control variables, it is generally faster to optimize, for example, four 25 intersection subnetworks than to optimize one 100 intersection network. However, when using subnetworks, the problems involved in interfacing the subnetworks are introduced.

Minimize I/O Processing

In first-generation systems, the incoming data lines are scanned 30 to 60 times per second by the central processing unit (CPU). As explained above, the traffic control system utilizes a direct memory access feature which relieves the CPU of the menial task of getting data in and out of the computer. This feature results in a significant saving in CPU processing time for systems with large numbers of sensors. The time saved can then be allotted to the analysis and control programs.

C. Central Facility Equipment

The central control center is the focal point of the traffic control system. The center consists of the digital computer, operator control console, mass storage and system displays.

Digital Computer

The computer used in the traffic control system was chosen only after a thorough and extensive study of computers currently in production in this country. The steps in the study were as follows.

First, a rigorous evaluation was made of the instruction mix required to implement the advanced software to be incorporated into the system. To evaluate the potential capability of a computer for a specific application, it is necessary to make some estimate of the job the computer must accomplish. The job of traffic conrol consists of:

Adding, subtracting, multiplying, dividing

Conditional and unconditional branching

Boolean operations, OR, Exclusive OR, and ANd

Loading registers with data from core memory and storing data into core memory

Shifting

Transferring data into and out of disks, magnetic tapes, card equipment, printers and the communication equipment The evaluation task is further cmplicated by requirements for various levels of precision in arithmetic manipulations. Therefore, the instruction mix shown in Table 1 below was developed. This list of 16 types of instructions is representative of the requirements for a real-time traffic data acquisition and control system.

TABLE 1.

INSTRUCTION MIX FOR A TRAFFIC CONTROL SYSTEM

| | PERCENT OF TOTAL |
|---|---|
| 1. Add, 16 Bit Precision, Fixed Point | 12.2 |
| 2. Add, 24 Bit Mantissa, Floating Point | 5.2 |
| 3. Subtract, 16 Bid Precision, Fixed Point | 10.0 |
| 4. Subtract, 24 Bit Mantissa, Floating Point | 4.3 |
| 5. Multiply, 16 Bit Precison, Fixed Point | 3.5 |
| 6. Multiply, 24 Bit Mantissa, Floating Point | 1.5 |
| 7. Divide, 16 Bit Precision, Fixed Point | 0.7 |
| 8. Divide, 24 Bit Mantissa, Floating Point | 0.3 |
| 9. Branch, Conditionally | 3.2 |
| 10. Branch, Unconditionally | 13.2 |
| 11. Compare, Algebraic | 5.0 |
| 12. Compare, Logical | 6.1 |
| 13. Input/Output | 1.1 |
| 14. Logical AND, OR, EOR | 4.0 |
| 15. Shift | 7.2 |
| 16. Load/Store | 22.5 |
| TOTAL | 100.0 |

The second step in the study was to estimate the instruction mix utilization. The estimate was extrapolated from various system control optimization routines. The results of that extrapolation are also shown in Table 1 above where the percentage utilization of each type of instruction is given. These estimates of instruction mix utilization have been confirmed through coding and checking out the major surveillance and control processors for the traffic control system.

The third step was to determine what computer could execute the instruction mix in a reasonable time at a reasonable cost. The evaluation led to the selection of the Sigma 5, made by Xerox Data Systems, for the central control processor in the traffic control system. A few of the outstanding characteristics of the Sigma 5 are:

16 general purpose, 32-bit, high speed registers usable for arithmetic operation [single or double precision, fixed or floating point (optional)].

Seven of the above 17 registers are usable as index registers as well as general purpose or arithmetic operations.

A multi-port capability for each bank of 16K core memory. This feature permits up to six independent processors to be connected to each bank of core. Completely simultaneous access to multiple banks of core is obtained.

Capability of addressing bytes, half words, words, and double words.

Operator Console

A teletypewriter, either model ASR-35 or KSR-35, is used as the primary operator interface to the system. This provides a low cost and efficient means of man-machine interface.

Mass Storage

The mass storage device used in the traffic control system is a fixed head disk. The fast access time and high datatransfer rate make it particularly useful for permanent storage of programming systems (monitors, compilers, and assemblers); temporary storage of programs and data; and storage of program segments to provide very fast overlay suitable for real-time control. The disk storage capacity is 2.9 million bytes. Average access time is 17 milliseconds.

System Displays

A Map Display is available that schematically portrays system status. The display is not required for system operation but does provide a useful public relations tool in explaining system operation and capabilities to the visiting public. As computer control systems provide a notoriously small amount of mechanical movement to indicate that the system is alive, a map display, with its ever changing red and green lights, does provide a psychological reassurance that all is well.

The software package of the traffic control system will now be described in more detail.

SOFTWARE PACKAGE-GENERAL DESCRIPTION

The traffic software package performs two major functions: maintenance of computer operations and computation of surveillance and control algorithms. The Operation System (OS) provides the services required to perform the first function. The OS handles all computer peripherals, including transmission of data to and from the field. It provides on-line communications capabiity to process input messages from the traffic engineer and output messages. The on-line communication capability permits real time update of algorithm parameters. The OS also controls the execution of the surveillance and control algorithms.

The surveillance algorithms maintain a record of current vehicle density and location within the network. Based on detectors located at optimum points within the network, real time speed and vehicle presence measurements insure an accurate knowledge of vehicle movement and saturation conditions. Utilizing this accurate surveillance base, the control algorithms can effectively respond to changing traffic patterns to minimize delay and stops. Three levels of control are used to handle the basic network flow pattern, intersection volume changes, and temporary local fluctuations.

A basic field traffic control software system is provided and programmed including all of these features. In addition, a special traffic display board system may be provided. The display board system may be used to check out the basic software and to demonstrate its effectiveness to prospective customers such as traffic engineers. The primary difference between the display board system and the field system is that, on the display system, the volume and speed are selected for each street by the traffic engineer rather than measured by field sensors.

An overview of the field traffic control software is given below.

FIELD TRAFFIC CONTROL SYSTEM

A general description of the field traffic control system is now presented herein. Section 1 describes the software system from a functional viewpoint. Section 2 provides an overview of the software system in terms of software modules and interrelationships between the modules. Section 3 describes the basic data flow between software modules.

1. Functional Descriptions

A description of the field input data is given first to provide a basis for describing the functions of the software package. The operating system, the surveillance algorithms and the control algorithms are then discussed in order.

Field Input Data

The input data from the intersection consists primarily of vehicle speed measurements, vehicle presence indication, and controller status indicators. Loops are placed in straight-through lanes and in left-turn pockets. When a vehicle is present over the loop, the loop detector provides a continuous signal to set input bits in the traffic terminal unit (TTU). The TTU accumulates data from several intersections. Vehicle count is determined after the data has been transmitted to the computer. The time that a signal remains on is used by the computer to determine vehicle speed.

A complete monitoring of traffic lanes is provided at major intersections where two main arterials cross. Each straight through lane contains a loop (hereafter called a passage sensor) approximately 300 feet behind the intersection. Left turn pockets are instrumented approximately 150 feet from intersection entry, provided the lane is long enough. Short left turn pockets are instrumented near the entrance to the pocket. For each intersection approach, one of the straight through loops is used as a speed detector. At minor intersections where a minor side street crosses a main arterial, only left turn pockets or the side street traffic is monitored. The main arterial flow is propagated by the intersection surveillance processor.

Controller status indicators and controller command capability are provided by a controller modification bit. Both step controllers and actuated controllers can be incorporated into the system. The number of status indicator bits and the number of command actuation bits are determined by the complexity of the controller. All intersections, major and minor, are instrumented for control capability.

Operating System (OS)

The basic traffic control cycle is 0.5 second. Functions performed in this cycle consist of receiving all intersection data by reading all TTU data into core, of computing the surveillance and control algorithms, and of transmitting any new controller commands. The OS controls the timing for this basic cycle plus initiating the input/output functions. The OS also brings incoming messages from the teletypewriter and card reader services output requests to the Radid Access Disc (RAD) for permanent data summary storage or to the line printer on a timesharing basis with the traffic control functions.

Once an incoming message from the traffic engineer is complete, the program providing on-line communications is called. This program interprets the incoming message and, thereby, allows external control to be exercised over the various surveillance and control algorithms. Intersections can be placed under computer control or removed from computer control. Any one of the three levels of control can be halted at an intersection, or the traffic engineer may set a fixed traffic control pattern. The traffic engineer may request special output to the line printer or terminate standard output messages.

Intersection Surveillance Algorithms

The surveillance algorithms process all measured vehicle input counts through a fixed time-distance table called the Vehicle Position Time Matrix. The data handling program decodes vehicle counts from TTU input data bit position, and enters the counts into the appropriate links in the Vehicle Position Time Matrix. The length of each link is equal to the distance between the input passage sensors in the straight through lanes and the set of passage sensors at the next downstream major intersection. This distance divided by an averaged measured speed is the time for vehicles to travel unimpeded through the link. Each second all entries are advanced one position in the table.

Each signal controlling the flow along the link is represented by an output pointer, whether at a major intersection or a minor intersection. Each of these pointers has the correct time-distance value to stop vehicles from entering the intersection on red. Vehicles stopped are removed from the matrix; each vehicle removed constitutes a stop, and delay is accumulated for all vehicles removed. When a green condition occurs, vehicles are reentered at a fixed rate, simulating a constant queue discharge rate. Until all stopped vehicles have been discharged, new arrivals are stopped.

Left turn pockets are handled by special links in the vehicle position matrix. For each left turn input count, a straight through vehicle is removed. The left turn output counts are reentered into the appropriate straight through link. When vehicles have been propagated to the end of the link (i.e., the position corresponding to the next set of passage sensors), the propagated count is accumulated for correlation with the measured input counts at the downstream passage sensors. By maintaining a record of each vehicle in the network, an accurate surveillance base is established for adaptive control.

Adaptive Control

Three levels of control are utilized to provide maximum adaptive response to changing traffic patterns. The three control levels are as follows:

- Level 1 Control - Establishment of a basic network progression.
- Level 2 Control - Split adjustment at major intersections based on green times required per signal phase.
- Level 3 Control - Green shortening/green extension at each intersection to handle local traffic fluctuations.

The network progression is computed by the On-Line Network Progression Optimization Program (ON-POP). The cycle length, splits and offsets are optimized using a least squares technique coupled with a global minimization search technique. The optimum solution is obtained by using the ideal travel time between intersections and by weighting the importance of each link based on average volume and a link importance factor. The split and saturation level at each intersection are also used by ONPOP as inputs for the computation of a new network progression. Once an optimum network progression has been established, it will remain in effect until a significant change occurs in the volume or speed pattern within the network. A minimum of three cycles is required between new solutions, and an average time of 15 minutes is expected between solutions. The basic network progression is the primary control and the remaining control levels are constrained to maintain the progression.

Major intersections split adjustment is performed on a cycle-by-cycle basis. Each cycle, a five cycle average of volume along the four approaches to the intersection is recomputed. If the green times required to service the approach change, then a new split is computed and implemented using an 8-link optimization technique. The 8-link optimizer is a small model of the network optimization technique considering the four approaches into the intersection and the four downstream approaches.

The command generation logic performs green shortening/green extension at the termination of each phase on a second-by-second basis. The green shortening interval is between 3 and 6 seconds depending on the travel time from the passage sensors to the effective intersection entry. The green extension interval is between 1 and 5 seconds depending on the intersection criticality indicator. The level of saturation is used to set the intersection criticality indicator for green shortening/green extension. The green shortening/green extension interval is used to process slow vehicles during light volume conditions and to allow phase termination when a slow vehicle is present during heavy volume conditions. The green extension interval allows the packed tail end of a long platoon to be processed under all traffic conditions. The use of green shortening/green extension prevents saturation where possible and relieves saturation as quickly as possible.

2. Software Modules

The traffic control software package is divided into the following four primary programs:

Operating System (OS)
Foreground Program
Background Control Program
Special Services Program The OS controls the computer operating including the man/machine interface from the teletypewriter, card reader, and line printer. The foreground program processes input sensor data and controller status and dynamically computes optimum signal settings which are formatted to change the controller status. The background control program utilizes the foregound data base parameters to compute the optimum set of reference offsets at each major intersection for the optimum network signal cycle. The fourth program consists of special modules for generating the software system, initializing the data base, and formatting special outputs. The software modules comprising each of the first three programs listed above are shown in FIG. 4 and are described below.

Operating System

Referring to FIG. 4, the OS consists of eight modules (EXEC, KYPROC, PRINTX, RADX, IOEX, DUMP, UTIL, SYMBOL). The basic monitor, EXEC, controls the scheduling of tasks, either internal to the OS or external such as calling for execution of foreground or background programs. The KYPROC processor handles teletypewriter messages. The PRINTX processor buffers line printer output to the RAD. The RADX processor controls the storage of data to and from core. The IOEX processor controls all input/output from the CIU, card reader, line printer, and paper tape reader/-punch. The processor DUMP allows the operator to obtain a core image dump of selected core locations through standard key-ins. The UTIL module consists of specialized subroutines, such as data conversion routines, used by several other processors. The SYMBOL module consists of a number of overlayed processors which provide the on-line communication between the foreground and background data bases. The SYMBOL processor will accept data from the teletypewriter or card reader, convert the data, and store the data in the proper arrays, other SYMBOL processors will display converted data from arrays within the data base on the teletypewriter or line printer. All operator control of the surveillance and control algorithms is made through the on-line communication processors.

Foreground Program

The foreground program consists of six modules referred to herein as PACKEM, SURV, COMMAND, TRANS, MOPT, DISC. The four modules enclosed in double lines are called by the executive. The PACKEM and COMMAND subprograms are called every one-half second. The PACKEM subprogram decodes the received sensor data and controller status bits and enters the data into the data base. The COMMAND subprogram verifies controller status changes and issues commanded controller state changes. The COMMAND subprogram calls the DISC processor to implement optimum splits each time the minimum green has elapsed during the first main street subphase. The SURV and TRANS subprograms are called every second. The SURV subprogram performs the intersection surveillance and calls the MOPT processor to determine optimum phase termination at each minor intersection (which contains limited or no instrumentation). The TRANS subprogram maintains the network clock, schedules ONPOP, and implements the optimum network setting.

Background Control Program

The background control program consists of three modules (ONPOP, XCHCI, XCHGO). The on-line network progression optimization program, ONPOP, computes the optimum set of reference offsets at each major intersection for the optimum network signal cycle based on real time data. The XCHGI processor converts the real time data from the foreground data base and stores the data in the ONPOP arrays. The XCHGO processor converts the ONPOP solution and stores the data in the foreground data base.

3. Data Flow

The data flow from vehicle sensor detection to controller response is described in this section. The vehicle sensor data and controller status is brought into the computer by the IOEX processor (FIG. 4). Detection of new vehicles is performed by PACKEM and stored in the foreground data base. The SURV subprogram enters the new vehicles into the intersection approach and computes queue length, number of stops, and delay for each vehicle that has been detected. The controller status is provided to the COMMAND subprogram by PACKEM. The COMMAND subprogram provides green and yellow status at all intersection approaches to the SURV subprogram by changing the appropriate elements in the data base. The total number of vehicles and vehicles not serviced during a green phase are computed by the SURV subprogram and used by the DISC subroutine to optimize the split at each intersection.

The total number of counts (volume) computed by the SURV subprogram and the total green time required at each intersection computed by the DISC subroutine form the basic data used by ONPOP. This data is transferred from the foreground data base to the ONPOP data base by the XCHGI subroutine. When ONPOP has computed a new network signal pattern, the XCHGO subroutine transfers the signal pattern from the ONPOP data base to the foreground data base and sets a flag to implement the new pattern by the TRANS subprogram.

The TRANS subprogram calls ONPOP every three cycles and implements the new pattern by storing the signal pattern in a table of reference offset times used by the COMMAND subprogram. The COMMAND subprogram terminates each green phase using the table of reference offsets for major intersections. The MOPT processor uses the SURV subprogram tables in the data base to determine the optimum time to terminate minor intersection green phases. The PACKEM subprogram codes the desired controller phase commands determined by the COMMAND subprogram into the appropriate TTU format. The IOEX processor outputs the controller commands to the TTU, thus completing the data path.

EXECUTIVE ROUTINE

The software system consists of an operating system and a series of application routines. The operating system is composed of a monitor, I/O handlers, and a group of utility routines.

The applciation routines in the system are organized in accordance with the frequency that they are required to be executed. Those routines that must be executed every execution cycle are designated as resident foreground tasks and are executed in the order that they appear in the schedule table. The execution cycle is defined as the sum of the time allotted to each foreground task. Those routines that are not time critical are designated as background tasks and are executed only upon request and when CPU time becomes available. A background task is partially executed during that portion of the execution cycle that is unused by the foreground tasks. The timing for the foreground tasks is controlled by a clock which causes a program interrupt at the required frequency. When the interrupt occurs, the next foreground task in the schedule table is executed and the schedule table is updated. When the foreground task has completed its function, background execution is resumed at the point at which it was interrupted.

Following is a brief description and functional flow charts for each module in the operating system.

EXEC

The heart of the operating system is the executive routine which embodies the functions that are defined below.

a. System Startup Routine

Figure 5A:
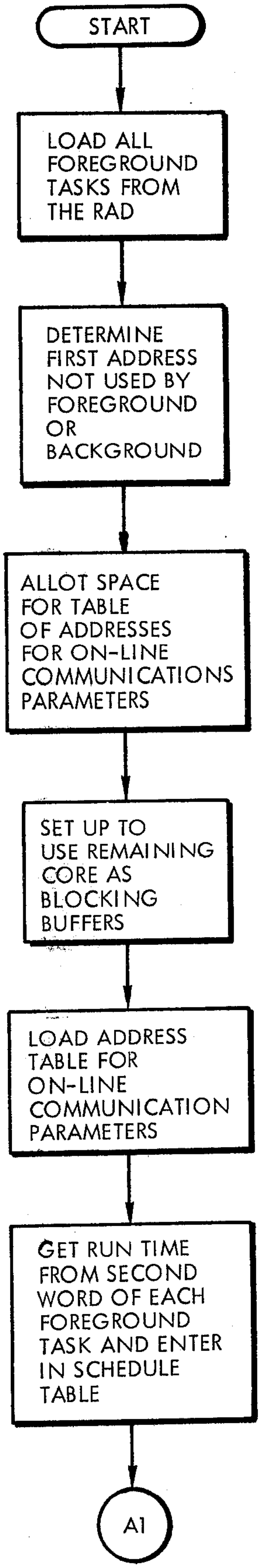
FIGS. 5A – 5C taken together comprise a functional flow chart of the system start up routine of the executive routine.
Figure 5B:
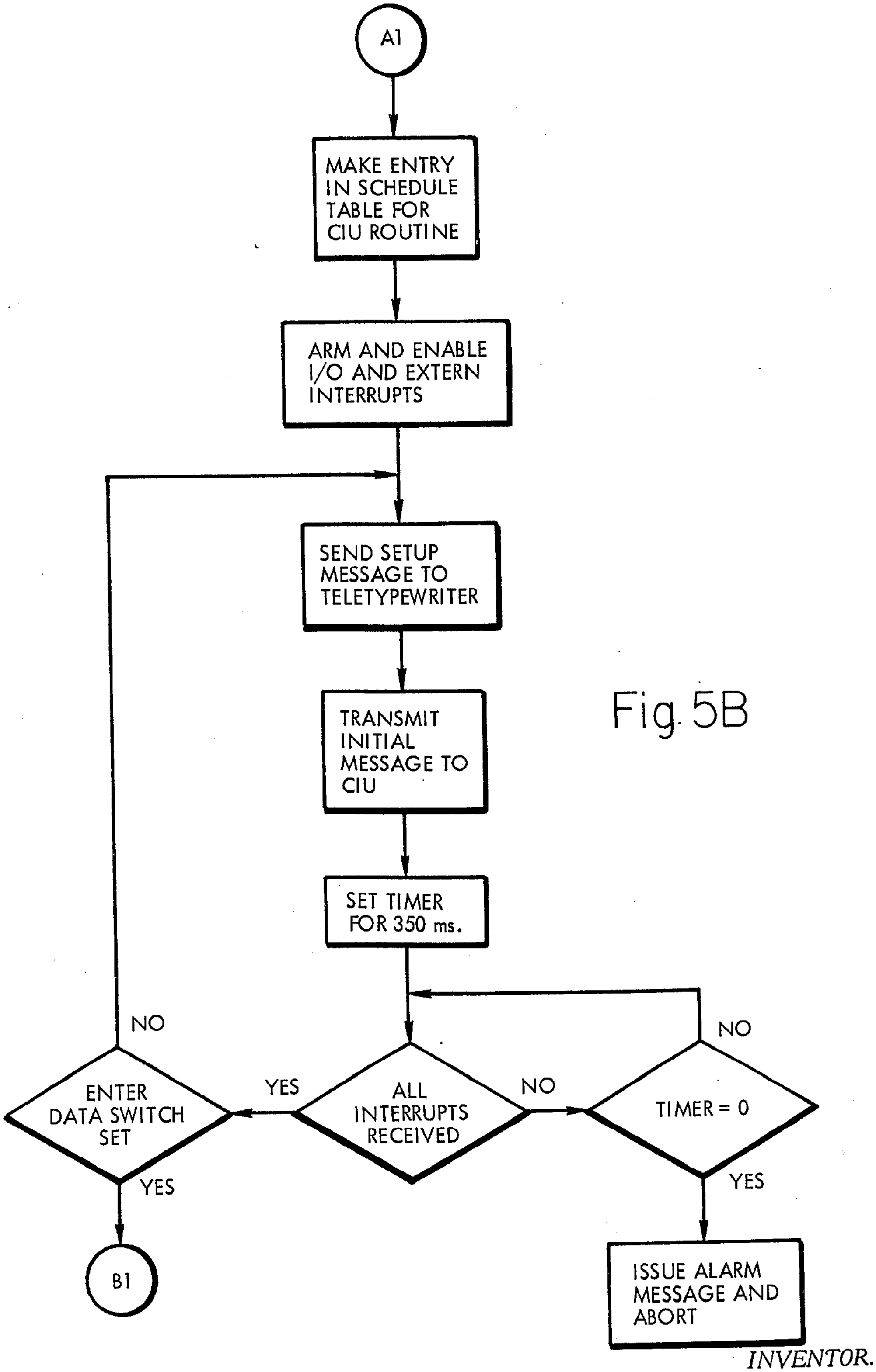
Figure 5C:
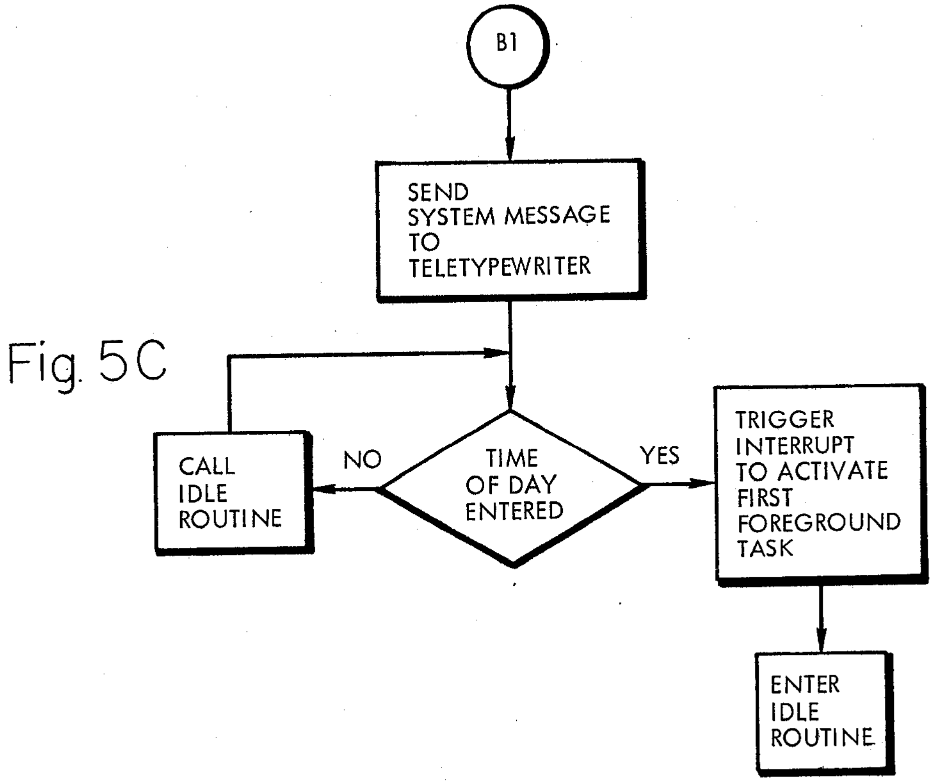

At system load time the first routine to gain CPU control is the System Startup routine which performs all of the functions necessary to initialize the system for operation. This routine is shown in FIGS. 5A–5C and corresponds to statement numbers 363–483 of the machine listings of Appendix A.

b. Foreground Task Scheduler

Figure 6:
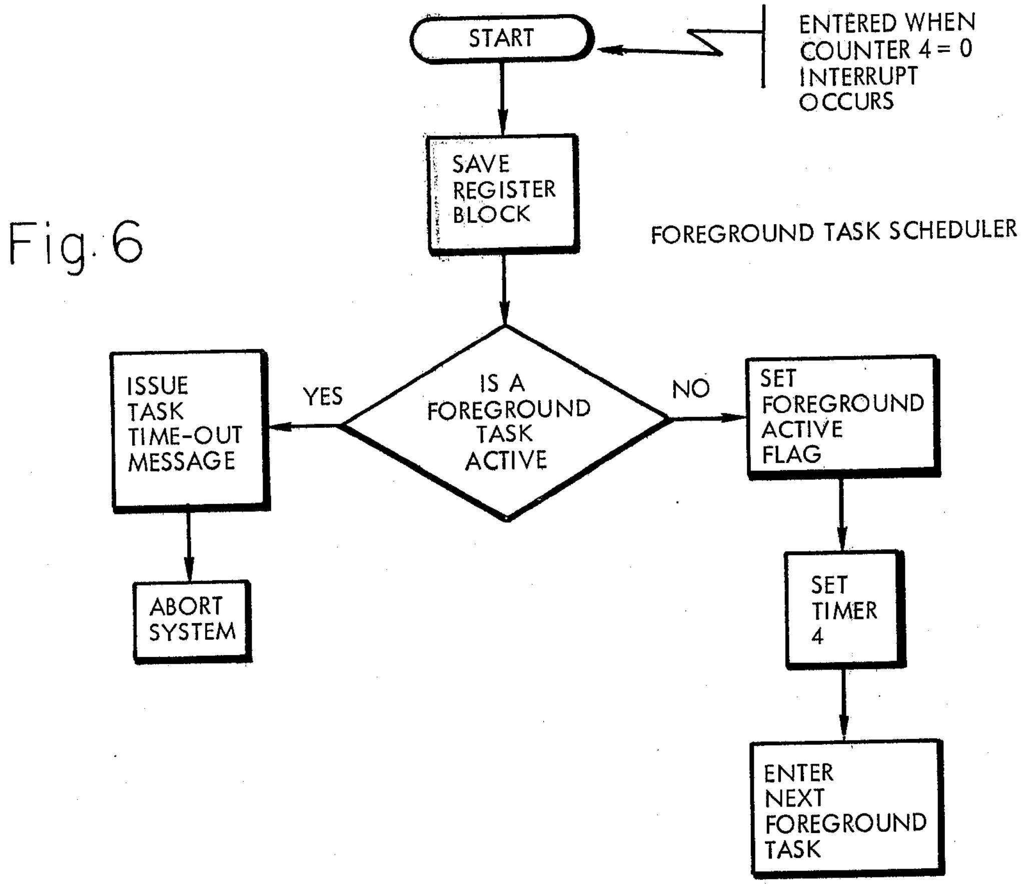
FIG. 6 is a functional flow chart of the foreground task scheduler.

The Foreground Task Scheduler controls the sequence in which the foreground and background routines are executed and performs a watchdog timer function to insure that no foreground task overruns its allotted execution time. This routine is shown in FIG. 6 and corresponds to statement numbers 220–252 of the machine listings of Appendix A.

c. Background Task and Symbiont Scheduler

Figure 7:
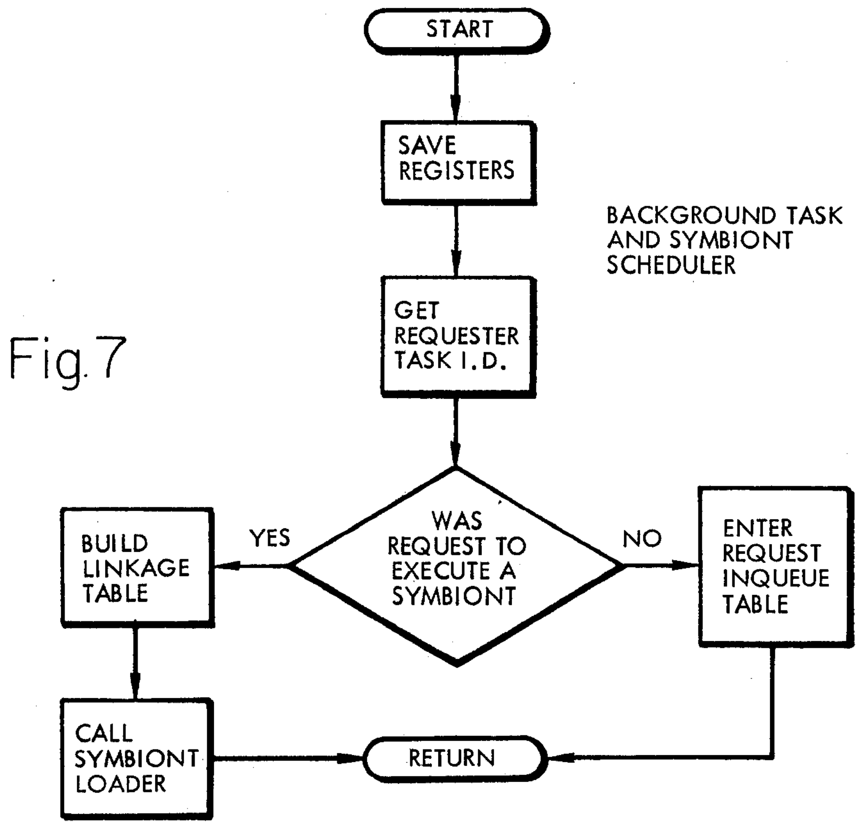
FIG. 7 is a functional flow chart of the background task and symbiont scheduler.

This routine is called when there is a requirement to execute a background task or a symbiont. If the request is for a background task, the request is placed in a background schedule table, on a first-in/first-out basis. These requests are serviced as CPU time becomes available. If the request is to execute a symbiont, a request is immediately made to the RAD Handler to load the symbiont from the RAD. This routine is shown in FIG. 7 and corresponds to statement numbers 290–322 of the machine listings of Appendix A.

d. Foreground and Background Exit Routine

Figure 8:
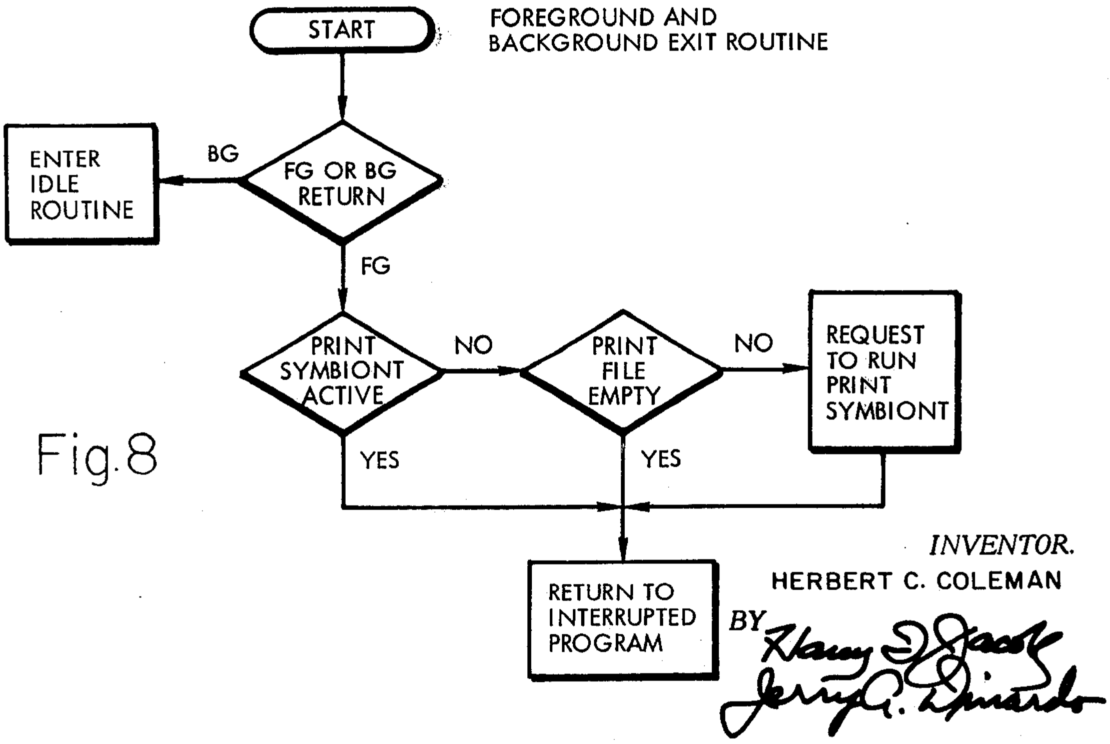
FIG. 8 is a functional flow chart of the foreground and background exit routine.

This routine provides a means by which a task may relinquish CPU control to the Executive routine. If the return is from a foreground task, control is returned to the routine that was interrupted when the task gained control. If the return is from a background task the idle routine is entered. This routine is shown in FIG. 8 and corresponds to statement numbers 323–346 of the machine listings of Appendix A.

e. CIU Communication Routine

Figure 9:
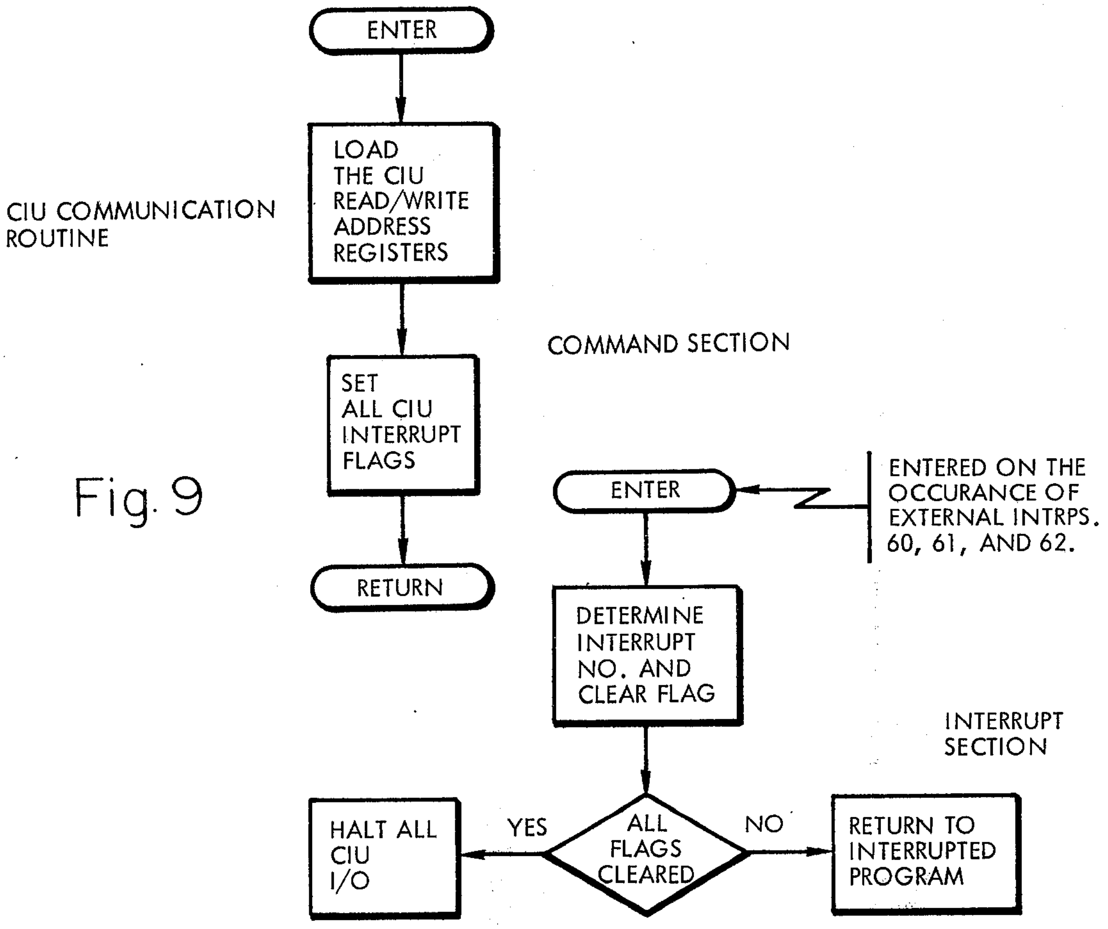
FIG. 9 is a functional flow chart of the CIU communication routine.

This routine issues the send and receive command to the communication system and receives and acknowledges the interrupts generated by the CIU. This routine is entered at the beginning of each execution cycle. This routine is shown in FIG. 9 and corresponds to statement numbers 172–212 of the machine listings of Appendix A.

f. Fault Trap Routine

Figure 10:
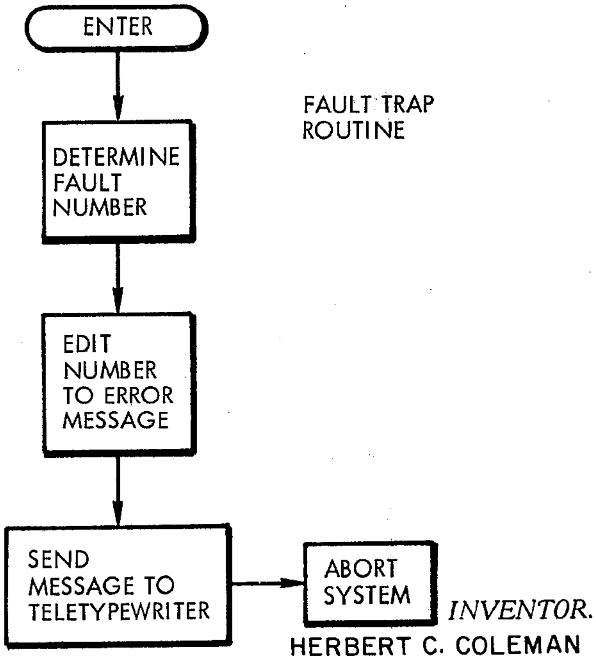
FIG. 10 is a functional flow chart of the fault trap routine.

This routine intercepts the Sigma 5 fault traps and issues a message to the teletypewriter when one occurs. This routine is shown in FIG. 10 and corresponds to statement numbers 572–596 of the machine listings of Appendix A.

g. Day Clock Routine

Figure 11:
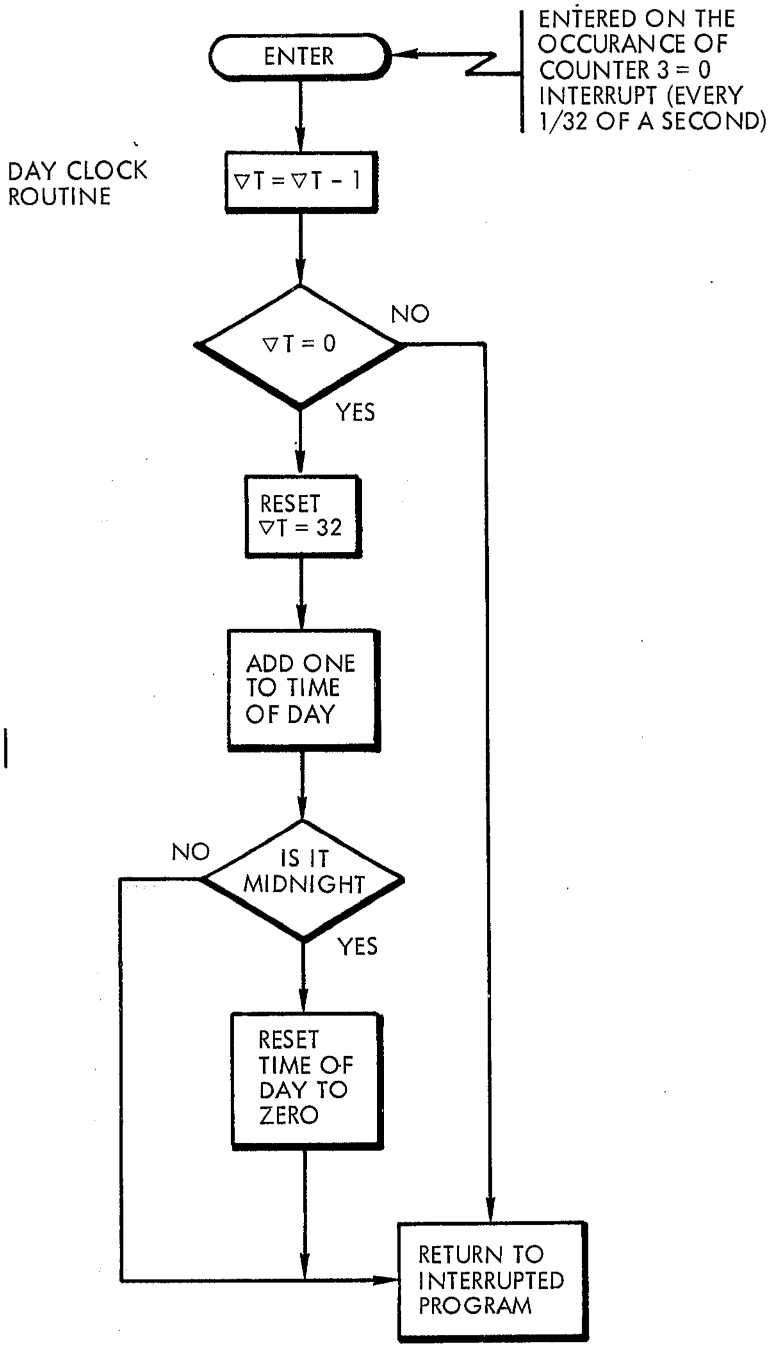
FIG. 11 is a functional flow chart of the day clock routine.

This routine is driven by one of the real-time clocks in the Sigma 5 and keeps the time of day in seconds since midnight. This routine is shown in FIG. 11 and corresponds to statement numbers 259–287 of the machine listings of Appendix A.

h. Idle Routine

Figure 12:
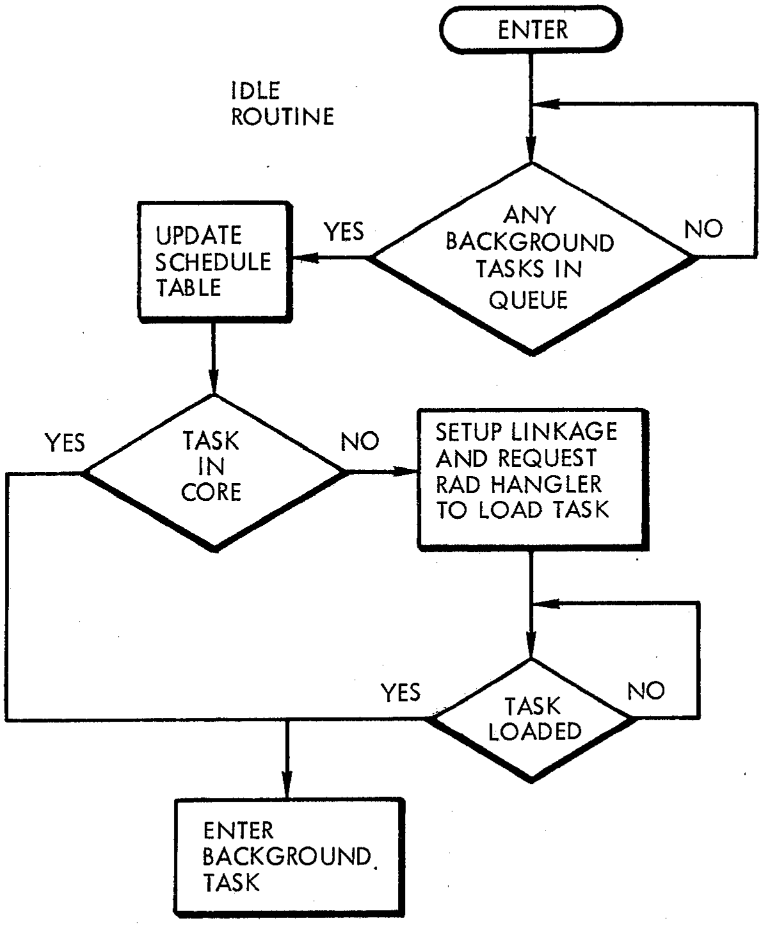
FIG. 12 is a functional flow chart of the idle routine.

This routine is entered when there are no further requirements on the CPU. When this routine is entered the background task queue is checked. If there is a request in this queue, the appropriate background task is loaded from the RAD and put into execution. This routine is shown in FIG. 12 and corresponds to statement numbers 503–555 of the machine listings of Appendix A.

INPUT/OUTPUT

The input/output section is comprised of the modules IOEX, PRINTX, RADX, and SYMBO1. The functional description of each module is given below.

a. IOEX

IOEX is the main module of the input/output section. The various functions performed by this module are outlined below.

CAL 4 Processor

Figure 13:
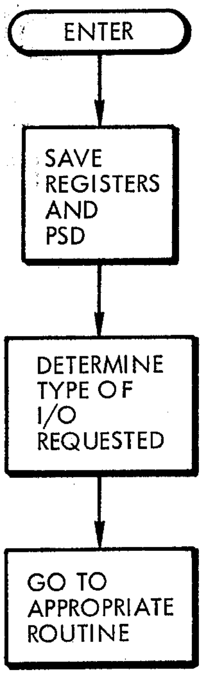
FIG. 13 is a functional flow chart of the CAL 4 processor.

All requests for I/O are made via the CAL 4 instruction. This routine interrogates bits 8-11 of this instruction to determine the type of I/O requested and then branches to the appropriate routine. This routine is shown in FIG. 13 and corresponds to statement numbers 1–30 of the machine listings of Appendix B.

ASR Handler

Figures 14, 15:
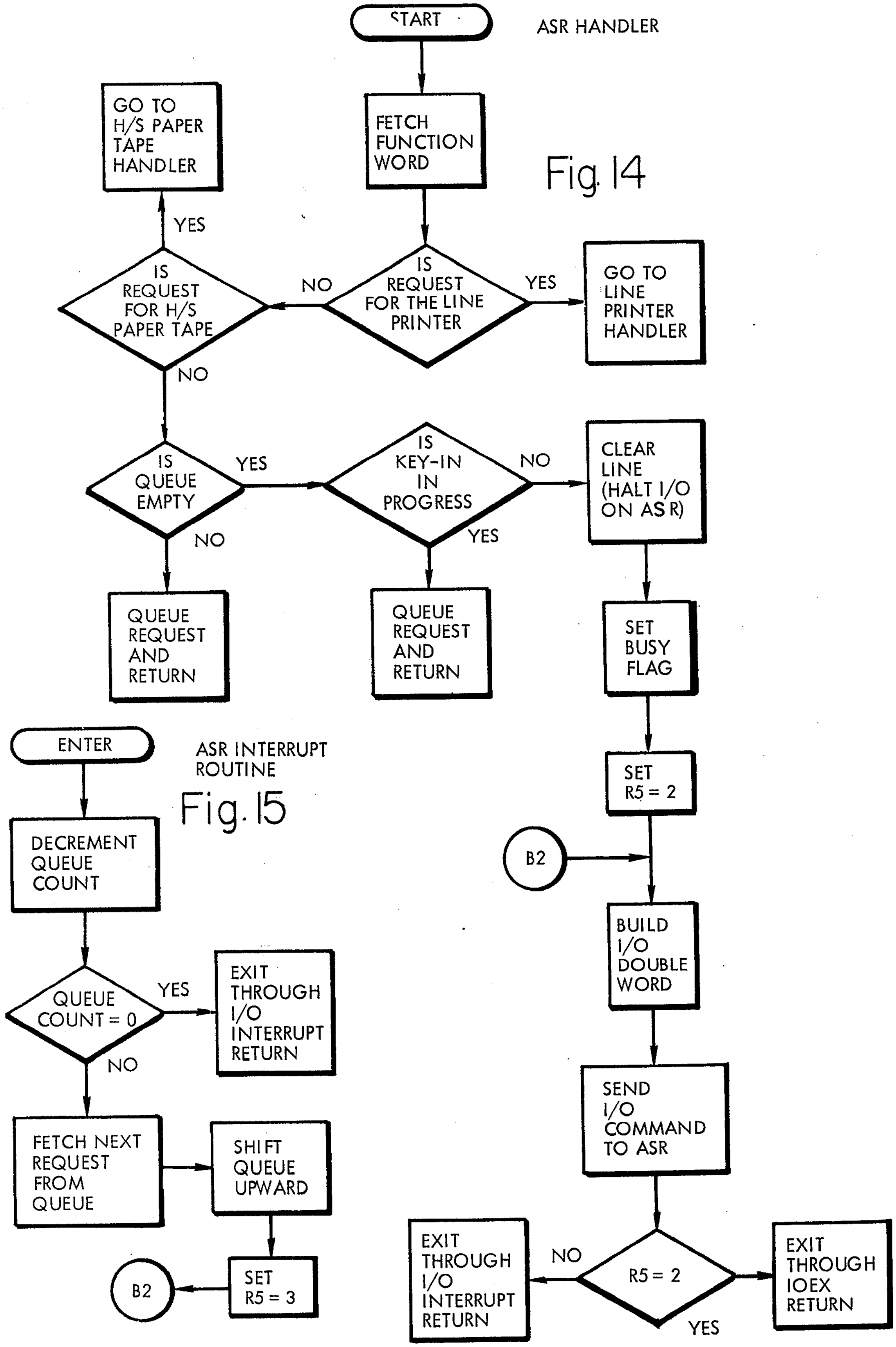
FIG. 14 is a functional flow chart of the ASR handler.
FIG. 15 is a functional flow chart of the ASR interrupt routine.

The ASR Handler accepts requests to type messages, read from the keyboard, punch paper tape, or read paper tape. It also accepts requests for the line printer and high-speed paper tape unit, however, these requests are simply passed on to the appropriate handler. The ASR Handler is set up so that if the device is busy when the request is received, the request is placed in a first-in/first-out schedule table. This routine is shown in FIG. 14 and corresponds to statement numbers 123–207 of the machine listings of Appendix B.

ASR Interrupt

This routine is entered when an I/O interrupt is received from the ASR. This routine is shown in FIG. 15 and corresponds to statement numbers 208–230 of the machine listings of Appendix B.

Card Reader Handler

Figure 16A:
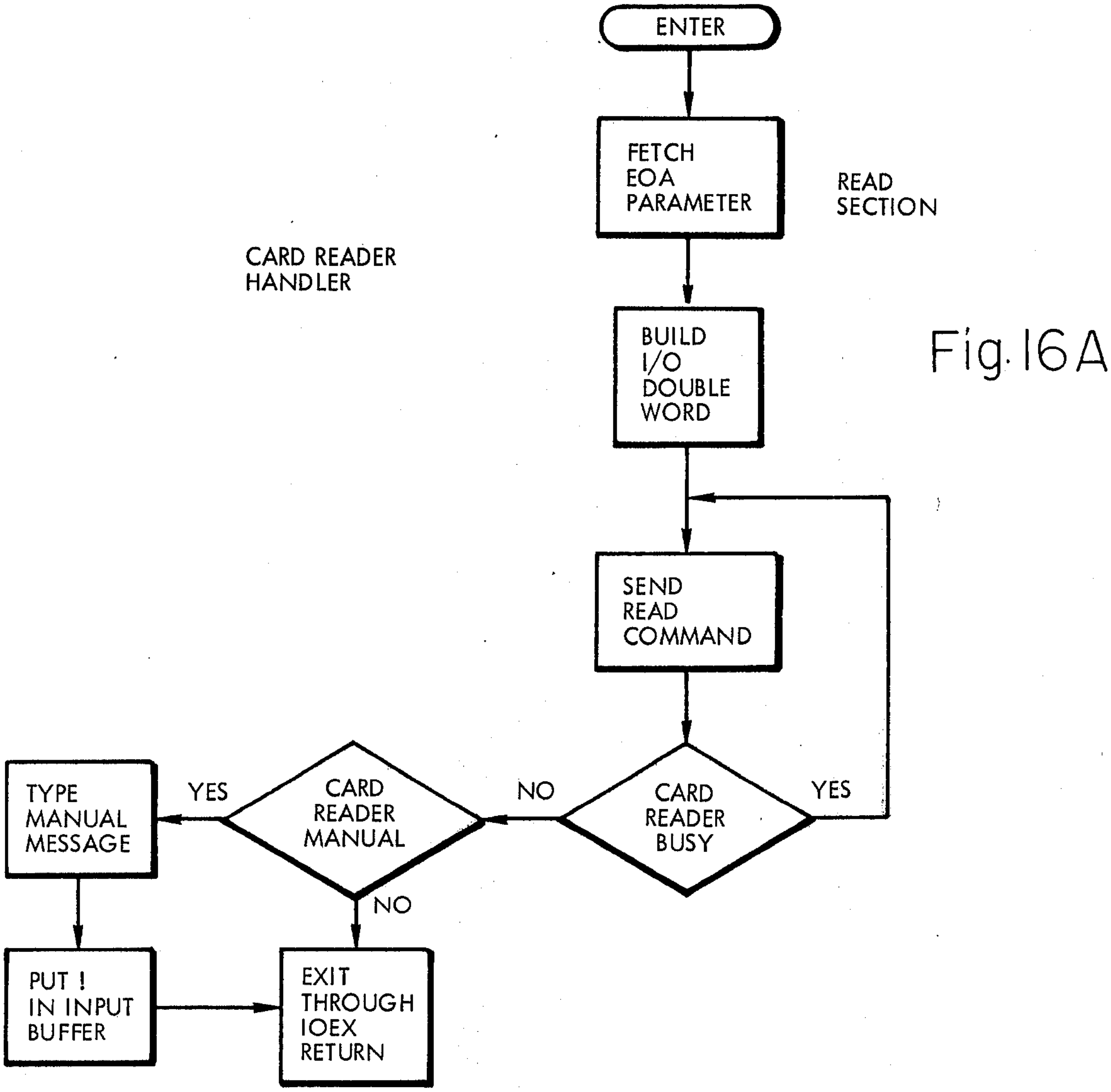
FIGS. 16A and 16B taken together is a functional flow chart of the card reader handler.
Figure 16B:
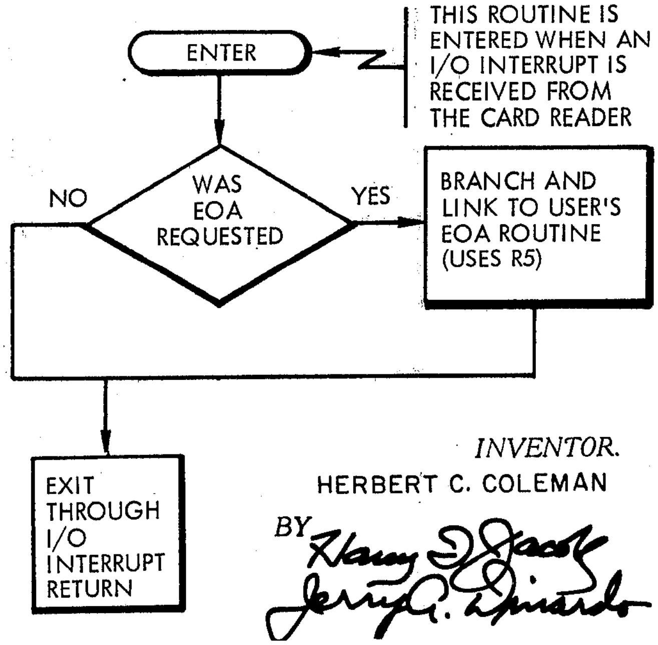

The Card Reader Handler consists of a read section shown in FIG. 6A and an interrupt section shown in FIG. 16B. Requests to read a card are not queued and if the device is busy when the request is received, the routine will wait (hang up) until the device becomes available. If the device is in the Manual Mode when the request is received, the routine will return immediately to the calling program and an exclamation point (!) character will be placed in the first byte of the input buffer. This routine is shown in FIG. 16 and corresponds to statement numbers 231–265 of the machine listings of Appendix B.

High Speed Paper Tape Handler

Figures 17, 18:
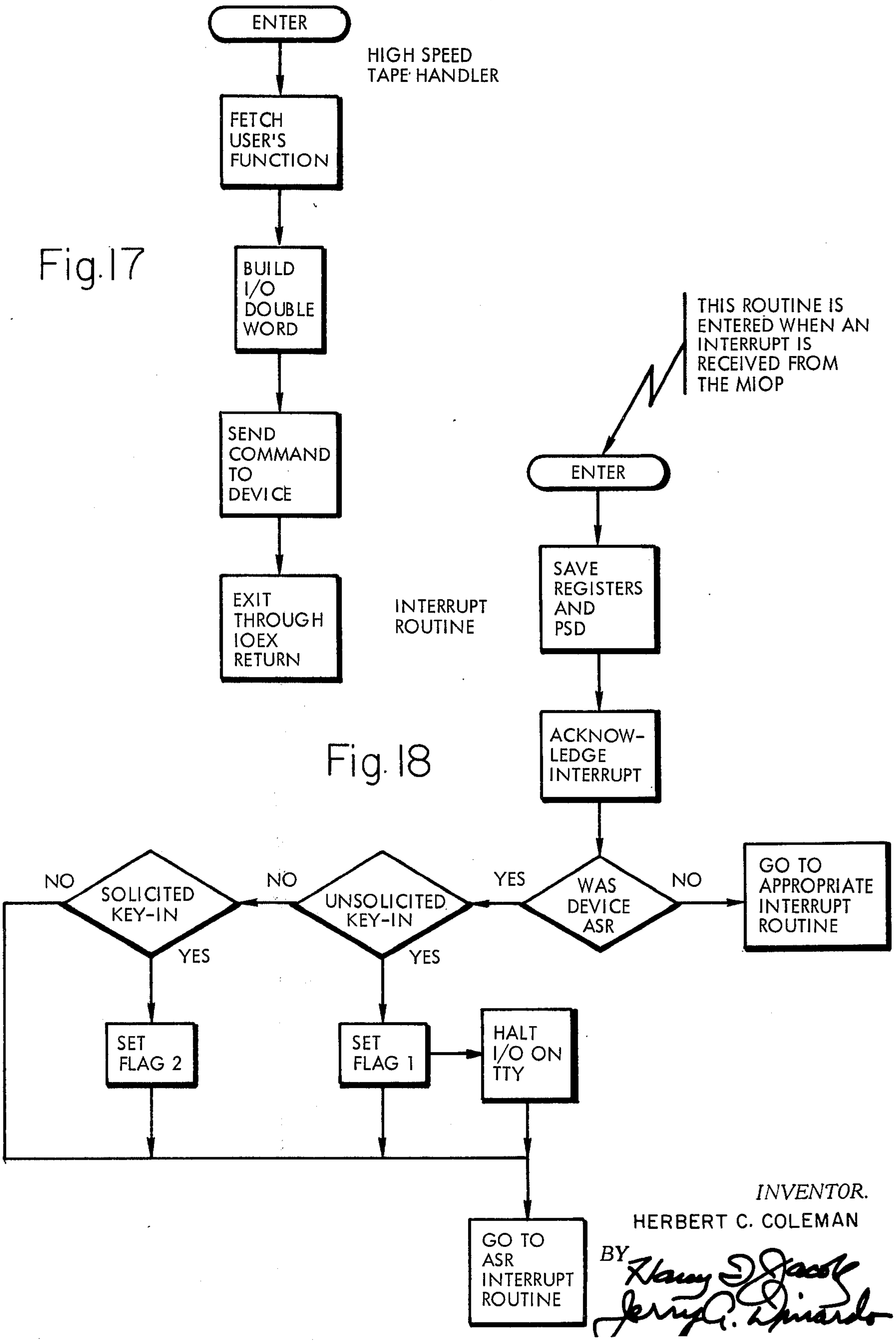
FIG. 17 is a functional flow chart of the speed paper tape handler.
FIG. 18 is a functional flow chart of the IO interrupt routine.

The Paper Tape Handler allows the user to punch and read from the high-speed paper tape device. Requests for this device are not queued and if the device is busy when the request is received, the routine will wait until the device becomes available. This routine is shown in FIG. 17 and corresponds to statement numbers 266–280 of the machine listings of Appendix B.

I/O Interrupt Routine

The I/O Interrupt intercepts the I/O interrupt, determines the source of the interrupt and branches to the appropriate routine. This routine is shown in FIG. 18 and corresponds to statement numbers 46–73 of the machine listings of Appendix B.

Return Routine

Figure 19:
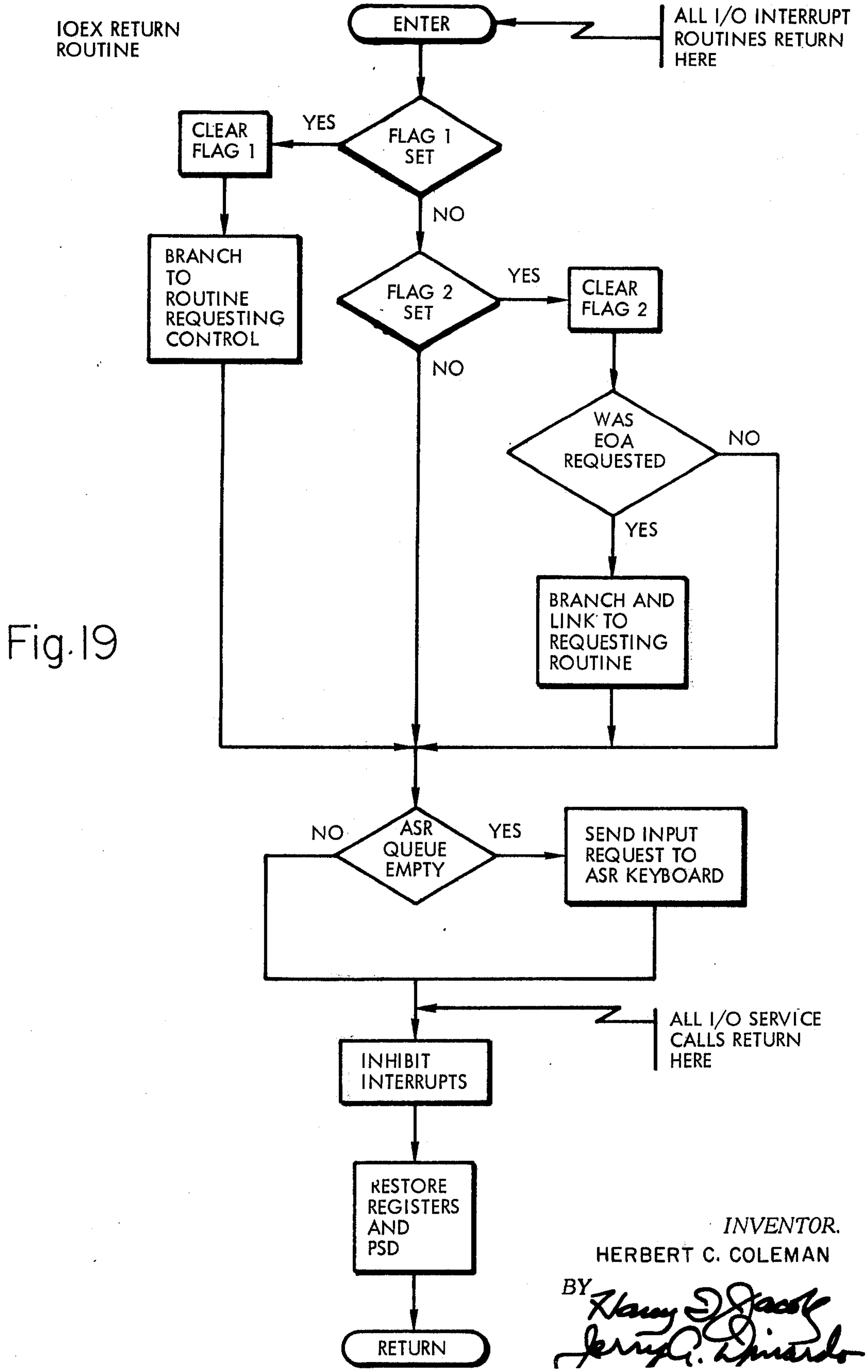
FIG. 19 is a functional flow chart of the return routine.

All calls for I/O services and all interrupt service routines return through this common return routine. This routine is shown in FIG. 19 and corresponds to statement numbers 75–100 of the machine listings of Appendix B.

b. PRINTX and SYMBO1

Output to the line printer is handled through two independent routines. The first routine buffers the messages to the printer and dumps the buffer to a print file on the RAD. The second routine transfers the information from the RAD file to the line printer on a time available basis.

PRINTX

Figures 20, 21A:
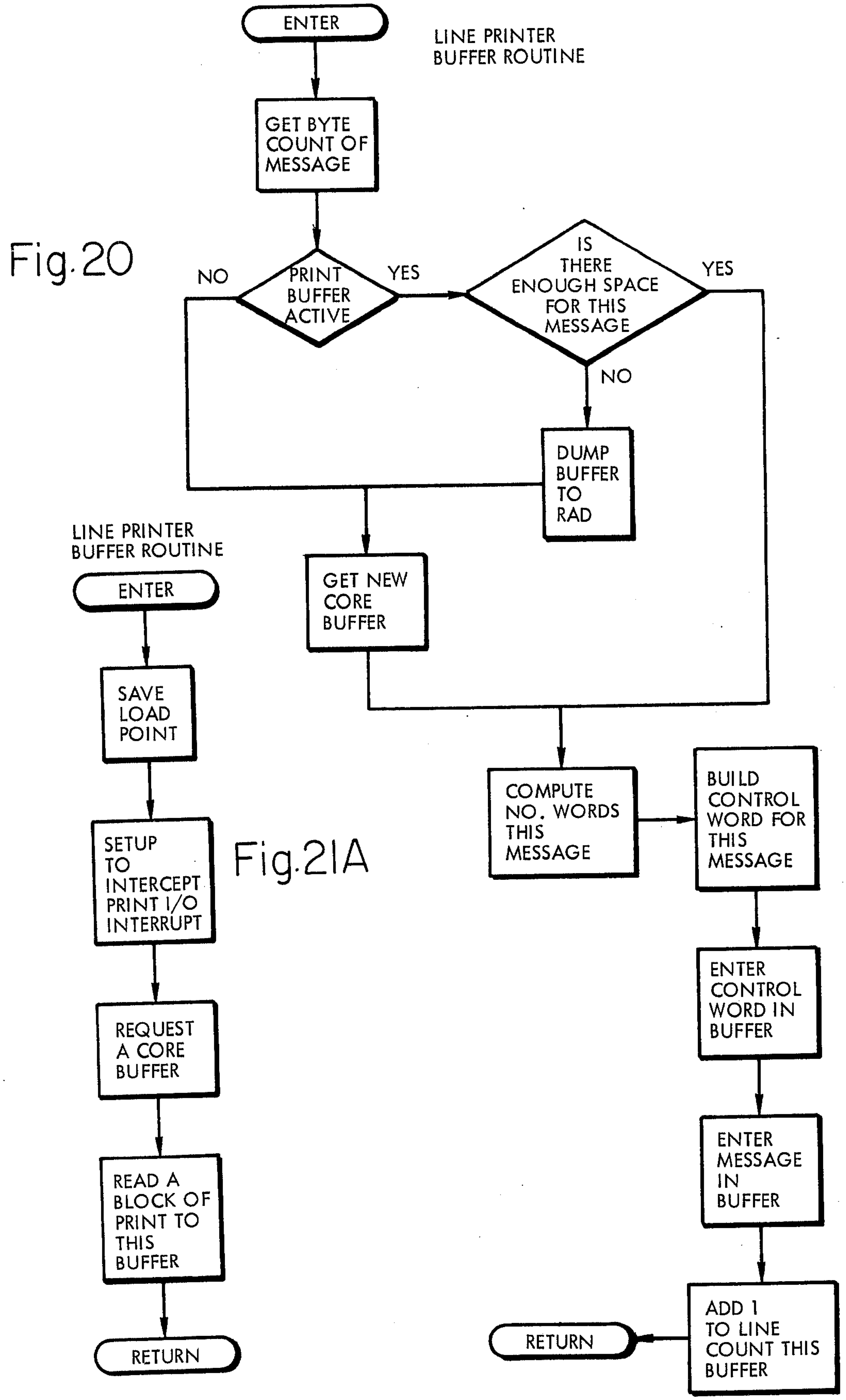
FIG. 20 comprises a functional flow chart of the PRINTX routine.
FIGS. 21A – 21C taken together comprise a functional flow chart of the SYMBOL routine.

This routine buffers the messages and dumps the buffers to a RAD file. This routine is shown in FIG. 20 and corresponds to statement numbers 1–83 of the machine listings of Appendix C.

SYMBO1

Figure 21B:
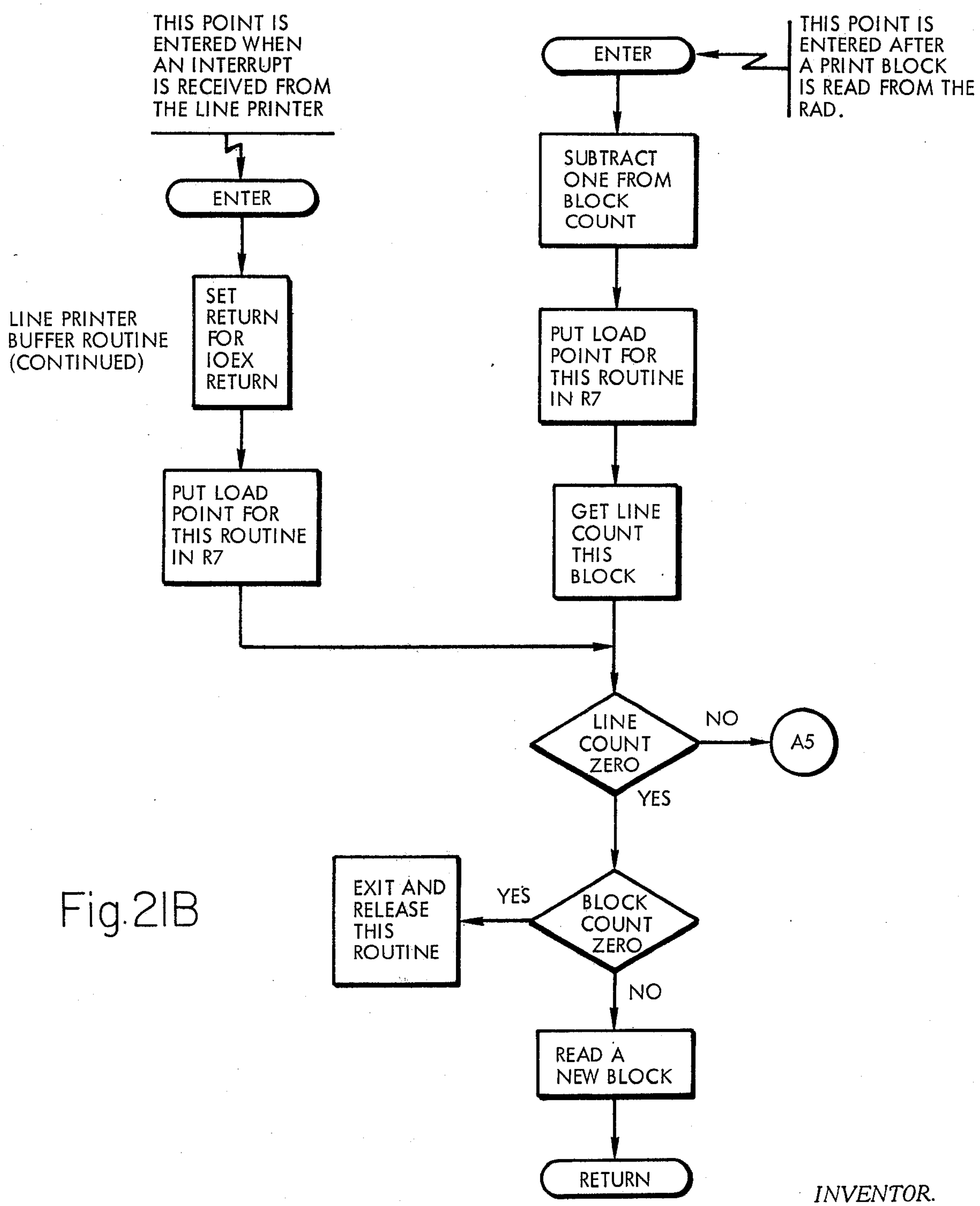
Figure 21C:
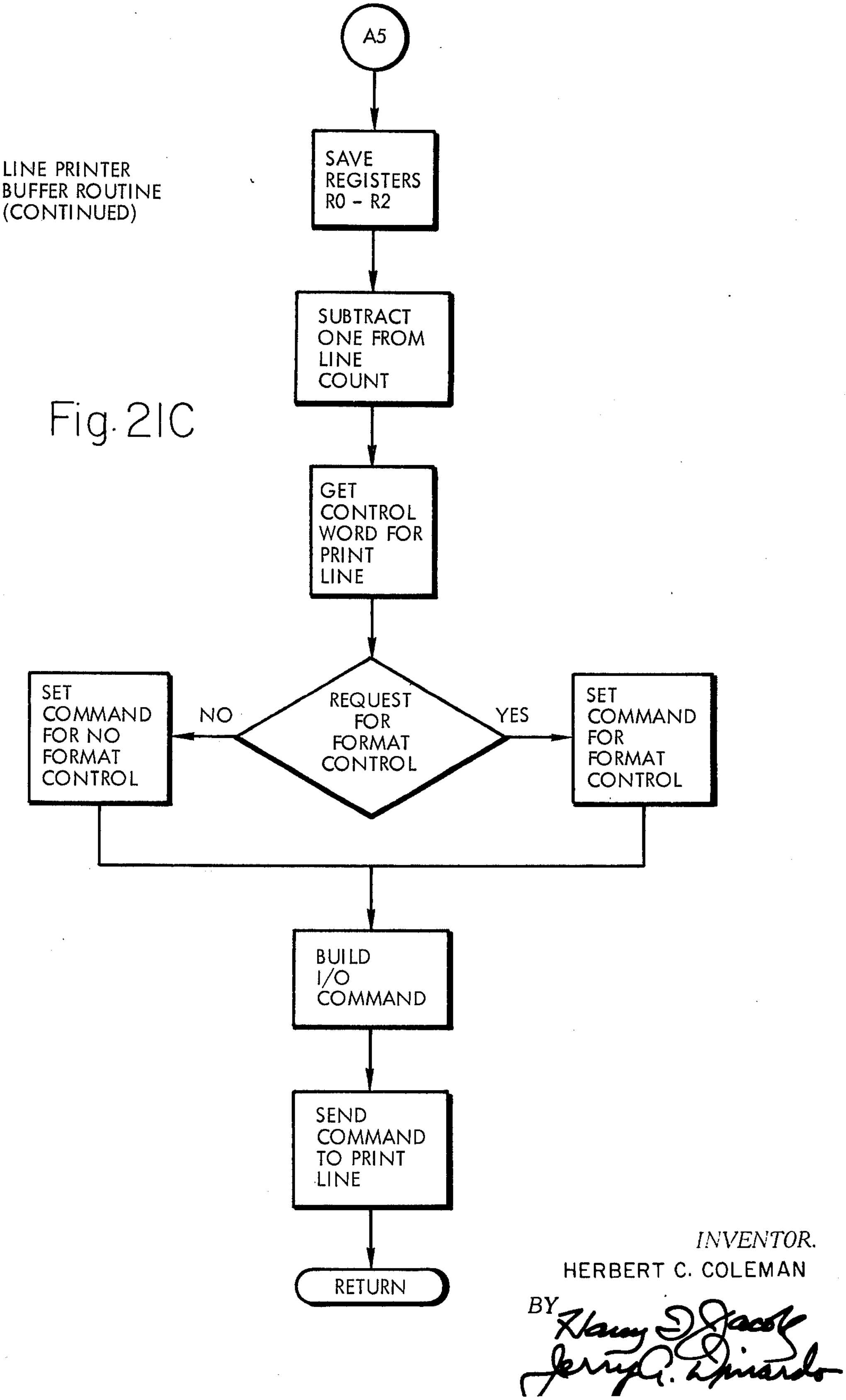
Figure 22A:
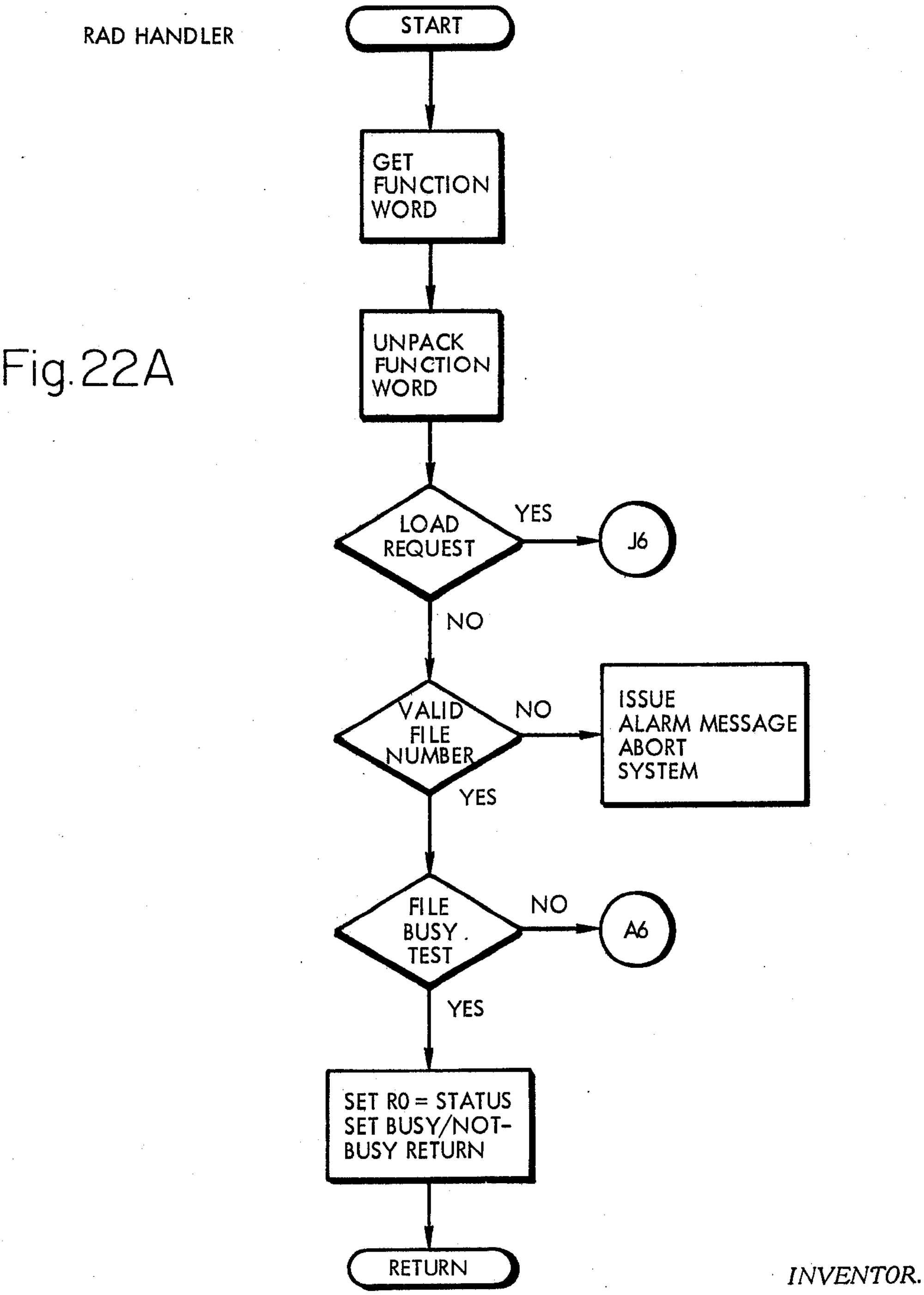
FIGS. 22A – 22F taken together comprise a functional flow chart of the RAD handler.
Figure 22B:
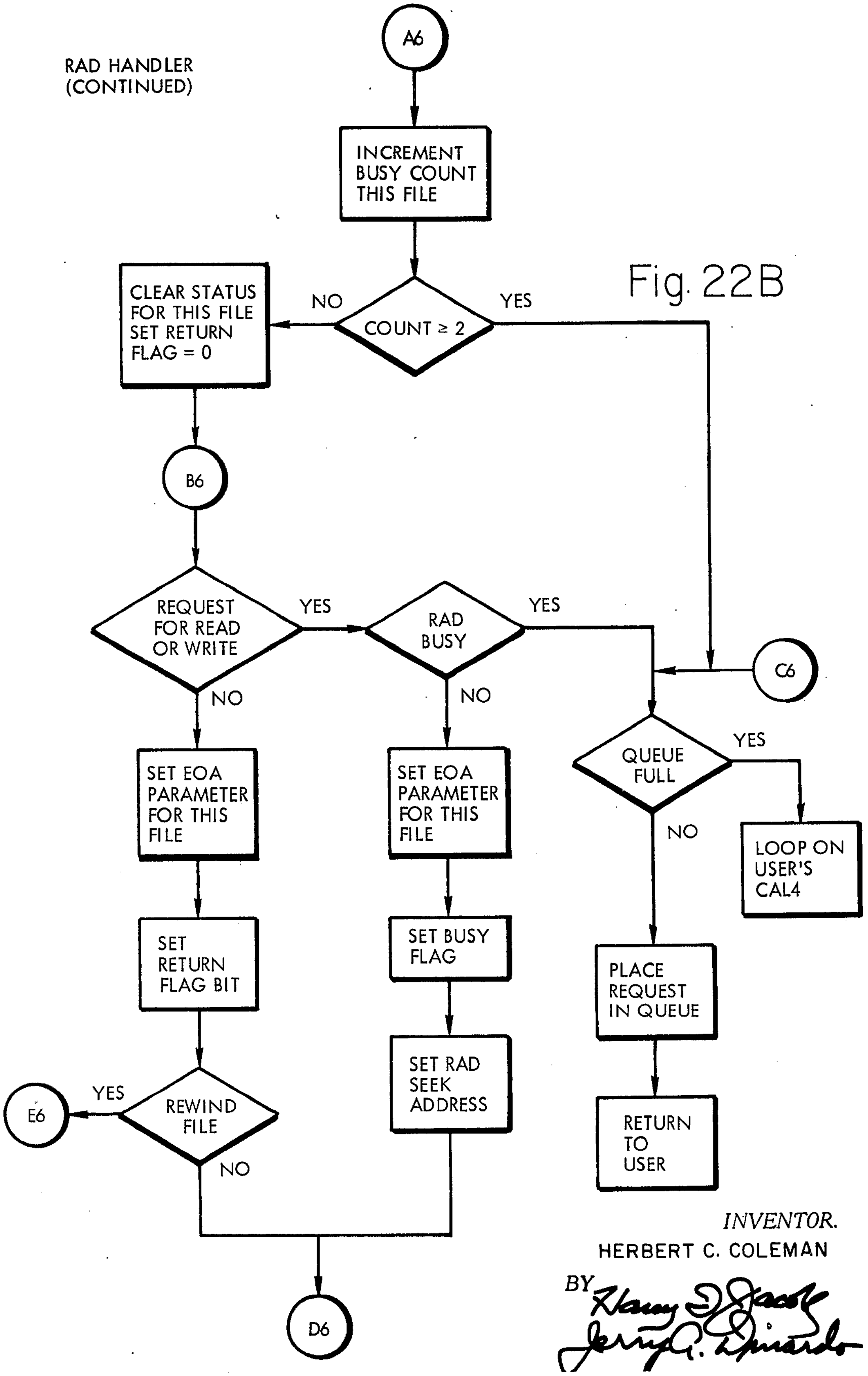
Figure 22C:
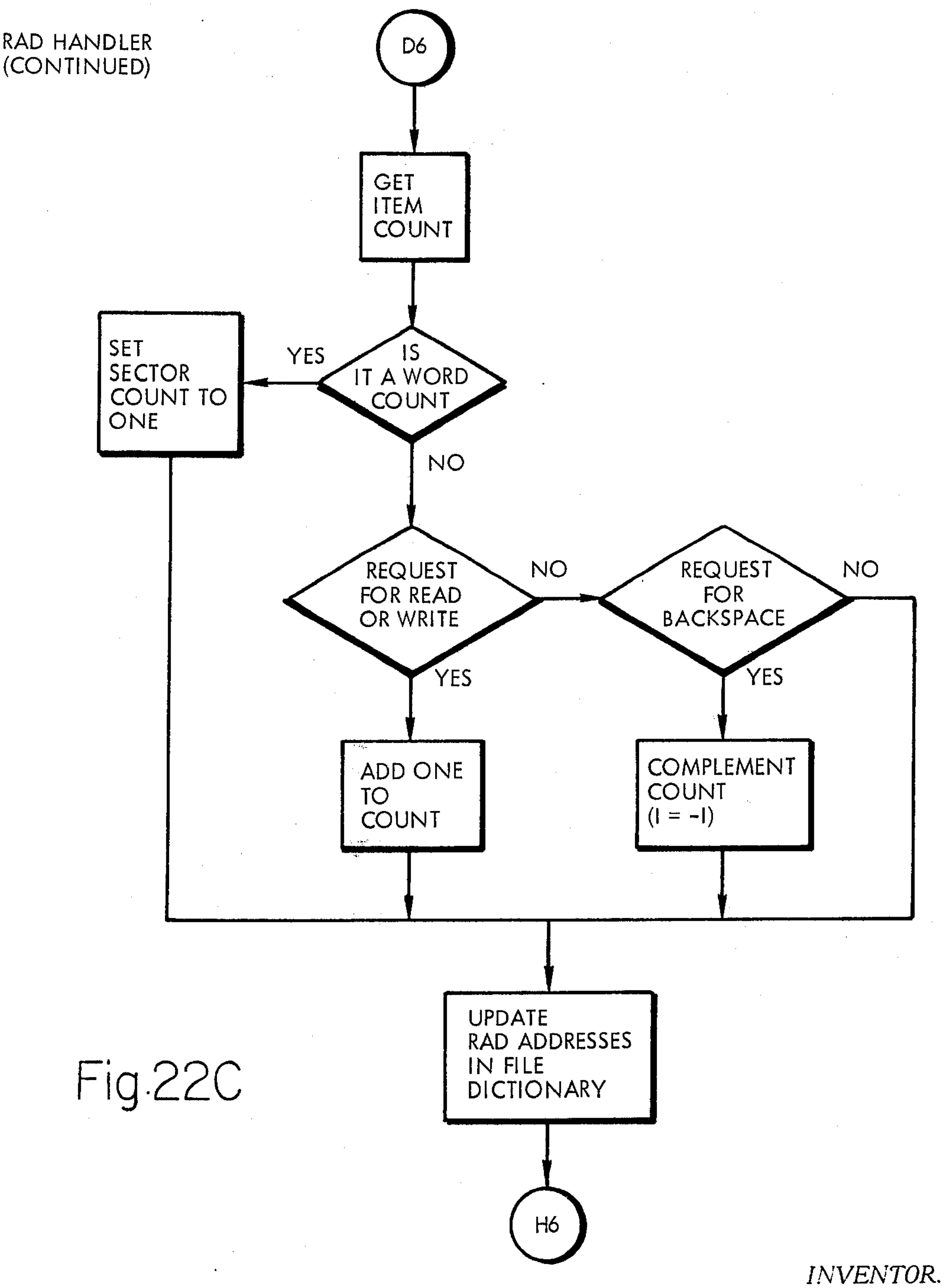
Figure 22D:
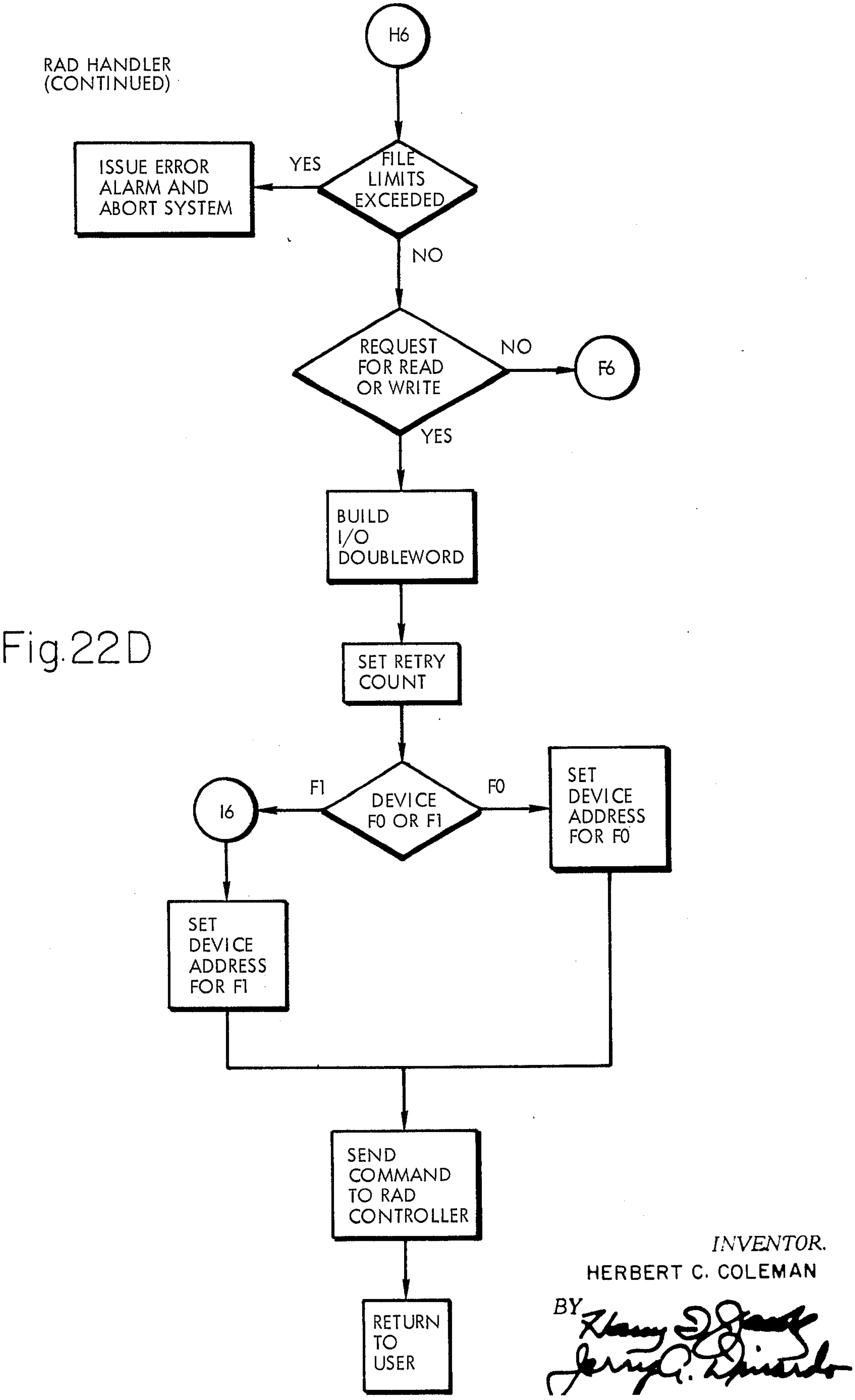
Figure 22E:
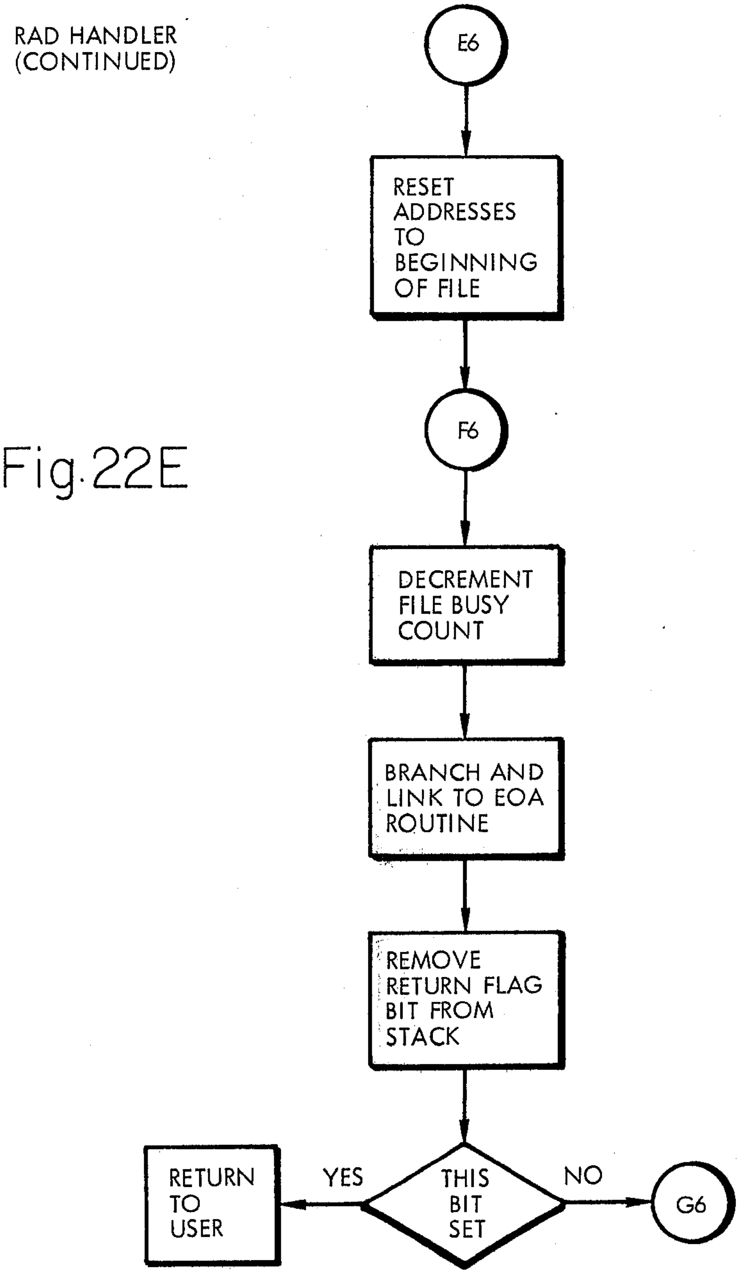
Figure 22F:
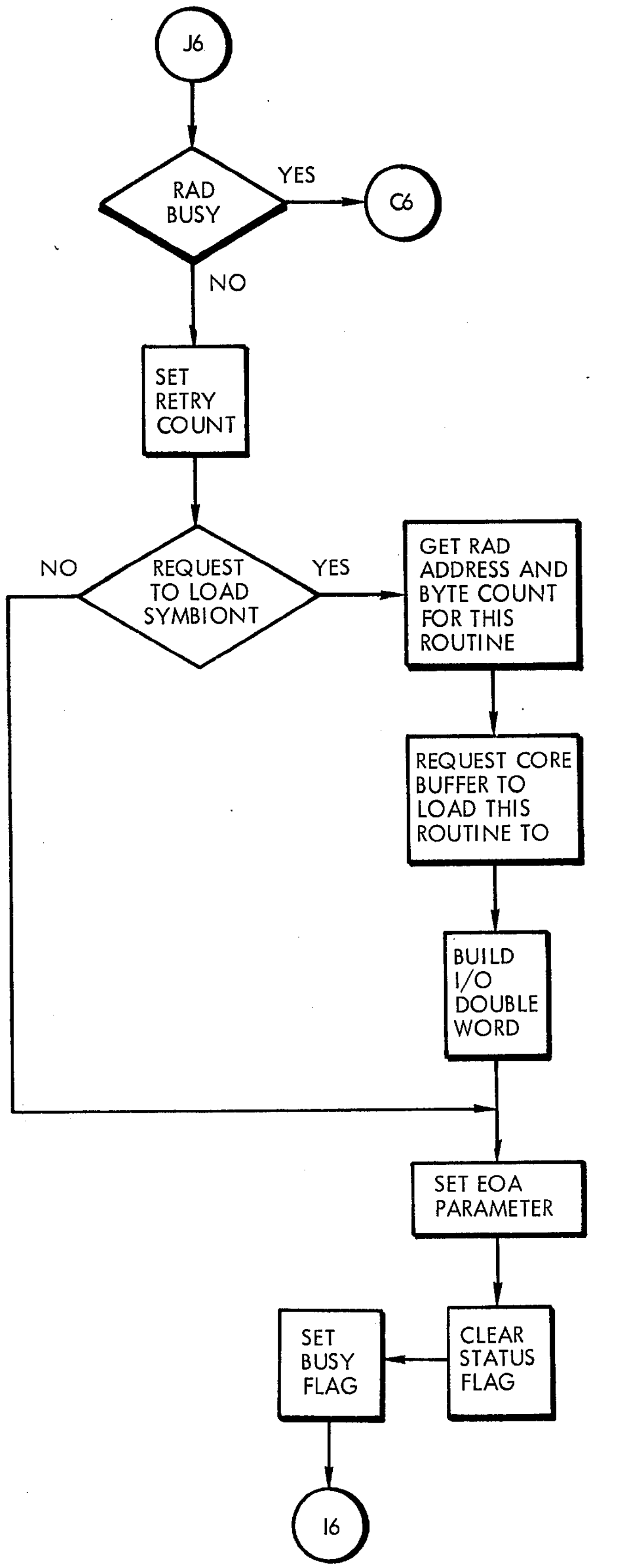

This routine reads the print file from the RAD and transfers the information to the line printer. This routine is shown in FIGS. 21A–21C and corresponds to statement numbers 1–119 of the machine listings of Appendix D.

c. RADX (RAD Handler)

This module provides the necessary interface for communicating with the RAD storage system. It is used for transferring data to and from a data file and loading background tasks and symbiont routines. This routine is shown in FIGS. 22A–22F and corresponds to statement numbers 1–313 of the machine listings of Appendix E.

Rad Handler Interrupt Routine

Figure 23A:
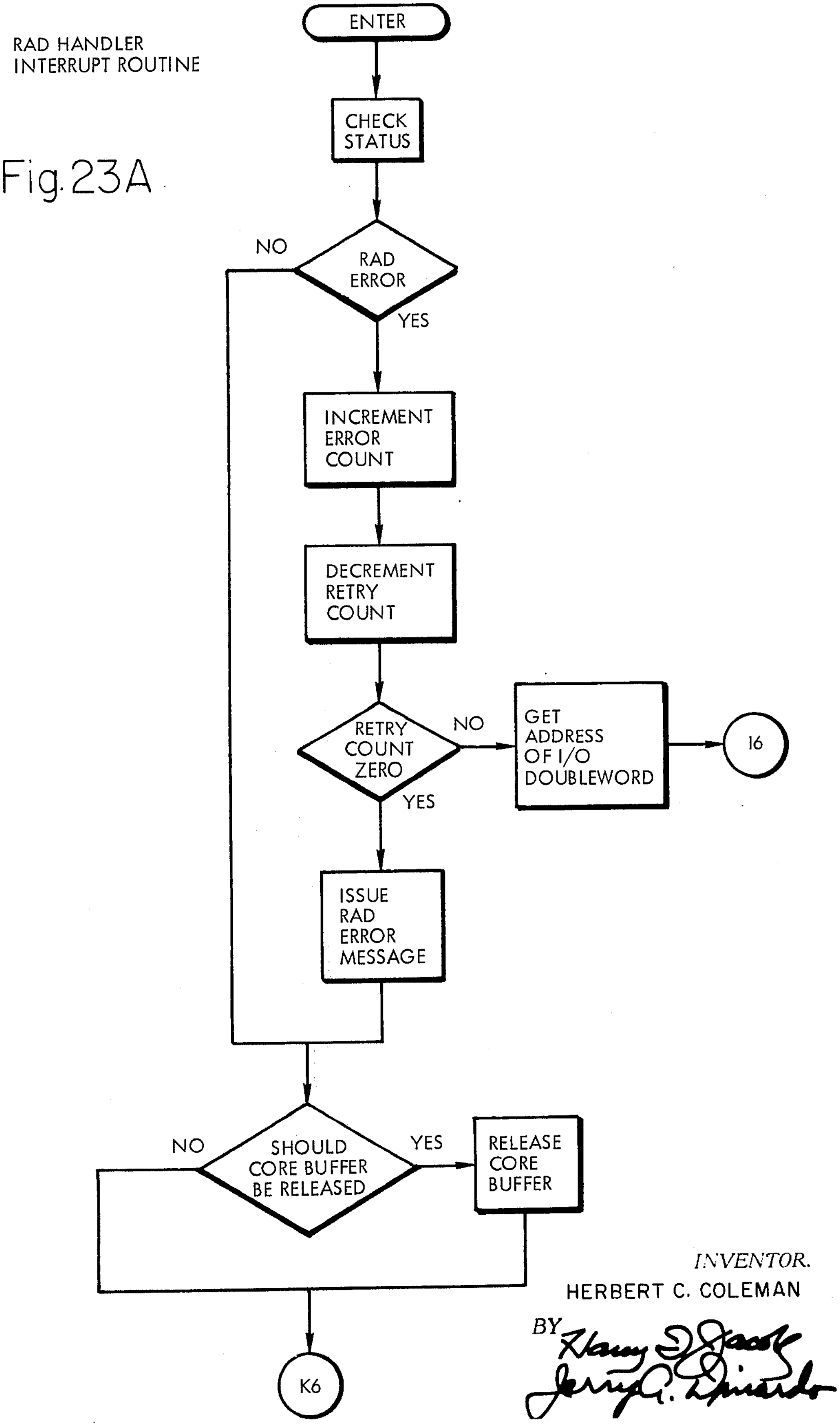
FIGS. 23A and 23B taken together comprise a functional flow chart of the RAD handler interrupt routine.
Figure 23B:
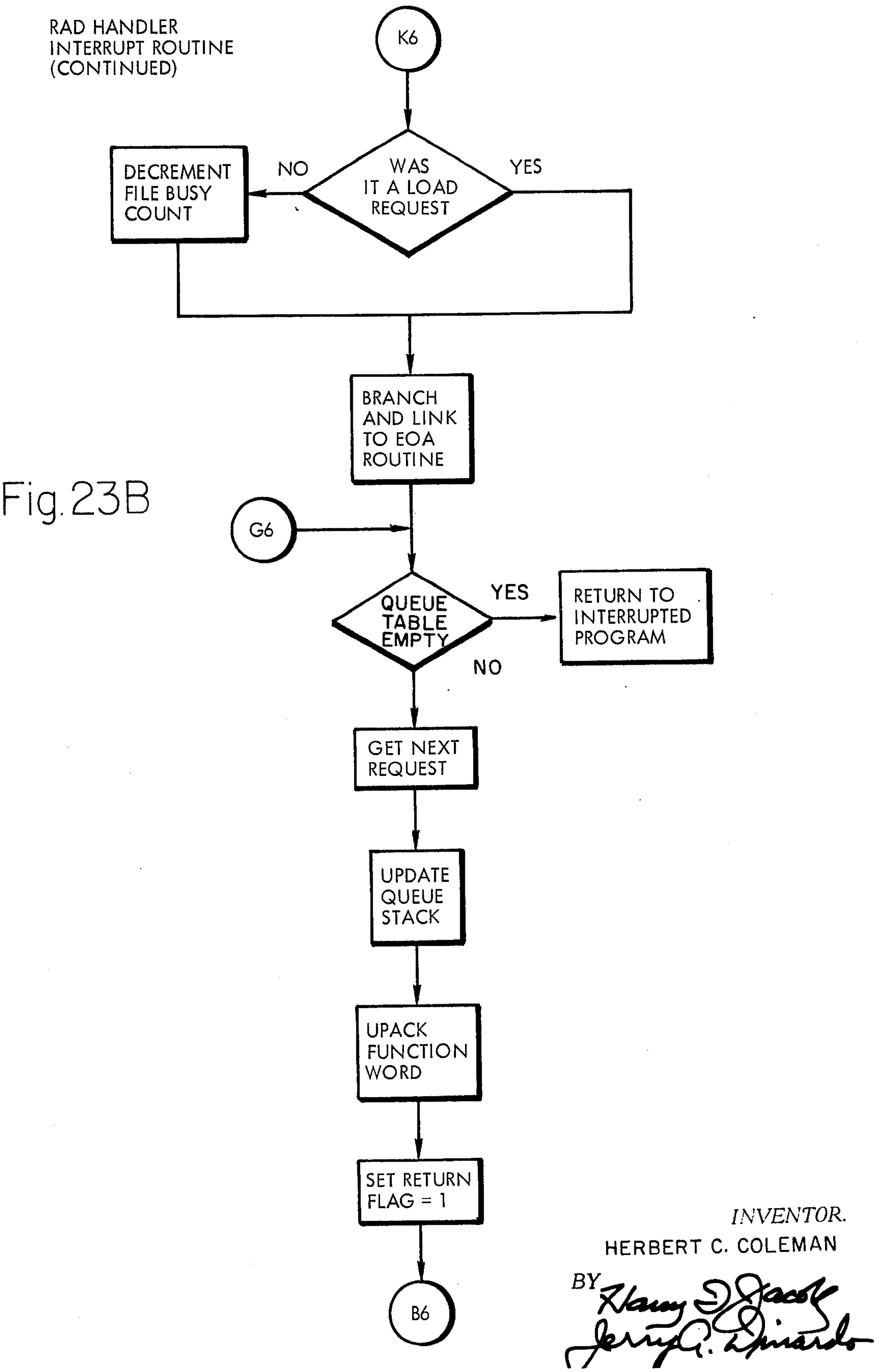

This routine is entered when an interrupt is received from the RAD system. This routine is shown in FIGS. 23A and 23B and corresponds to statement numbers 318–394 of the machine listings of Appendix E.

Rad Handler EOA Routine

Figures 24, 25A:
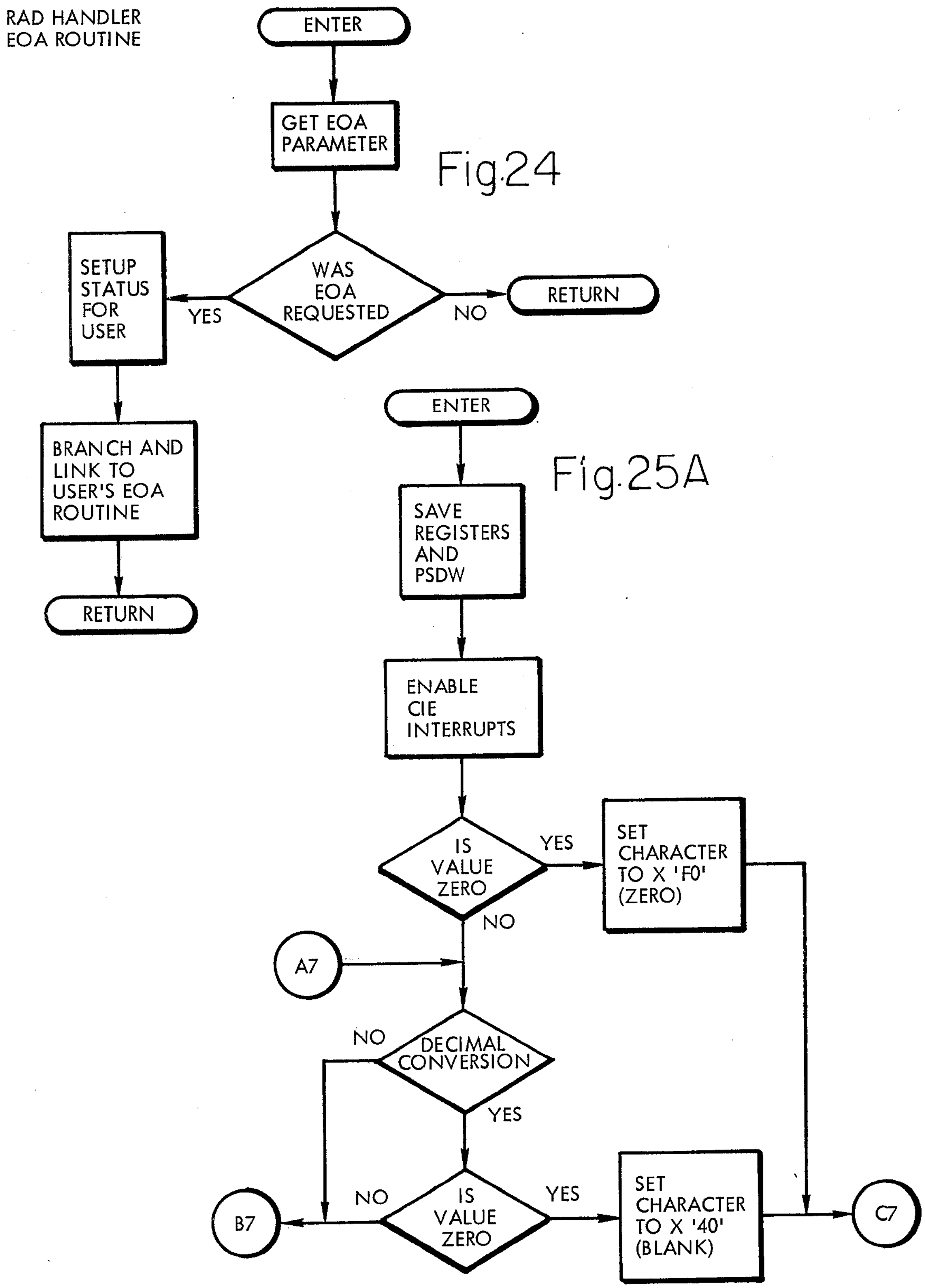
FIG. 24 is a functional flow chart of the RAD handler EOA routine.
FIGS. 25A and 25B taken together comprise a functional flow chart of the EDIT routine.

This routine is shown in FIG. 24 and corresponds to statement numbers 456–465 of the machine listings of Appendix E.

UTIL (Utility Routines)

This module consists of a group of utility routines as defined below. All routines are entered via the CAL2 instruction.

a. EDIT

Figure 25B:
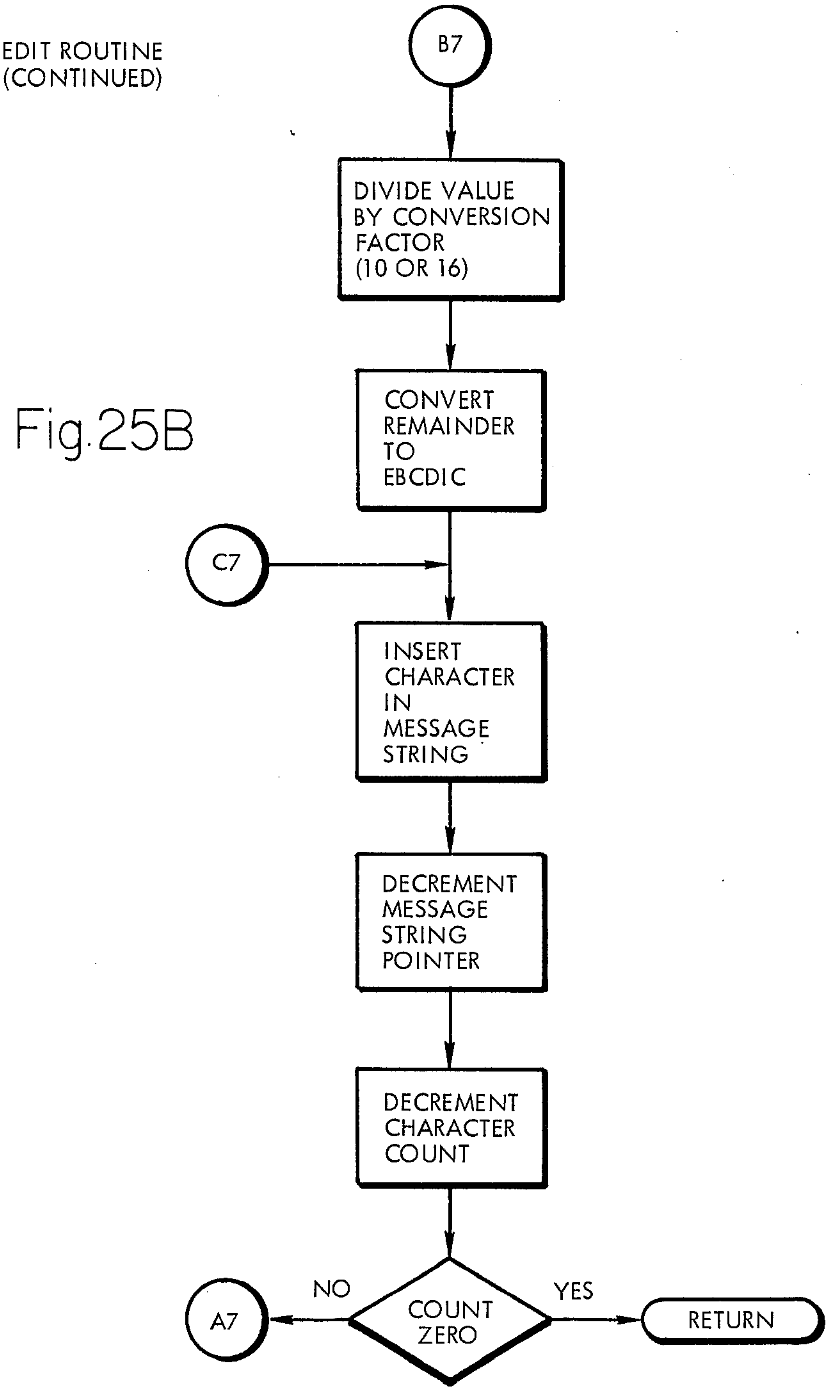

This routine edits a binary number into a message string for display purposes. The conversion is from binary to decimal or binary to hexi-decimal. This routine is shown in FIGS. 25A and 25B and corresponds to statement numbers 320–359 of the machine listings of Appendix F.

b. BLOCK DATA MOVE

Figure 26A:
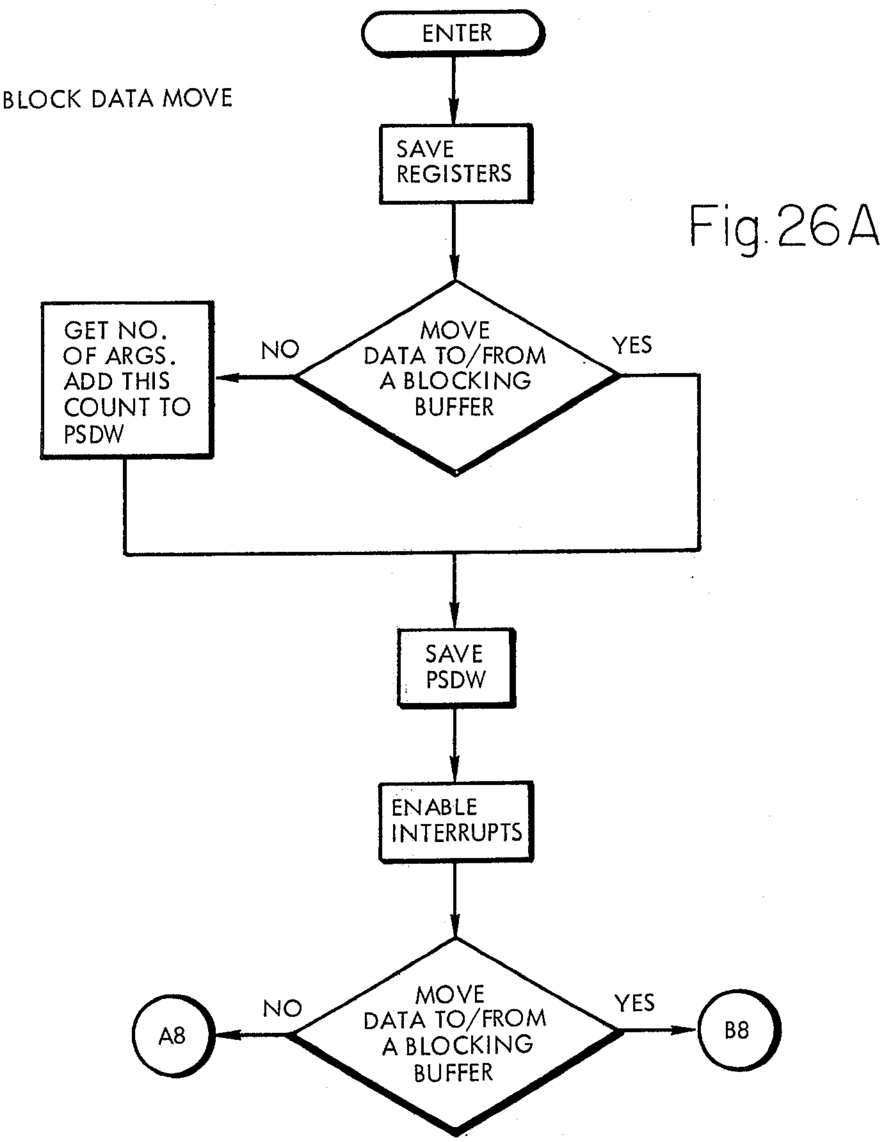
FIGS. 26A – 26C taken together comprise a functional flow chart of the BLOCK DATA MOVE routine.
Figure 26B:
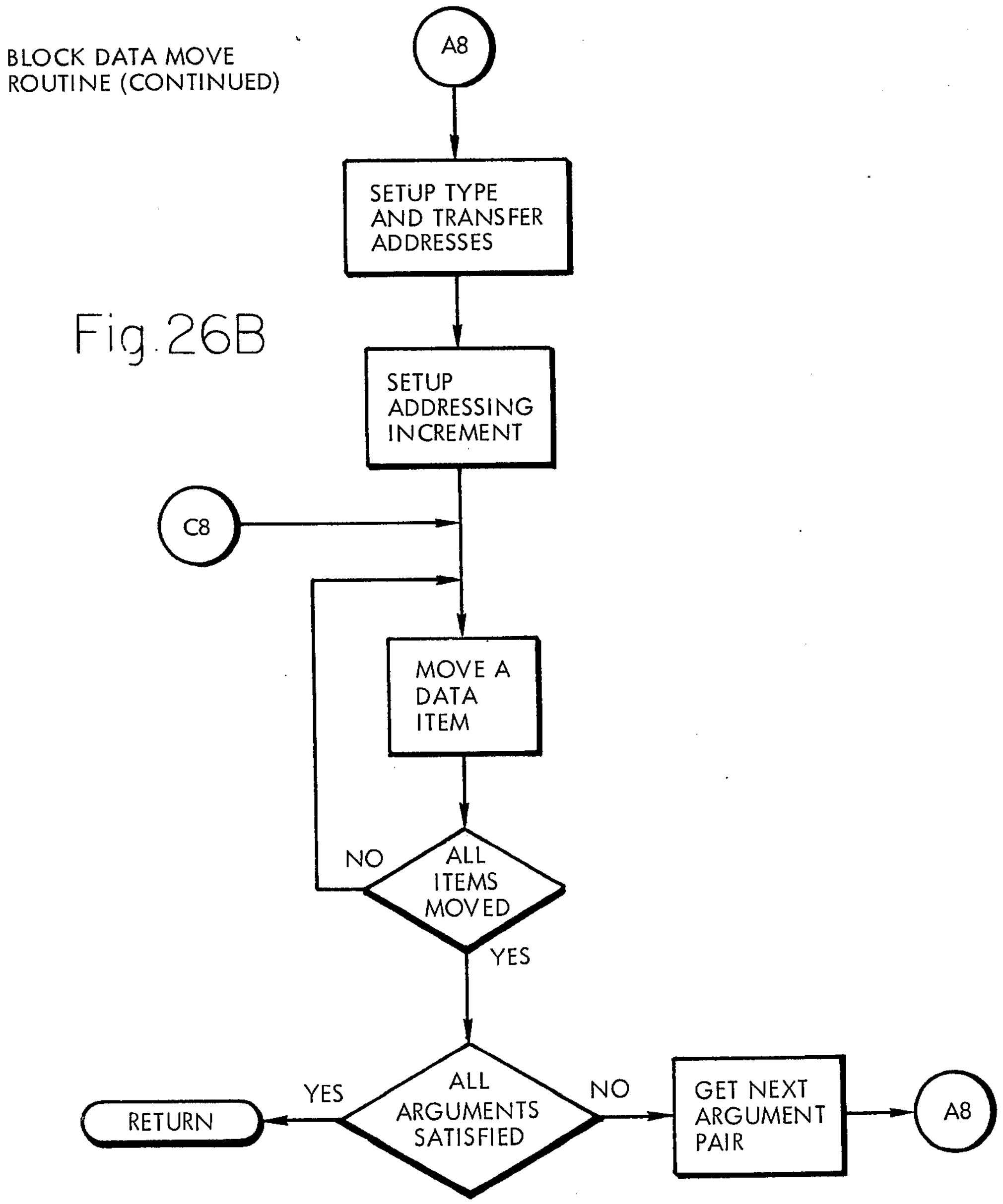
Figure 26C:
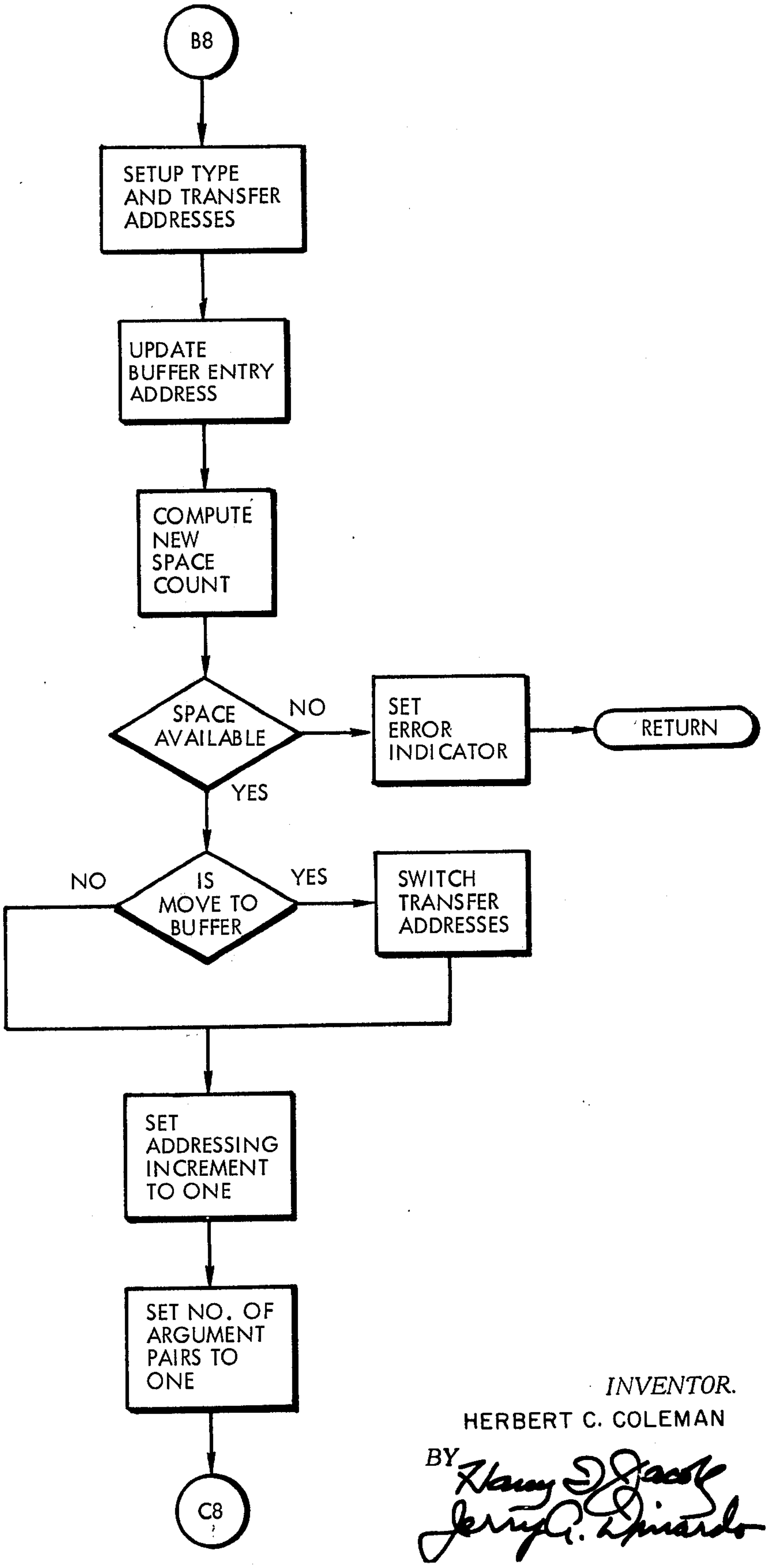

This routine transfers blocks of data from one area of core to another area of core. This routine is shown in FIGS. 26A–26C and corresponds to statement numbers 214–277 of the machine listings of Appendix F.

c. Data Conversion

Figure 27A:
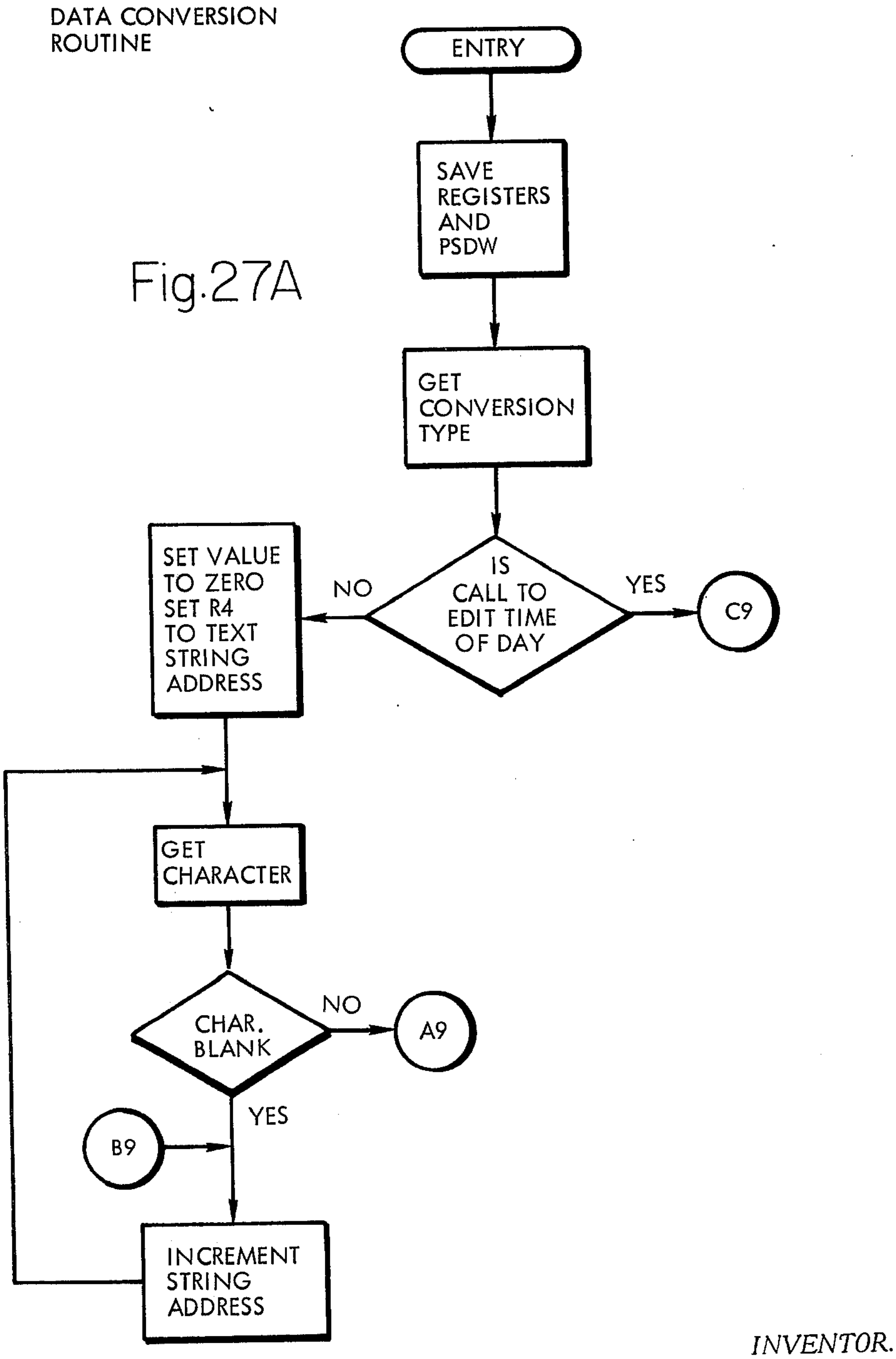
FIGS. 27A – 27C taken together comprise a functional flow chart of the data conversion routine.
Figure 27B:
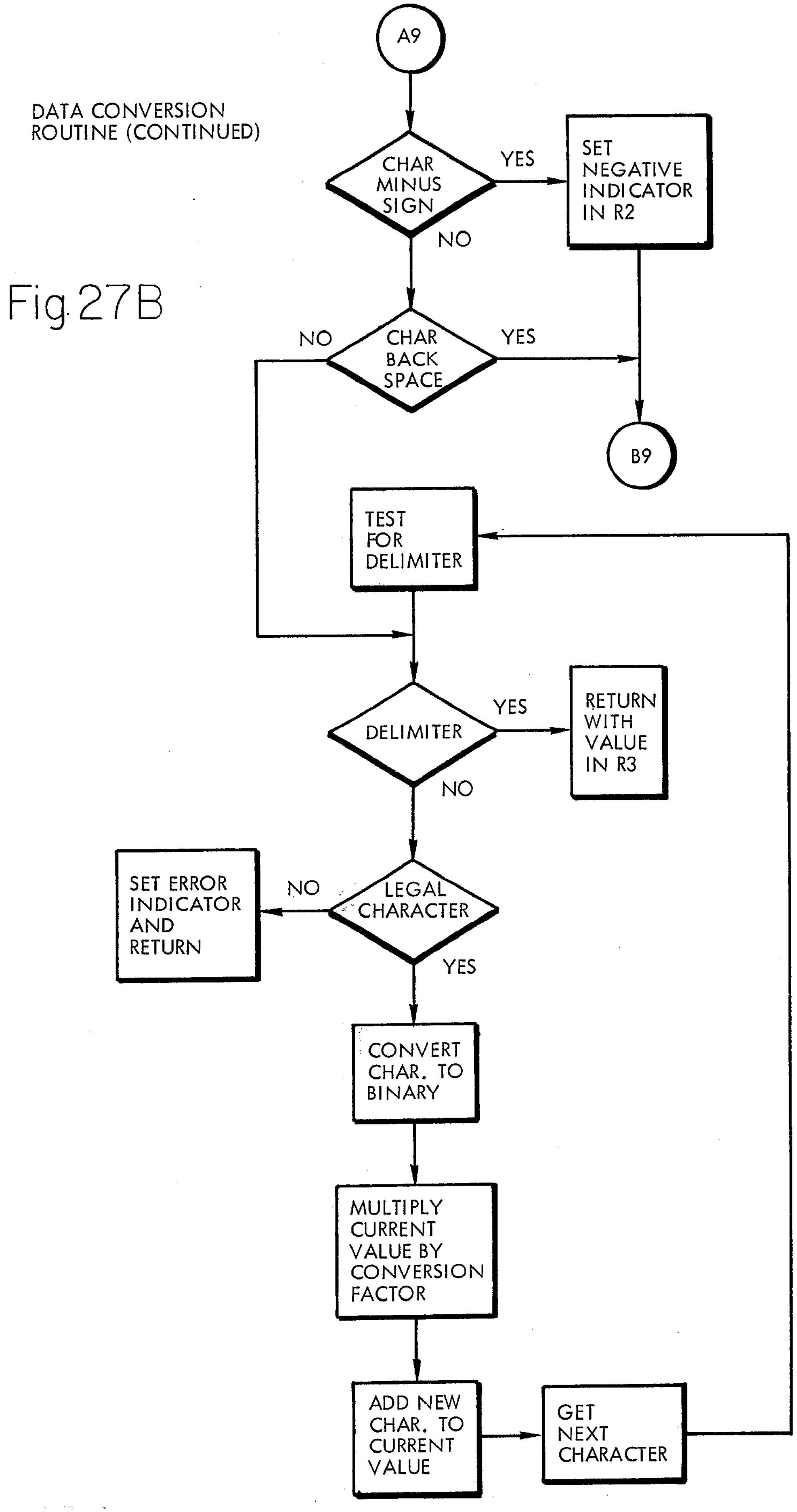
Figure 27C:
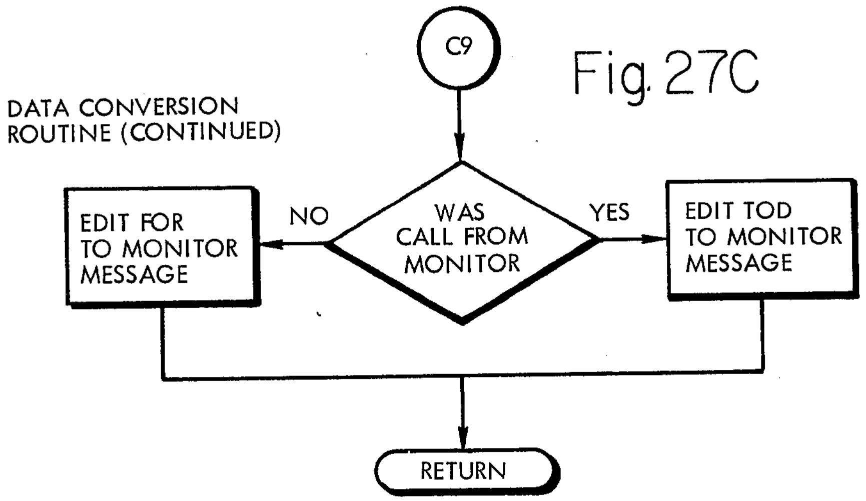

This routine converts a hexi-decimal or decimal data string to a binary number. Also included is the code to edit the time of day to a text string. Ths routine is shown in FIGS. 27A–27C and corresponds to statement numbers 123–183 of the machine listings of Appendix F.

d. Buffer Request/Release

Figure 28:
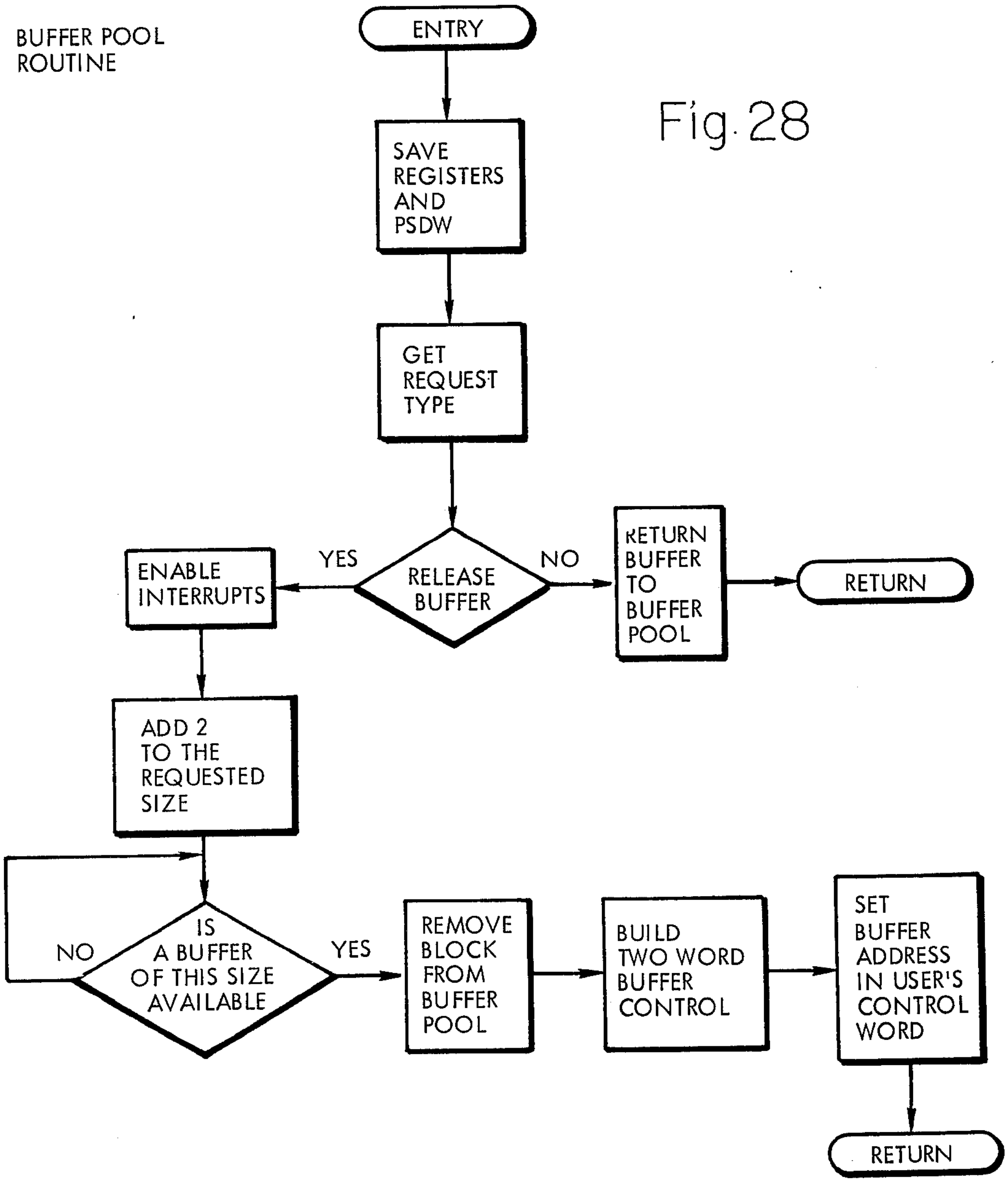
FIG. 28 is a functional flow chart of the buffer request/release routine.

This routine manages the buffer pool and services requests for blocking buffer usage. This routine is shown in FIG. 28 and corresponds to statement numbers 11–119 of the machine listings of Appendix F.

KYPROC (KEY-IN PROCESSOR)

This routine accepts all unsolicited key-ins from the keyboard and determines the function to be performed. Once the function has been determined CPU control is given up to that function. The various sections of this routine are defined below.

a. Message Interpreter

Figure 29:
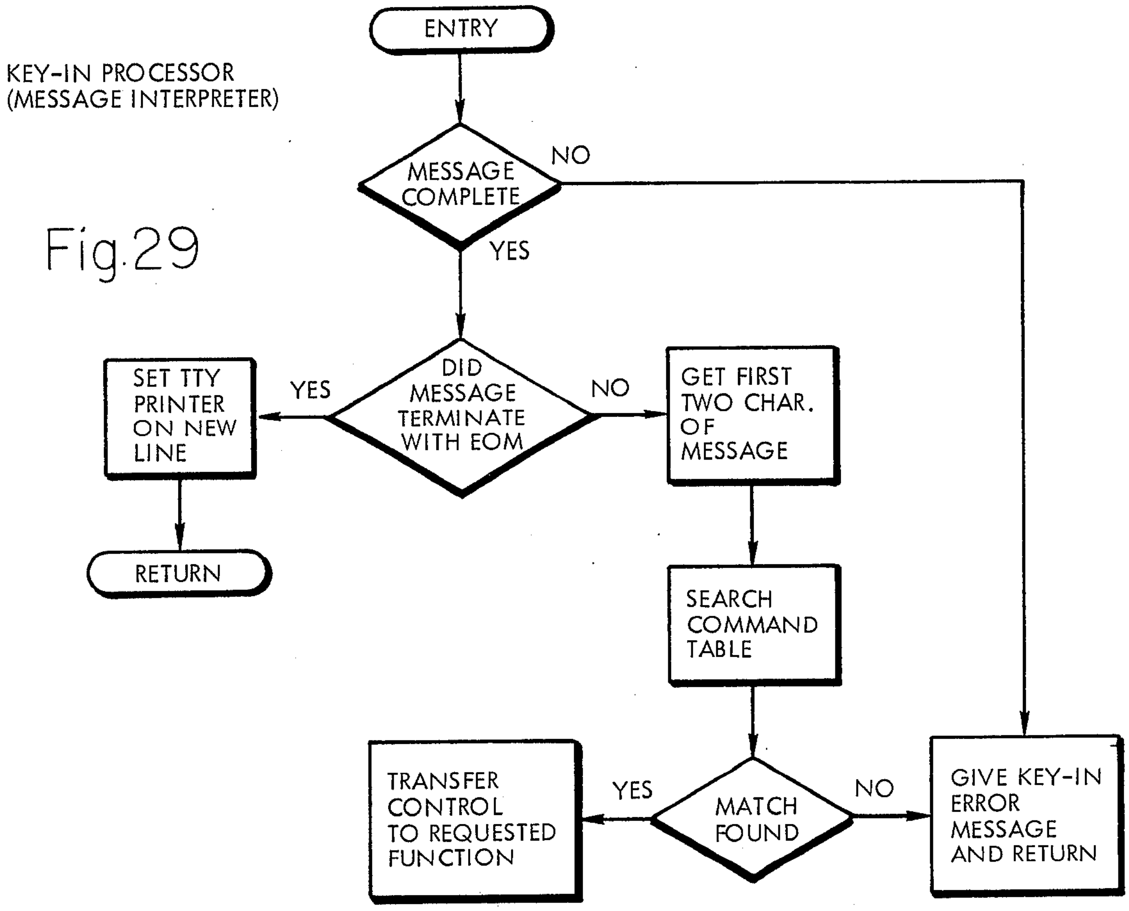
FIG. 29 is a functional flow chart of the key-in processor message interpreter routine.
Figure 30:
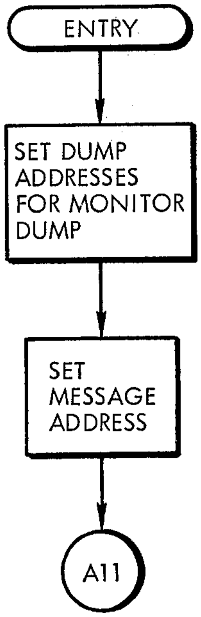
FIG. 30 is a functional flow chart of the key-in processor dump monitor routine.

This section of the routine is entered each time an unsolicited message is received. This routine is shown in FIG. 29 and corresponds to statement numbers 18–32 of the machine listings of Appendix G.

b. Dump Monitor (DM)

when this section is entered the memory dump registers are set to reflect the core limits of the monitor and the dump routine is entered. This routine is shown in FIG. 30 and corresponds to statement numbers 280–287 of the machine listings of Appendix G.

c. Dump Background (DB)

Figures 31, 32:
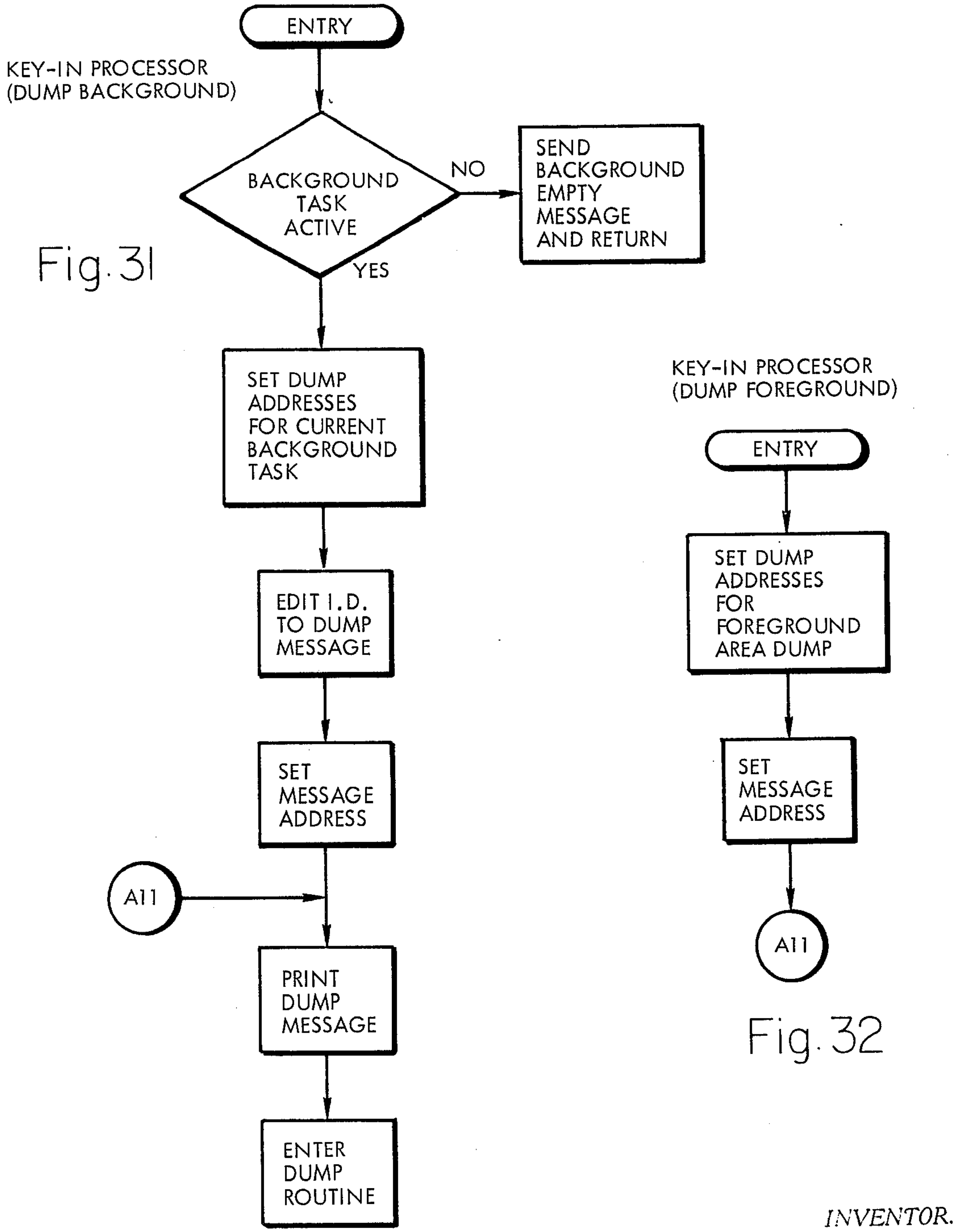
FIG. 31 is a functional flow chart of the key-in processor dump background routine.
FIG. 32 is a functional flow chart of the key-in processor dump foreground routine.

When this section is entered the memory dump registers are set to reflect the core limits of the currently active background task and the dump routine is entered. This routine is shown in FIG. 31 and corresponds to statement numbers 247–279 of the machine listings of Appendix G.

d. Dump Foreground (DF)

When this section is entered the memory dump registers are set to reflect the core limits of the foreground area and the dump routine is entered. This routine is shown in FIG. 32 and corresponds to statement numbers 288–297 of the machine listings of Appendix G.

e. Set Dump Addresses (SA)

Figure 33:
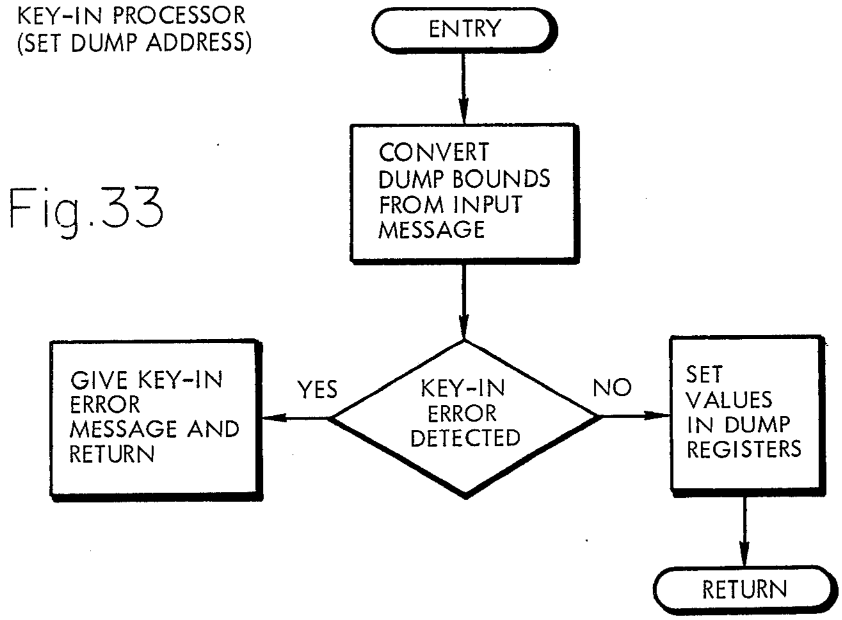
FIG. 33 is a functional flow chart of the key-in processor set dump addresses routine.

When this section is entered the memory dump registers are set to the limits specified in the message. This routine is shown in FIG. 33 and corresponds to statement numbers 314–317 of the machine listings of Appendix G.

f. Dump Memory (DP)

Figure 34:
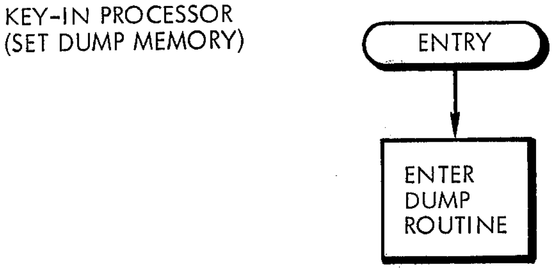
FIG. 34 is a functional flow chart of the key-in processor dump memory routine.

When this section is entered memory is dumped between the limits specified in the memory dump registers. This routine is shown in FIG. 34 and corresponds to statement numbers 229–230 of the machine listings of Appendix G.

g. Set Register Dump Flag (RG)

Figure 35:
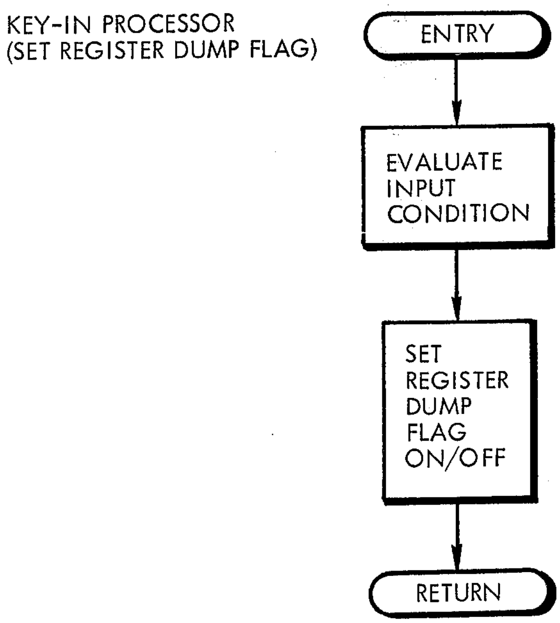
FIG. 35 is a functional flow chart of the key-in processor set dump register flag routine.

When this section is entered the register dump flag is set to the specified on/off condition. This routine is shown in FIG. 35 and corresponds to statement numbers 304–313 of the machine listings of Appendix G.

h. Set Time of Day (ST)

Figure 36:
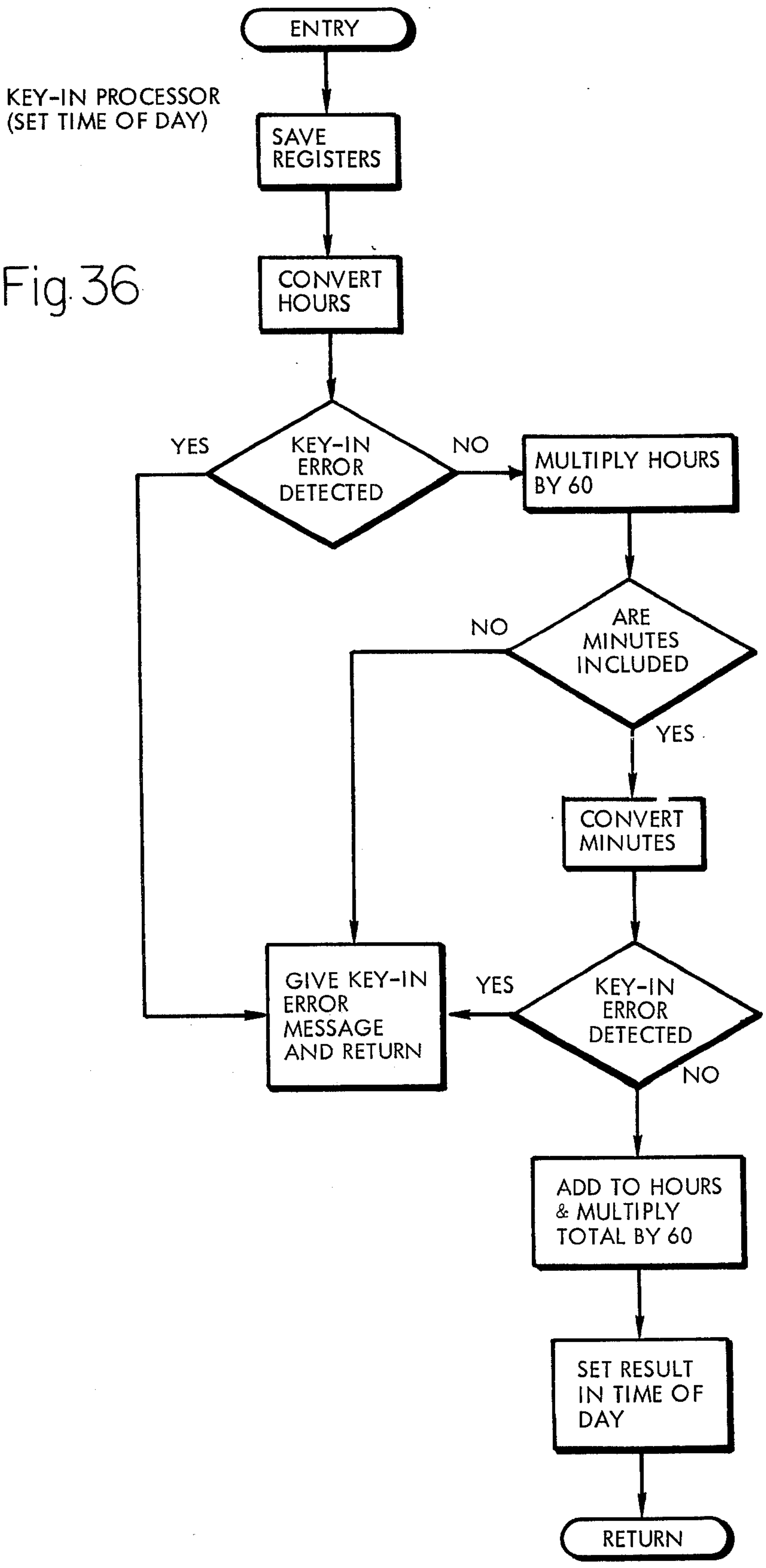
FIG. 36 is a functional flow chart of the key-in processor set time of day routine.

When this section is entered the internal time of day clock is set to the time specified in the input message. This routine is shown in FIG. 36 and corresponds to statement numbers 199–222 of the machine listings of Appendix G.

i. Request Time of Day (TI)

Figure 37:
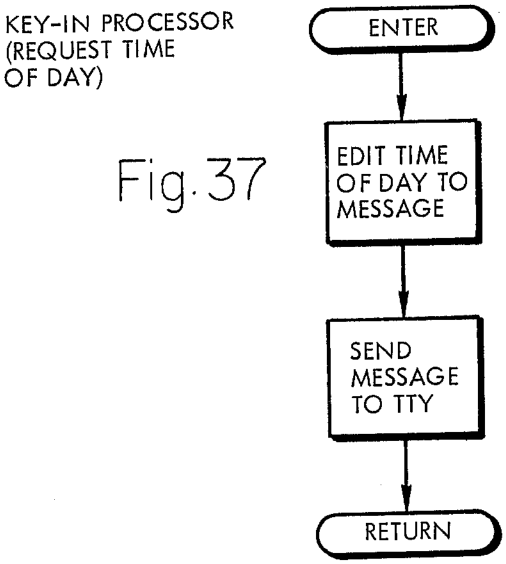
FIG. 37 is a functional flow chart of the key-in processor request time of day routine.

When this section is entered the current time of day is printed on the TTY. This routine is shown in FIG. 37 and corresponds to statements 223–228 of the machine listings of Appendix G.

j. Request to Run Background Task (BG)

Figure 38:
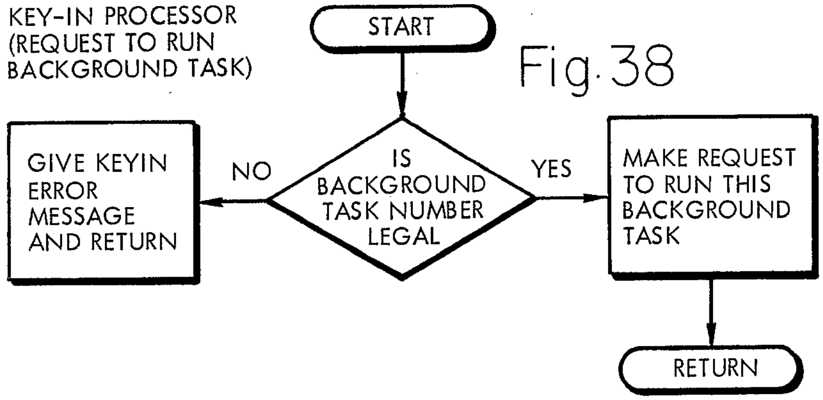
FIG. 38 is a functional flow chart of the key-in processor request to run background task routine.

When this section is entered a request to load and run the specified background task is sent to the background task scheduler. This routine is shown in FIG. 38 and corresponds to statements 54–60 of the machine listings of Appendix G.

k. WAIT (WA)

Figure 39:
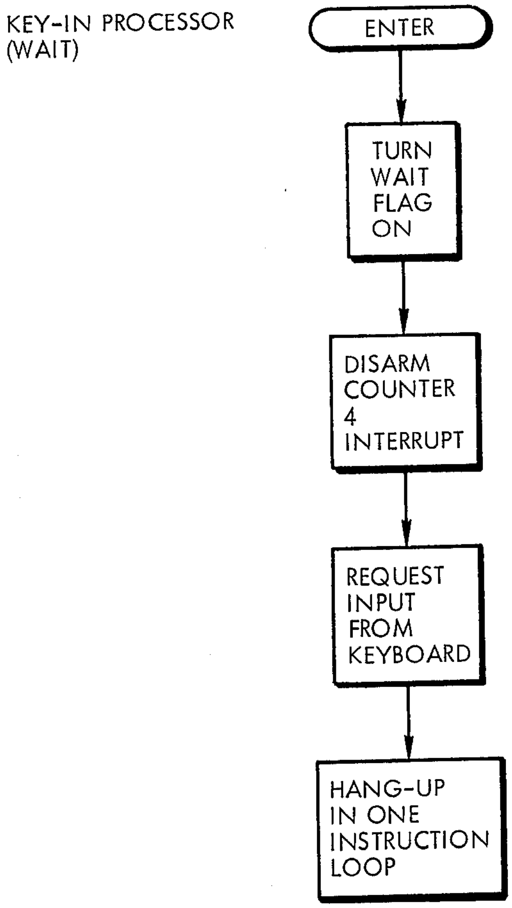
FIG. 39 is a functional flow chart of the key-in processor WAIT routine.

When this section is entered the system is placed in a wait state. This routine is shown in FIG. 39 and corresponds to statement numbers 191–198 of the machine listings of Appendix G.

l. GO (GO)

Figures 40, 41:
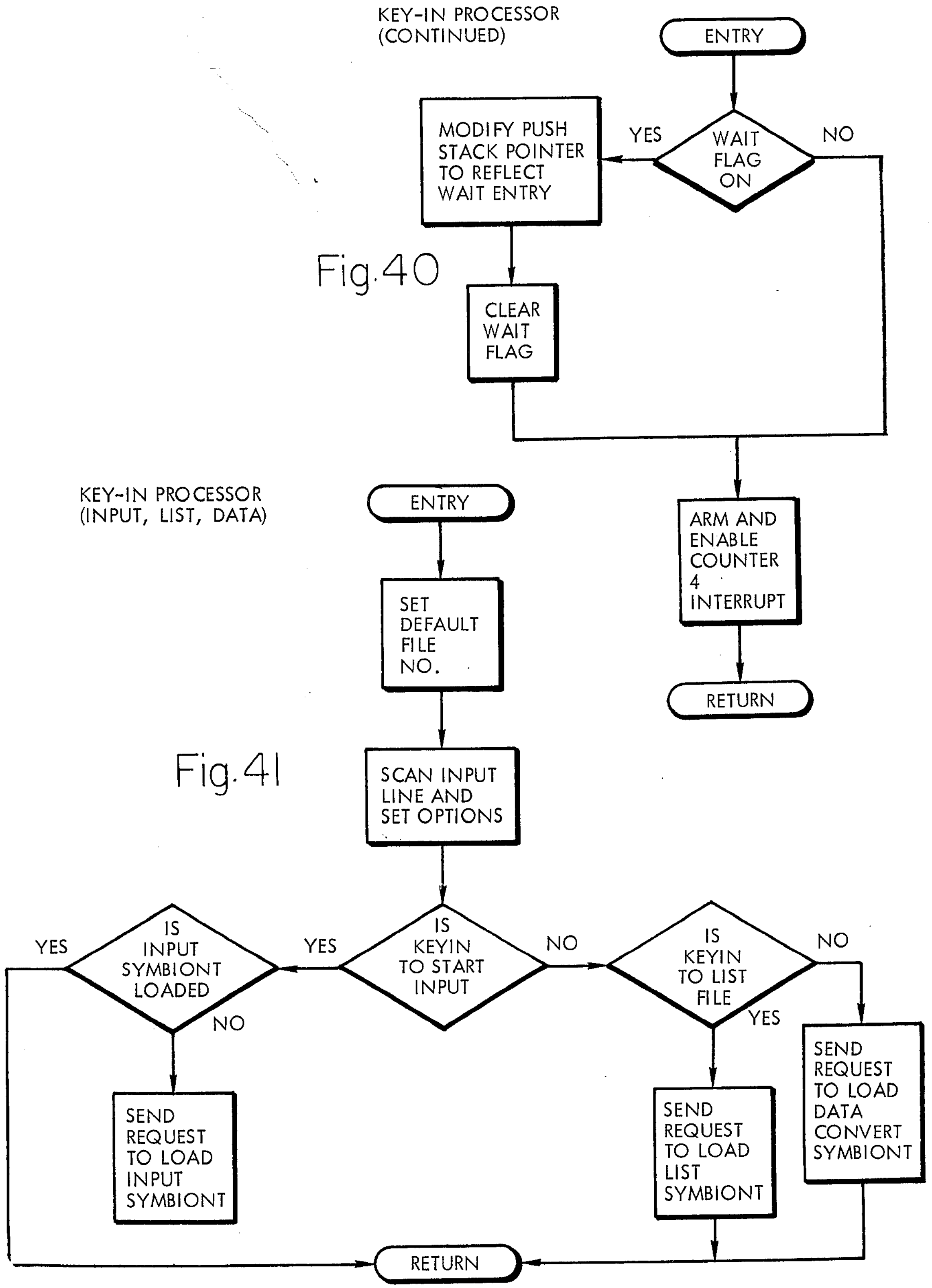
FIG. 40 is a functional flow chart of the key-in processor GO routine.
FIG. 41 is a functional flow chart of the key-in processor INPUT, LIST, DATA routine.

When this section is entered the system is released from the wait state and execution is resumed. This routine is shown in FIG. 40 and corresponds to statement numbers 231–244 of the machine listings of Appendex G.

m. INPUT, LIST, DATA (IN,LI,DA)

When this section is entered the appropriate module of the On-Line Communications package is loaded and executed. This routine is shown in FIG. 41 and corresponds to statement numbers 136–190 of the machine listings of Appendix G.

n. Display Data (DD)

Figure 42:
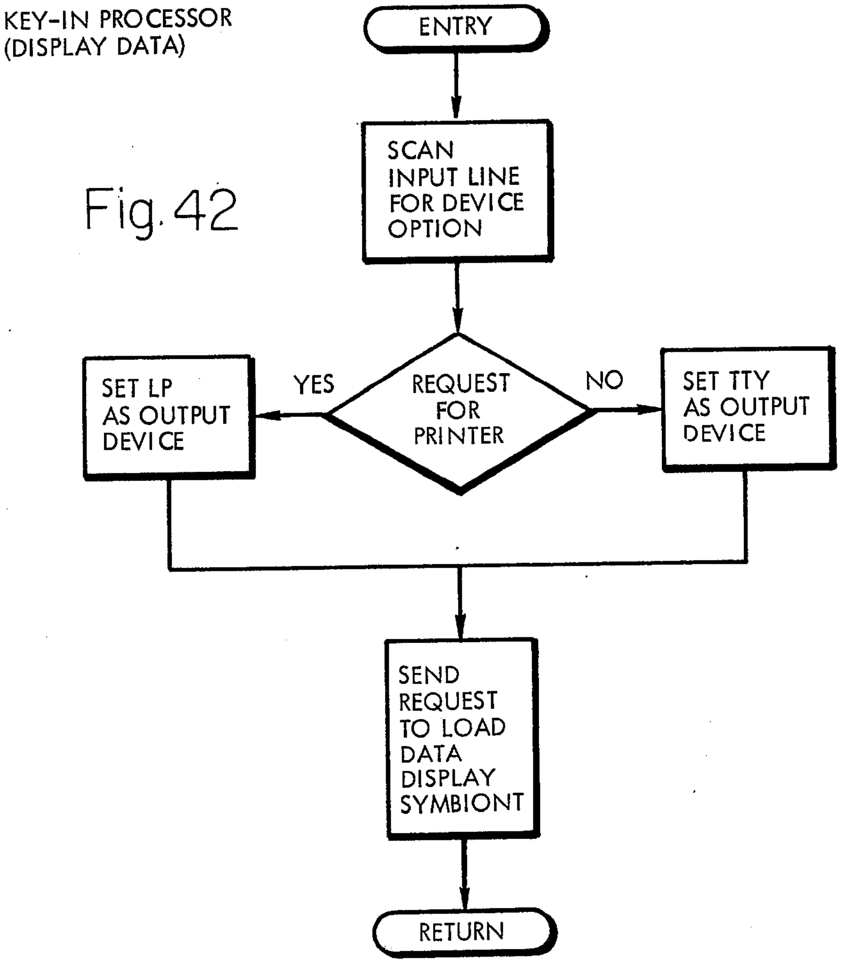
FIG. 42 is a functional flow chart of the key-in processor display data routine.

When this section is enterd the display module of the On-Line Communications package is loaded and executed. This routine is shown in FIG. 42 and corresponds to statement numbers 494–508 of the machine listings of Appendix G.

o. Restart System (RS)

Figure 43:
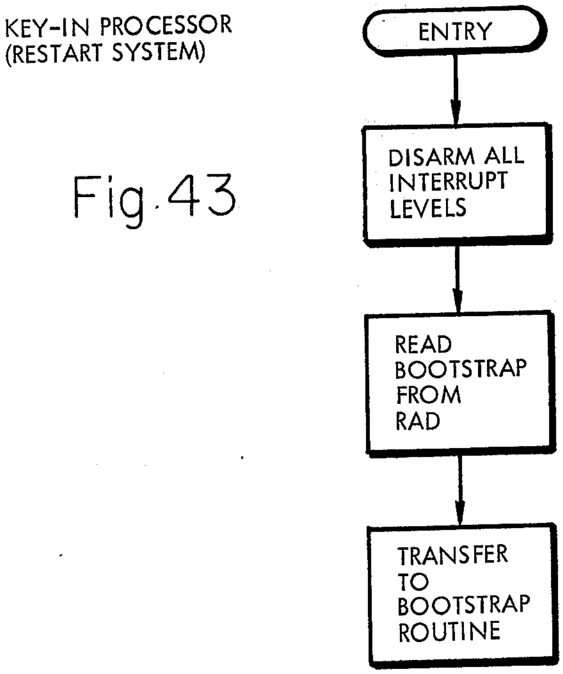
FIG. 43 is a functional flow chart of the key-in processor restart system routine.

When this section is entered the system is reinitialized and restarted. This routine is shown in FIG. 43 and corresponds to statement numbers 112–135 of the machine listings of Appendix G.

p. Display Word (DW)

Figures 44, 45:
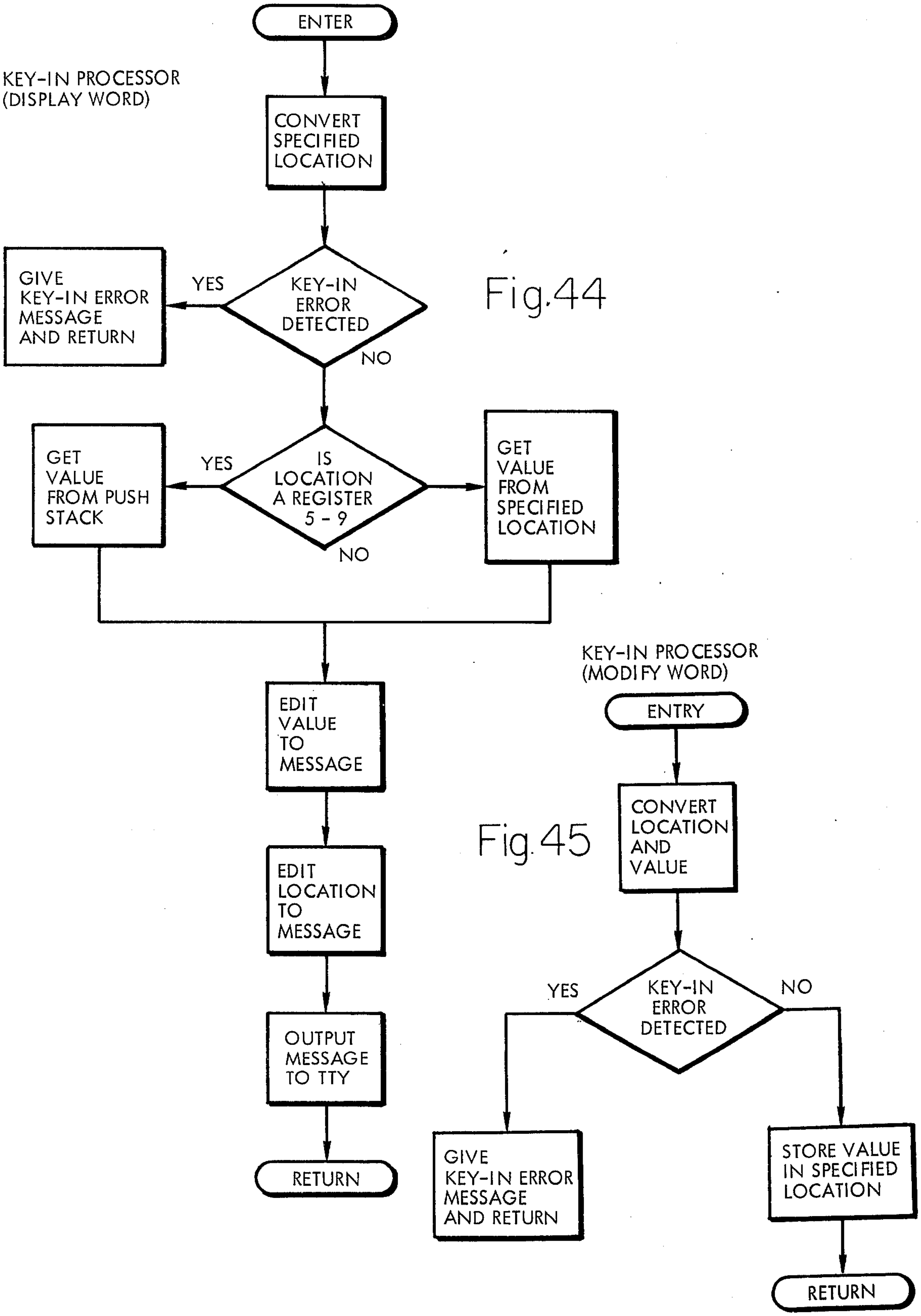
FIG. 44 is a functional flow chart of the key-in processor display work routine.
FIG. 45 is a functional flow chart of the key-in processor modify word routine.

When this section is entered the contents of the specified memory location is displayed on the teletypewriter. This routine is shown in FIG. 44 and corresponds to statement numbers 322–351 of the machine listings of Appendix G.

q. Modify Word (MD)

When this section is entered the specified memory locations are modified according to the hexi-decimal value appearing on the input line. This routine is shown in FIG. 45 and corresponds to statement numbers 318–321 of the machine listings of Appendix G.

r. Set Breakpoint (BP)

Figure 46:
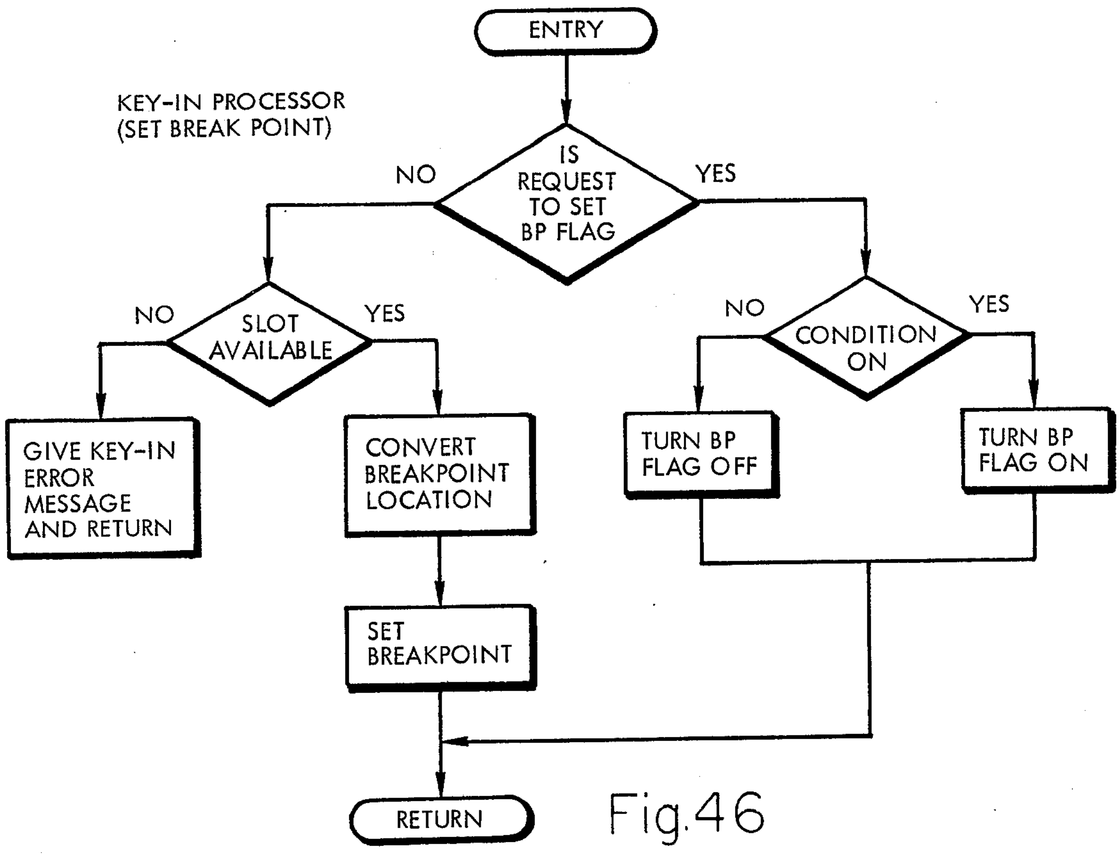
FIG. 46 is a functional flow chart of the key-in processor set breakpoint routine.

When this section is entered the specified memory is set up as a program breakpoint. This routine is shown in FIG. 46 and corresponds to statement numbers 390–430 of the machine listings of Appendix G.

s. Continue from Breakpoint (CC)

Figure 47:
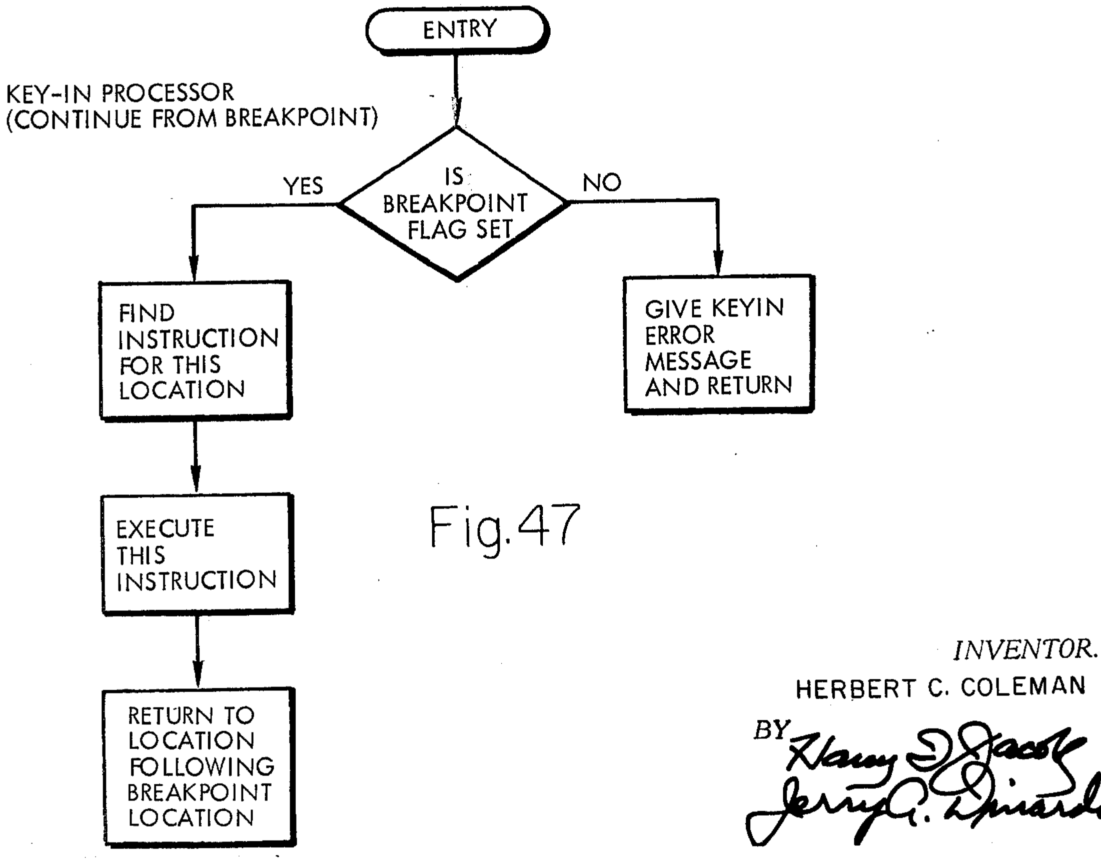
FIG. 47 is a functional flow chart of the key-in processor continue from breakpoint routine.

When this section is entered execution is continued from the currently active breakpoint (if one exists). This routine is shown in FIG. 47 and corresponds to statement numbers 431–456 of the machine listings of Appendix G.

t. Release Breakpoint (RL)

Figure 48:
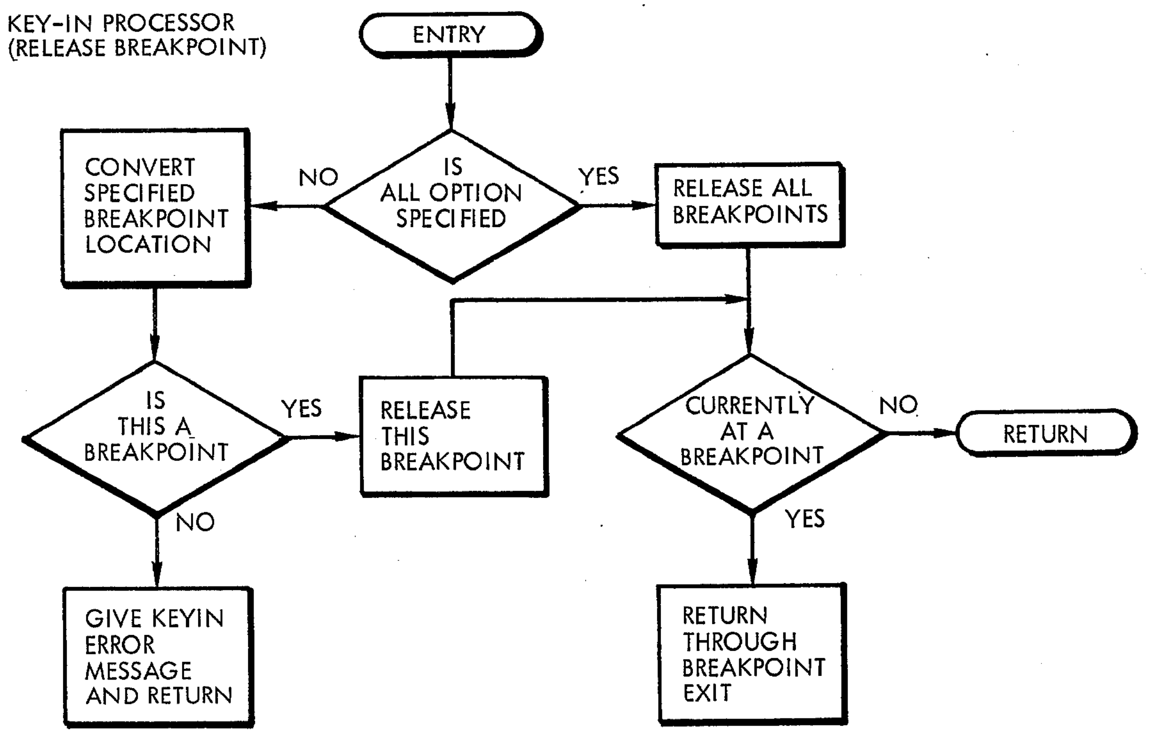
FIG. 48 is a functional flow chart of the key-in processor release breakpoint routine.
Figure 49A:
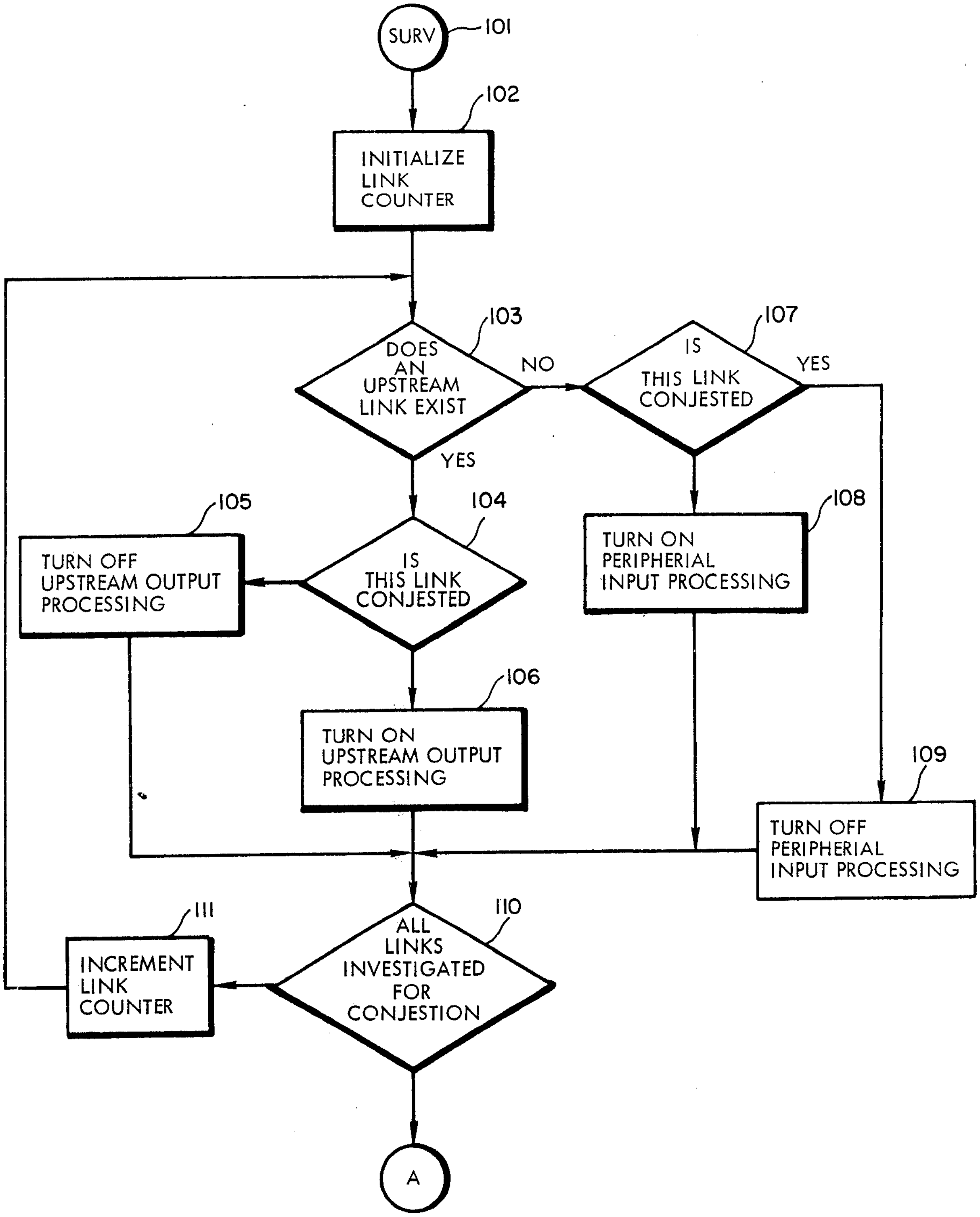
FIGS. 49A – 49G taken together comprise a functional flow chart of the surveillance subprogram.
Figure 49B:
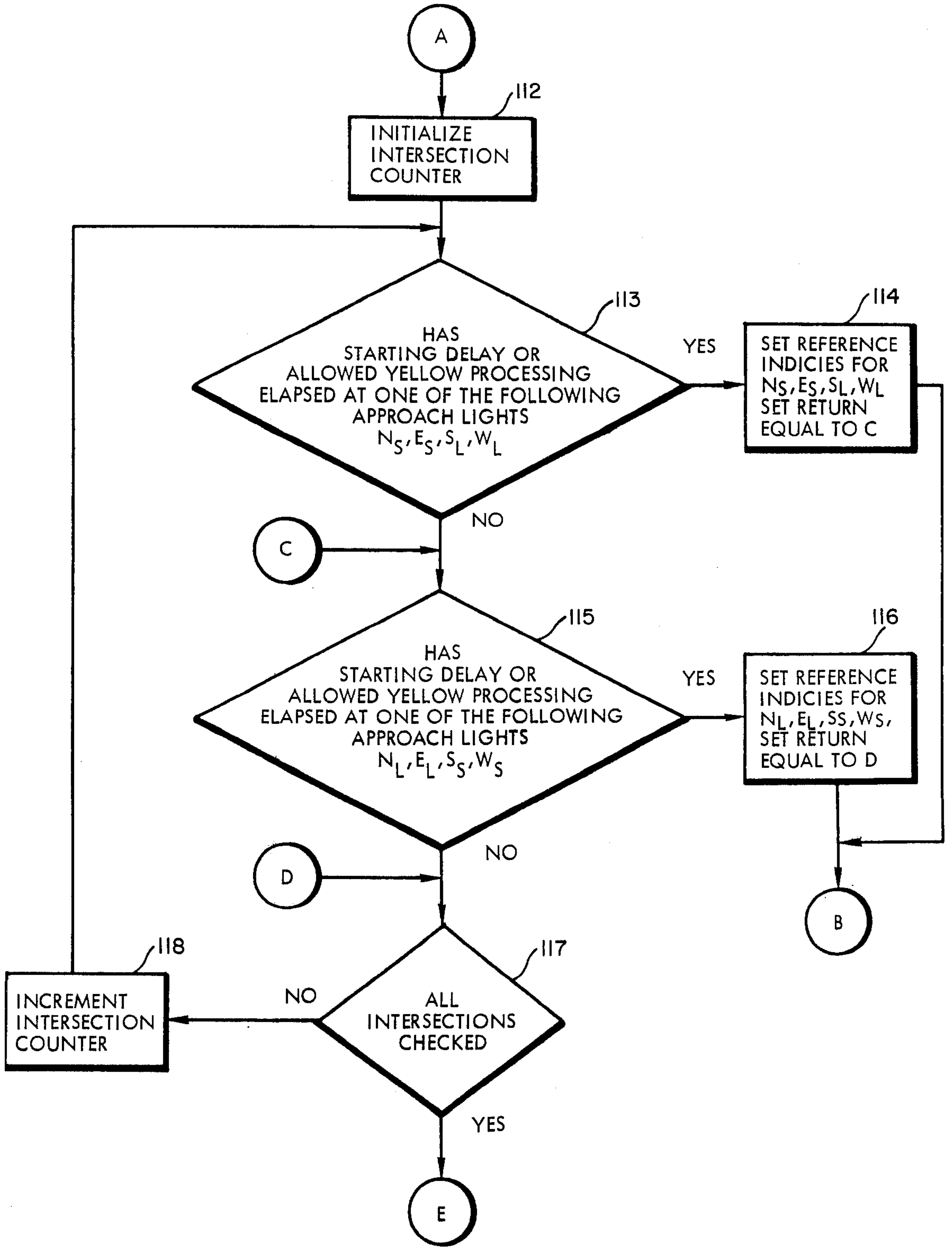
Figure 49C:
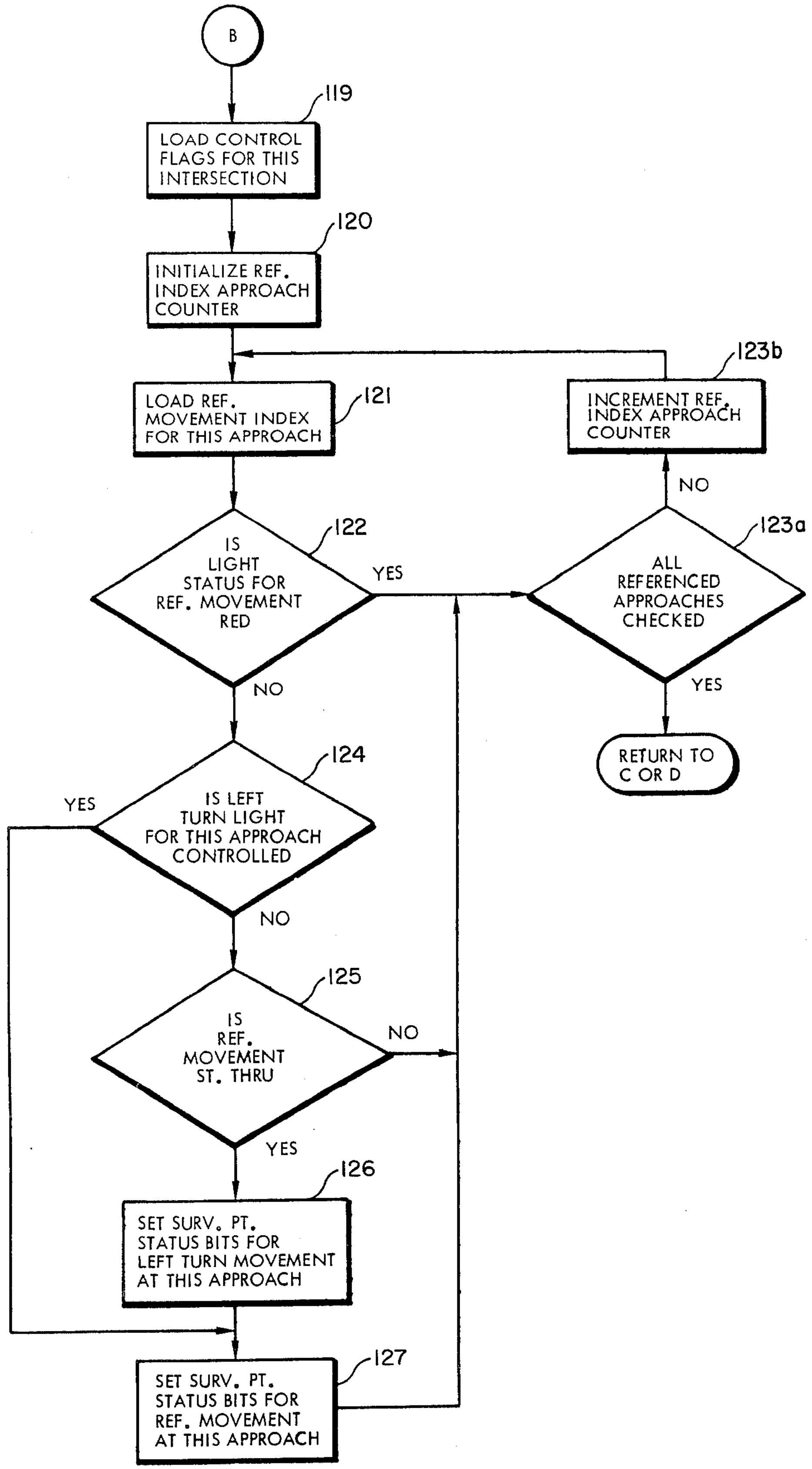
Figure 49D:
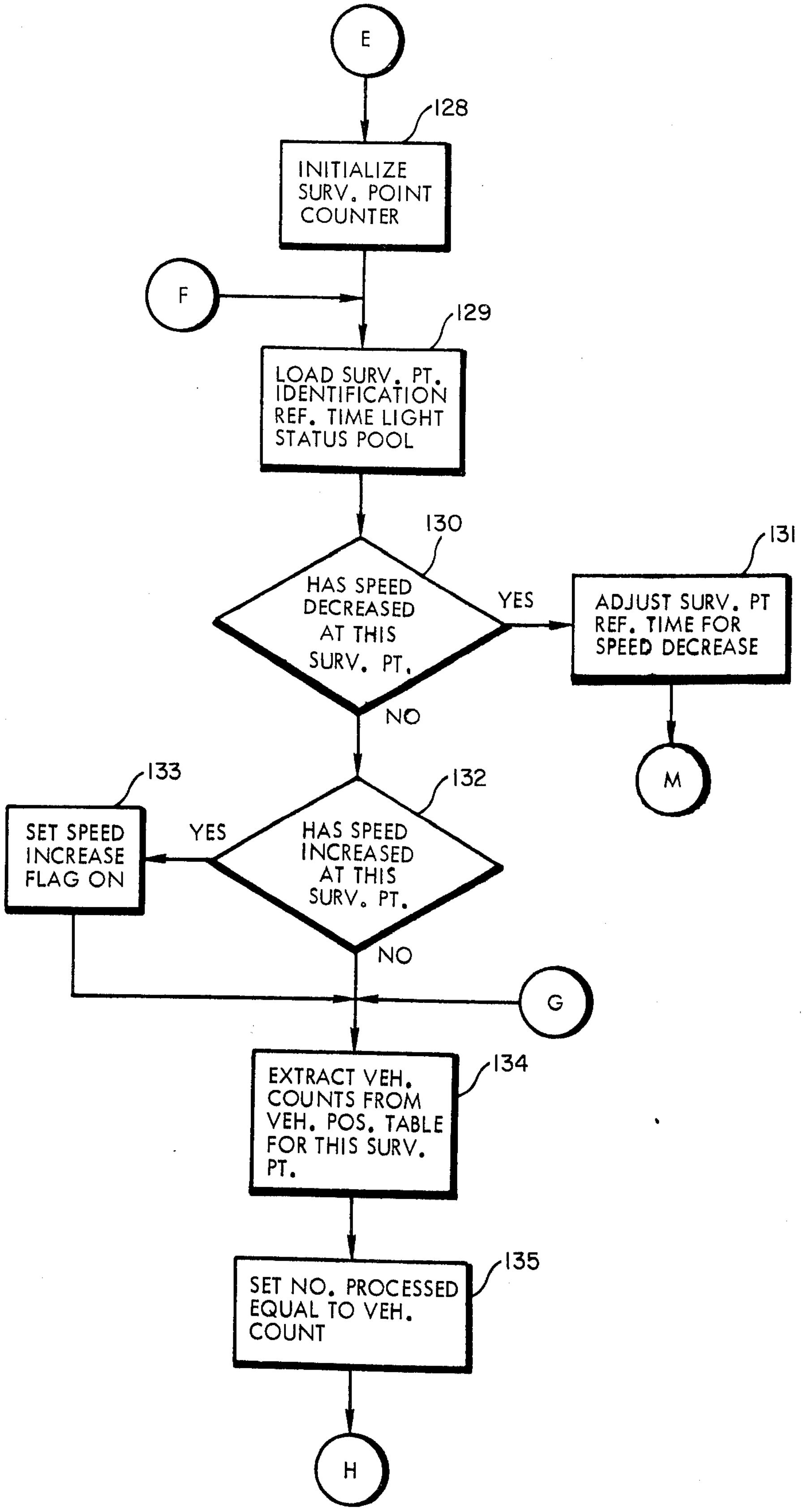
Figure 49E:
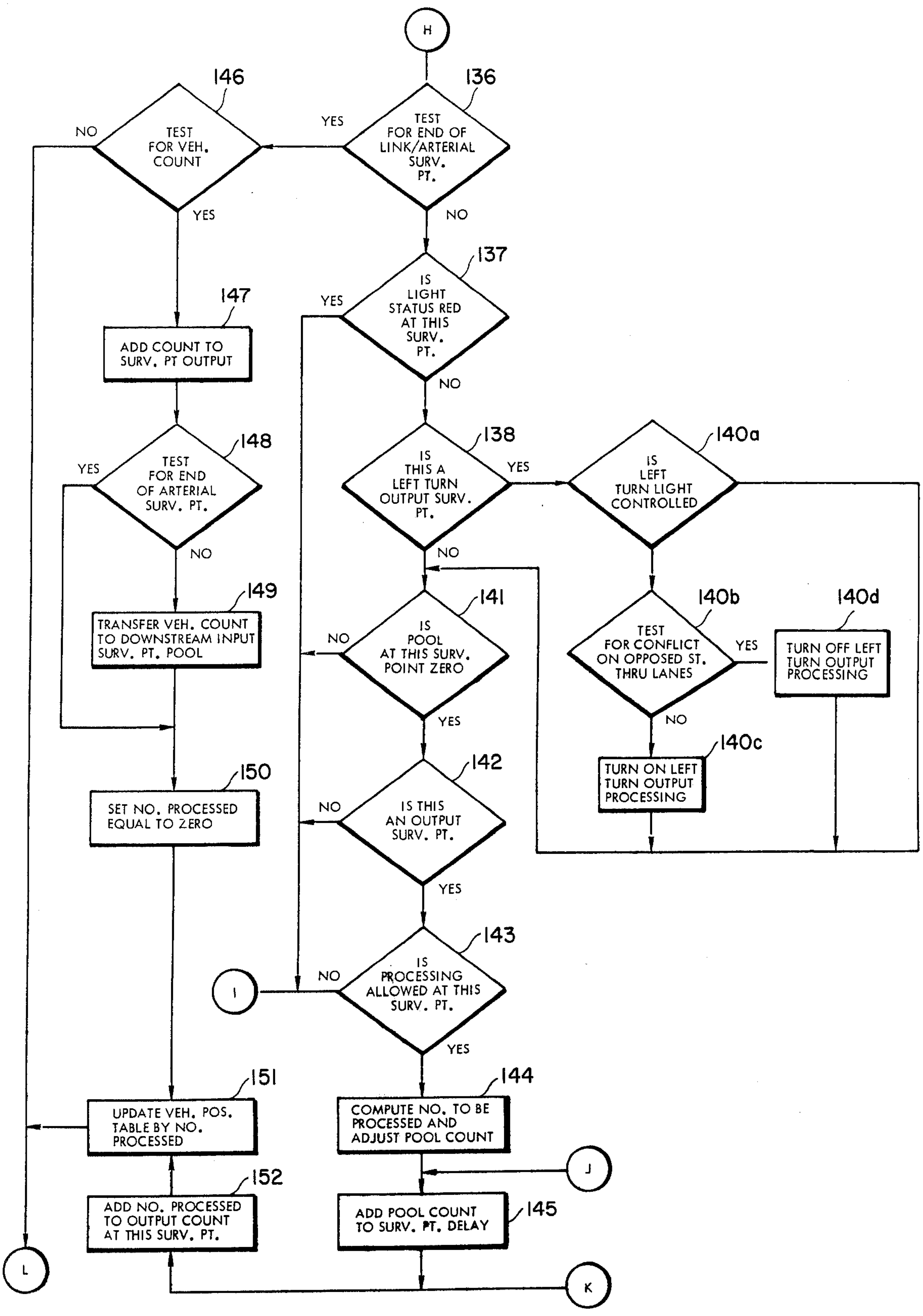
Figure 49F:
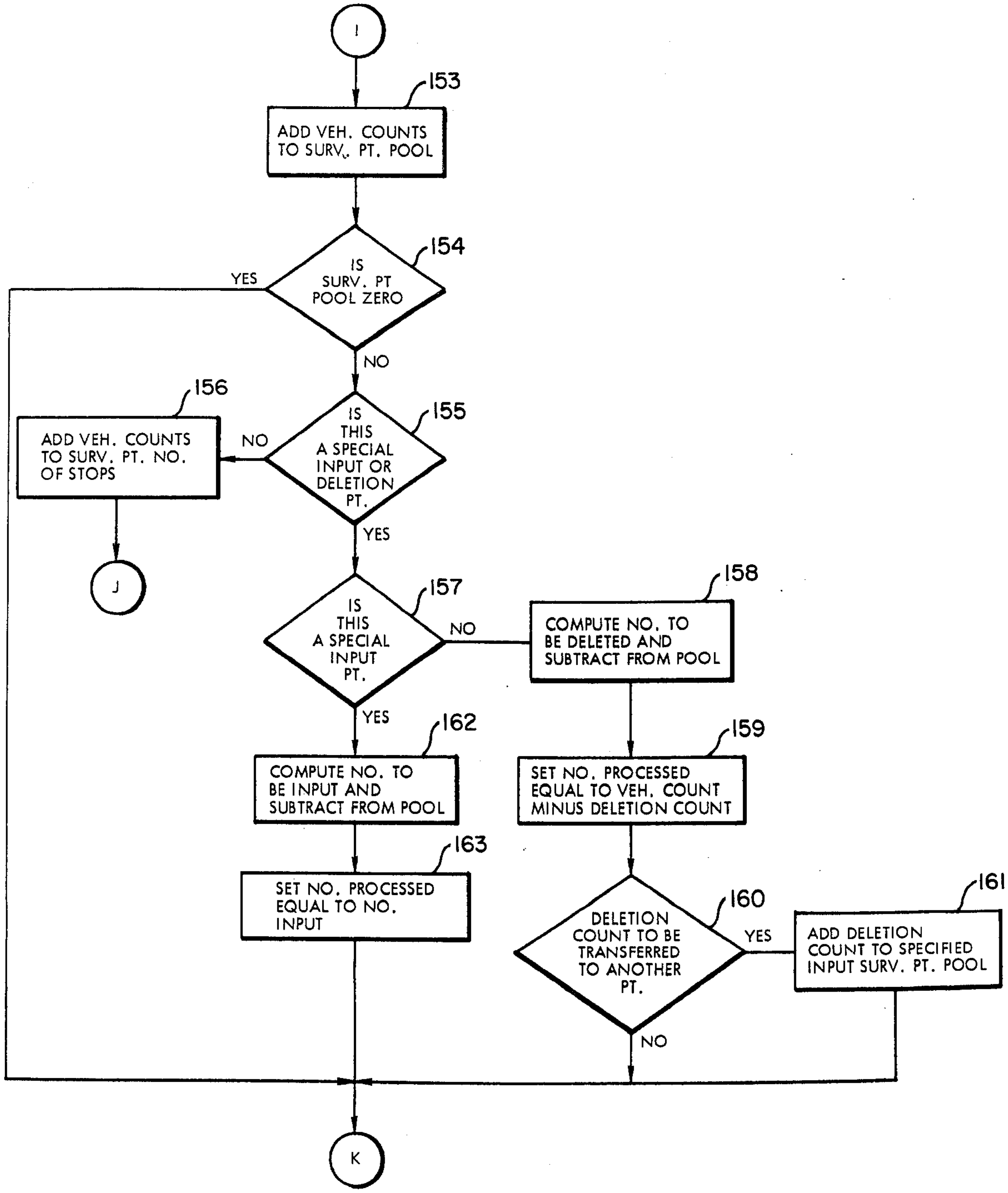
Figure 49G:
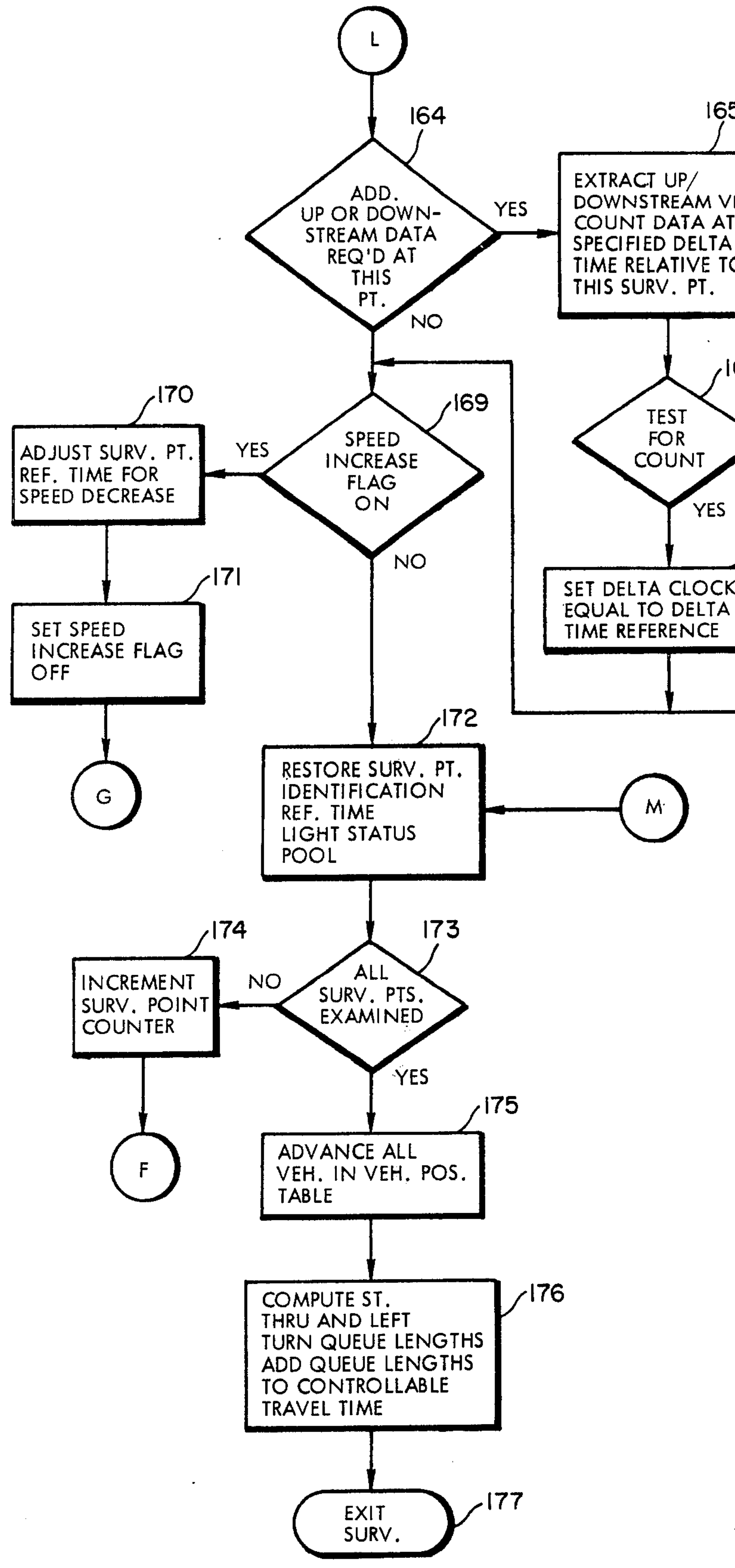

When this section is entered the specified breakpoint location is released (removed from the breakpoint table). This routine is shown in FIG. 48 and corresponds to statement numbers 458–493 of the machine listings of Appendix G.

SURVEILLANCE SUBPROCESSOR

The Surveillance Subprocessor performs the real-time construction, maintenance, and updating of the traffic data base from which it extracts actual and predicted vehicle movement information for utilization by adaptive control algorithms, and for system perforance evaluation. It consists of three basic subprogram; the Surveillance Subprogram, the Minor Intersection Optimization Subprogram, and the Surveillance Summary Subprogram.

The Surveillance Subprogram (SURV) appears in block form as FIGS. 5A–5G, and the machine listing therefor in machine language appear as Appendix H.

Surveillance Subprogram - SURV

The Surveillance Subprogram applies the concept of micro-simulation of individual vehicle movements to achieve a unique balance between actual data collected from road bed sensors and predicted data. This concept results in a high degree of accuracy while minimizing the instrumentation and data collection requirements for a particular network.

Figure 50:
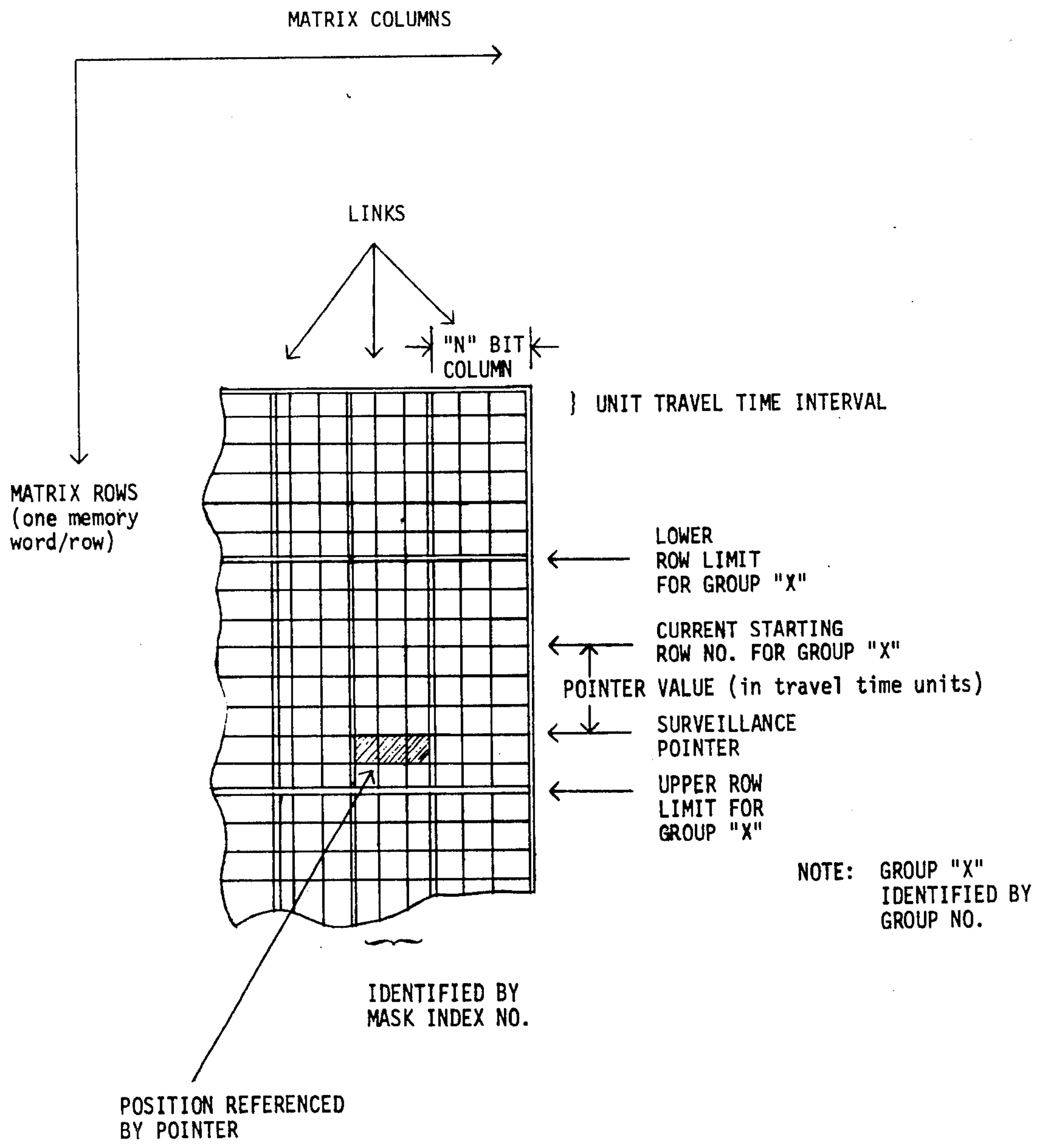
FIG. 50 is a representative drawing of the vehicle position/time matrix of the preferred embodiment of the present invention.

Individual vehicle movements are followed through the instrumented network by means of a Vehicle Position/Time Matrix and a system of Surveillance Pointers. The matrix is constructed in real-time from two basic flow parameters, vehicle count and speed. Each column of the matrix represents a one-directional link (intersection approach) within the network, and the row elements of a specific column correspond to fixed travel time units along the link. Surveillance Pointers, corresponding to specific ingress or egress points along the link, are defined with respect to matrix elements where actual or simulated count data is to be entered, summed, modified, and/or deleted. Time propagation of vehicle counts within the matrix is accomplished by adjusting the relative positions of the Surveillance Pointers with respect to the matrix elements in unit travel time increments. The relative matrix element separation between successive Surveillance Pointers assigned to the same link is defined by the free flow travel times between the pointers. These travel times are computed from the average speed and the actual distance between the physical points represented by the Surveillance Pointers, and are adjusted with a change in average speed. Simply stated, the Surveillance Pointers enter, sum, modify, and/or delete actual or simulated vehicle counts, and control the points of entry and exit to the Vehicle Position/Time Matrix. The matrix maintains the time and spacial relationships between vehicles within it. A representative drawing of the Vehicle Position/Time Matrix is presented in FIG. 50.

Each Surveillance Pointer has a set of attributes associated with it which defines: (a) its relationship to other pointers assigned to the same link, (b) it relationship to other links within the network, and (c) the type and method of surveillance data collection and vehicle count processing to be performed. The primary attributes include: mask and group index numbers, pointer value, pointer type identification, light status, pool, and service rate.

The mask and group index numbers assume permanent values for each pointer and define the matrix column and the matrix row limits for that column that a pointer may reference to enter, sum, modify, and/or delete vehicle counts. The group number defines a set of links which all have approximately the same travel time from link entrance to exit. The mask index number defines a particular link within a group. The pointer value is a matrix element displacement value relative to a starting row number for a particular group number, and ultimately determines the matrix element to be referenced. The difference between pointer values for successive pointers assigned to the same link correspond to the free flow travel times between the pointers and remain fixed until a new average speed for the link is computed. The pointer values are then adjusted so that their differences reflect the new free flow travel times between surveillance points. Propagation of vehicles within the matrix is accomplished in unit travel time increments by decrementing the starting row number, in a circular fashion, for each group as each unit travel time elapses. This procedure effectively advances all pointers, and hence all vehicle counts, for all the links within a matrix group simultaneously.

In order to provide such surveillance parameters as link input and output counts, number of stops, delay, queue lengths, and travel time, a set of Surveillance Pointers is defined for each link. Pointer type identification and light status are used to differentiate between pointers in each link set. For an instrumented link with passage sensors in each lane and a left turn queue sensor at the entrance to the left turn pocket, the following set of Surveillance Pointers would be defined.

Straight Through Input (STI)
Left Turn Deletion (LTD)
Left Turn Input (LTI)
Straight Through Output (STO)
Left Turn Output (LTO)
End of Link (EOL)

Only the output pointers (STO and LTO) and the left turn deletion pointers (LTD) would be required for an uninstrumented link interior to the network. Additional Surveillance Pointers would be necessary to accommodate right turn movements and source/sink flow from parking lots, etc., if such movements exist and represent a significant contribution to the traffic flow and/or congestion within the link.

Ingress Surveillance Pointers (STI and LTI) are assigned a permanent green light status. Their type identification specifies that they will be used only to sum actual or simulated sensor input counts and enter them in the appropriate matrix positions. Egress Surveillance Pointers (STO and LTO), associated with the signalized approaches to an intersection, are assigned a light status consistent with that currently displayed to the correspnding approaches. Their type identification specifies that they will be used to sum output counts, number of stops, and stopped delay time. The pointers sum vehicle output counts without modification if the light status is green and the approach is clear. If, however, there is downstream congestion, a queue is presented at this approach, a conflicting movement has not cleared (as might be the case for an uncontrolled left turn movement), or the light status is red when the propagated vehicle counts reach these pointers, the vehicles are removed from the Vehicle Position/Time Matrix and added to both the number of stops and the pool count. Whene the light status is green, a waiting queue exists (as evidenced by a non-zero pool count), and the approach is otherwise clear (no downstream congestion or conflicting movement), the pool counts are serviced at a rate consistent with the number of output lanes and the discharge headway (time separation between vehicles moving from a stop in a single lane) specified for that pointer by its service rate. Each pool vehicle serviced is re-entered in the matrix at a point defined by the current pointer value, and the mask and group index numbers for that Surveillance Pointer, and is added to the corresponding link output count.

Left Turn Deletion Pointers are assigned a permanent red light status and a type identification which specifies that they are to be used to delete from the straight through flow those vehicle counts which correspond to the left turn input counts so that the straight through output count reflects only the straight through movement. Once the propagated vehicle counts pass an egress surveillance point they are processed by an End of Link Pointer. This pointer type is assigned a permanent green light status and a pointer type identification which specifies that it is to sum vehicle counts and transfers them to a downstream link for correlation with input counts to that link, or remove them from the matrix at points corresponding to the network boundaries.

There is no provision for the simulation of finite vehicle acceleration or deceleration within the surveillance logic. Vehicles moving within the network are assumed to travel at constant speed and are accelerated or decelerated instantaneously to and from a stopped position. The acceleration and deceleration times, however, are accounted for in the delay through the use of two simulation control parameters; starting delay and the allowed yellow processing interval. Starting delay is defined as the time required to react to a signal light change from red to green plus the acceleration times required to achieve free flow speed. An effective red light status is assumed at green phase initiation which delays stopped vehicle processing until the starting delay interval has elapsed. New vehicle arrivals during this interval are not delayed or stopped unless a queue exists and has not yet cleared. The yellow processing interval is used to account for the fact that vehicle processing does not cease immediately when the green phase is terminated. A driver seeing the amber light displayed must decide whether to stop or proceed, depending upon his current speed and distance to the intersection. If this decision is to stop, he must apply the brakes so as to bring his vehicle to a safe stop with finite deceleration. Both the decision time and the braking time are included in the allowed yellow processing interval. The light status during this interval is assumed to be effectively green, thus allowing those vehicles whose estimated travel time to stopline is less than or equal to this interval to proceed without stopping.

In FIGS. 49A–49G, the block numbers correspond to the statement numbers of the machine listing of Appendix H as follows:

| Block No. | Statement No. |
|---|---|
| 101 | 92 |
| 102 | 326 |
| 103 | 344 |
| 104 | 346–364 |
| 105 | 365 and 375–383 |
| 106 | 375–383 |
| 107 | 358–364 |
| 108 | 377–383 |
| 109 | 377–383, 368–369, 371–374 |
| 110 | 385 |
| 111 | 384 |
| 112 | 94 |
| 113 | 97 |
| 114 | 99 |
| 115 | 101 |
| 116 | 103 |
| 117 | 106 |
| 118 | 105 |
| 119 | 388–389 |
| 120 | 391 |
| 121 | 392 |
| 122 | 395 |
| 123 | 419 |
| 124 | 400 |
| 125 | 402 |
| 126 | 404 |
| 127 | 415 |
| 128 | 109–111 |
| 129 | 117–122 |
| 130 | 124 |
| 131 | 127–128 |
| 132 | 124 |
| 133 | 129 |
| 134 | 130–144 |
| 135 | 145 |
| 136 | 147 |
| 137 | 148 |
| 138 | 149 |
| 140 | 423–462 |
| 141 | 152 |
| 142 | 154 |
| 143 | 156–157 |
| 144 | 199–235 |
| 145 | 238–242 |
| 146 | 161 |
| 147 | 163–165 |
| 148 | 166–167 |
| 149 | 168–180 |
| 150 | 181 |
| 151 | 264–266 |
| 152 | 259–263 |
| 153 | 158 |
| 154 | 159 |
| 155 | 183–184 |
| 156 | 191–192 |
| 157 | 185 |
| 158 | 201–203 |
| 159 | 234 |
| 160 | 230 |
| 161 | 232 |
| 162 | 181–189 |
| 163 | 199–235 |
| 164 | 271–273 |
| 165 | 274–289 |
| 166 | 290 |
| 167 | 291 |
| 168 | 294–295 |
| 169 | 299 |
| 170 | 301 |
| 171 | 304 |
| 172 | 305–311 |
| 173 | 113–116 |

-continued

| Block No. | Statement No. |
|---|---|
| 174 | 112 |
| 175 | 312–325 |
| 176 | 326–341 |
| 177 | 387 |

Minor Intersection Optimization Subprogram (MOPT)

Figure 51:
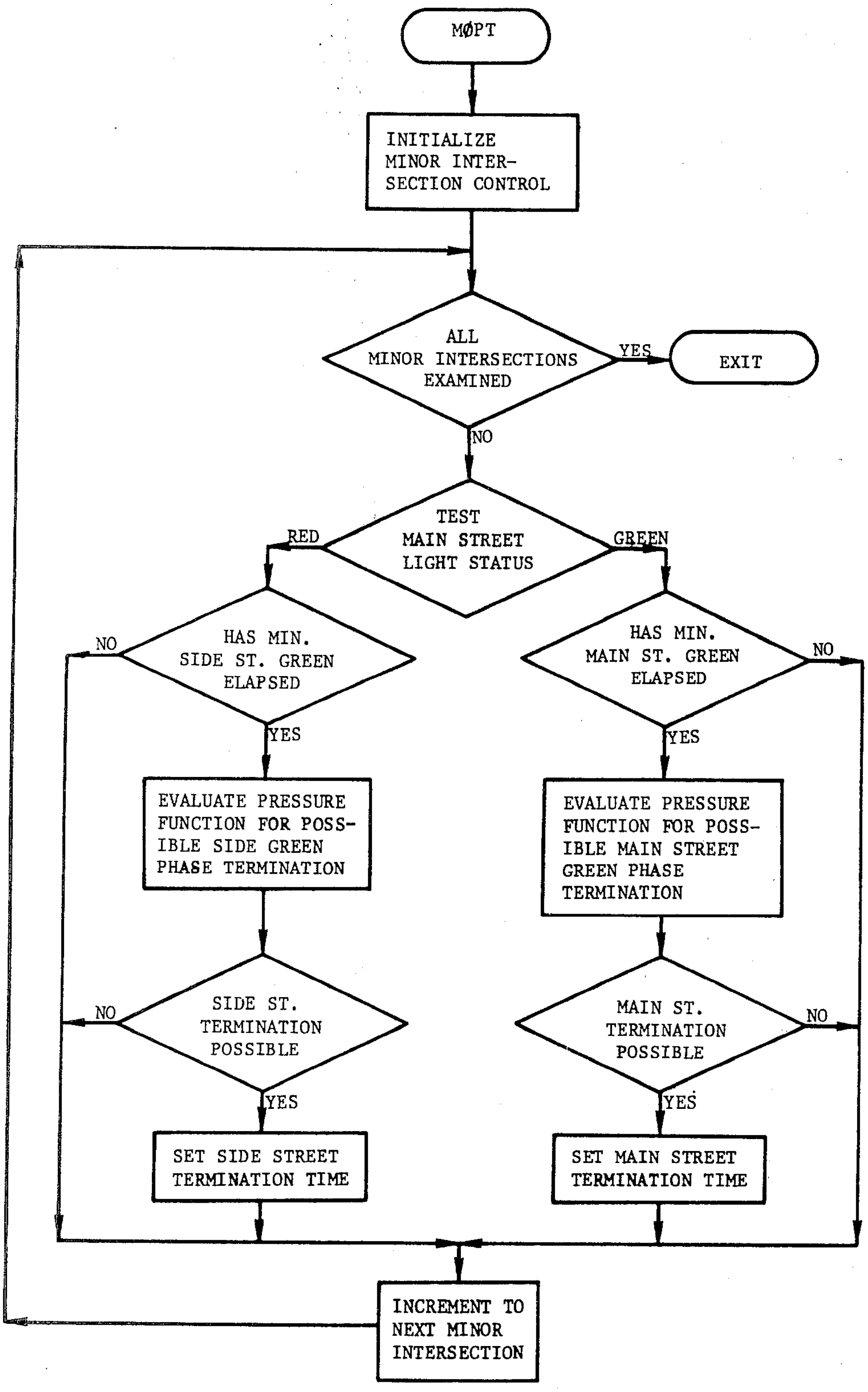
FIG. 51 is a functional flow chart of the minor intersection optimization subprogram of the preferred embodiment of the present invention.

The micro-simulation concept employed by the surveillance logic also provides the basis for controlling the minor intersections which normally would have little or no instrumentation. MOPT functional flow is shown in FIG. 51. The traffic flow at these intersections is essentially bidirectional along 'main street' with minimal cross flow along 'side street'. The Vehicle/Position/Time Matrix contains all the information to accurately predict the 'main street' platoon size and its time of arrival at the minor intersection. Using this information, the Minor Intersection Optimization Subprogram can effectively compute the control parameters necessary to maintain the main street and/or preferred direction progressions established at the major intersection and network levels. The Minor Intersection Optimization logic computes a pressure function based on the service demand for both main and side street, expected time of platoon arrival on main street, and preferred flow direction. The pressure function is defined by the equation $$TF(I) = (DTGR(I)/T(I)) * PFF(I)$$

where:

I = Intersection approach index
TF(I) = Phase termination factor
DTGR(I) = Green time required to service all vehicles within the prediction zone (see FIG. 50)
T(I) = DELP(I) for DTGR(I) ≥ DELC(I) DELC(I) for DTGR(I) < DELC
DELP(I) = Free flow travel time from prediction zone entry to intersection entry
DELC(I) = Time to intersection entry for the last vehicle entering the prediction zone
PFF(I) = Preferential flow factor (100)

Machine listings for the pressure function equation are attached as Appendix I.

Service demand on side street is determined from sensor actuations where instrumentation exists, historical data, and the current duration of the main street green phase. The pressure function yields a main or side street green phase termination time which is bounded by the minimum green times and the maximum allowable phase durations. The logic is designed to function much like a fully traffic-actuated controller in that phase determination, phase duration and background cycle length are determined within limits based on service demand. The distinct advantages that this logic has over the control effected by a fully or semi-traffic-actuated controller are that little or no instrumentation is required, the minor and major intersections are inter-connected through the Vehicle Position/Time Matrix, and the control parameters within the pressure function can be changed in real-time to guarantee a preferred flow direction regardless of demand. Inter-connection of intersections through the Vehicle Position/Time Matrix allows prediction of the main platoon location. This knowledge permits side street processing to be scheduled to yield minimum interference with the main platoon. Two secondary advantages are realized by using this approach to minor intersection control. First, the computational burden on the major intersection and network level control algorithm is greatly reduced over what it would be if minor intersections were included in their control schemes. Minor intersections normally comprise the majority of the network, but contribute to a lesser extent to the control complexities and congestion problems inherent at major intersections. Secondly, maintenance of the progressions established by the higher level control algorithms promises less involved and more accurate volume and queue length prediction over the next network cycle which is essential as feedback to the higher level control algorithms for dynamic adaptation to short period fluctuations as well as trend setting traffic demands.

Surveillance Summary Subprogram

The Surveillance logic continuously sums input and output counts, number of stops, and stopped delay time and also computes gueue lengths and link travel time. Stopped delay time is computed by summing the non-zero pool counts in each unit time interval. Link travel times are computed by summing the queue lengths, which are simply the input/output count differences, in each unit time interval. Additional and/or more complex surveillance parameters are computed from this basis set by the Surveillance Summary Subprogram.

Figure 52:
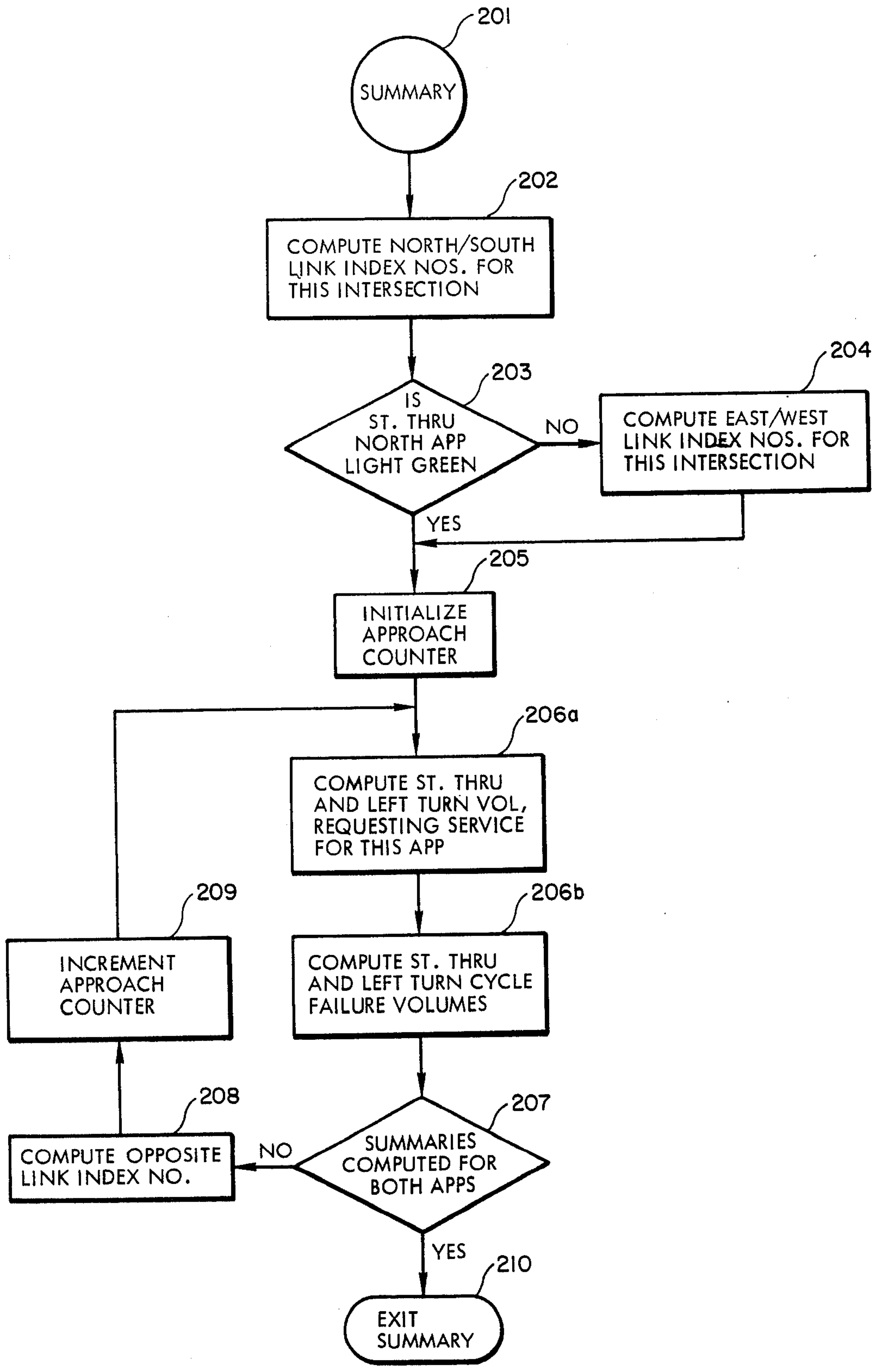
FIG. 52 is a functional flow chart of the surveillance summary subprogram.
Figure 53A:
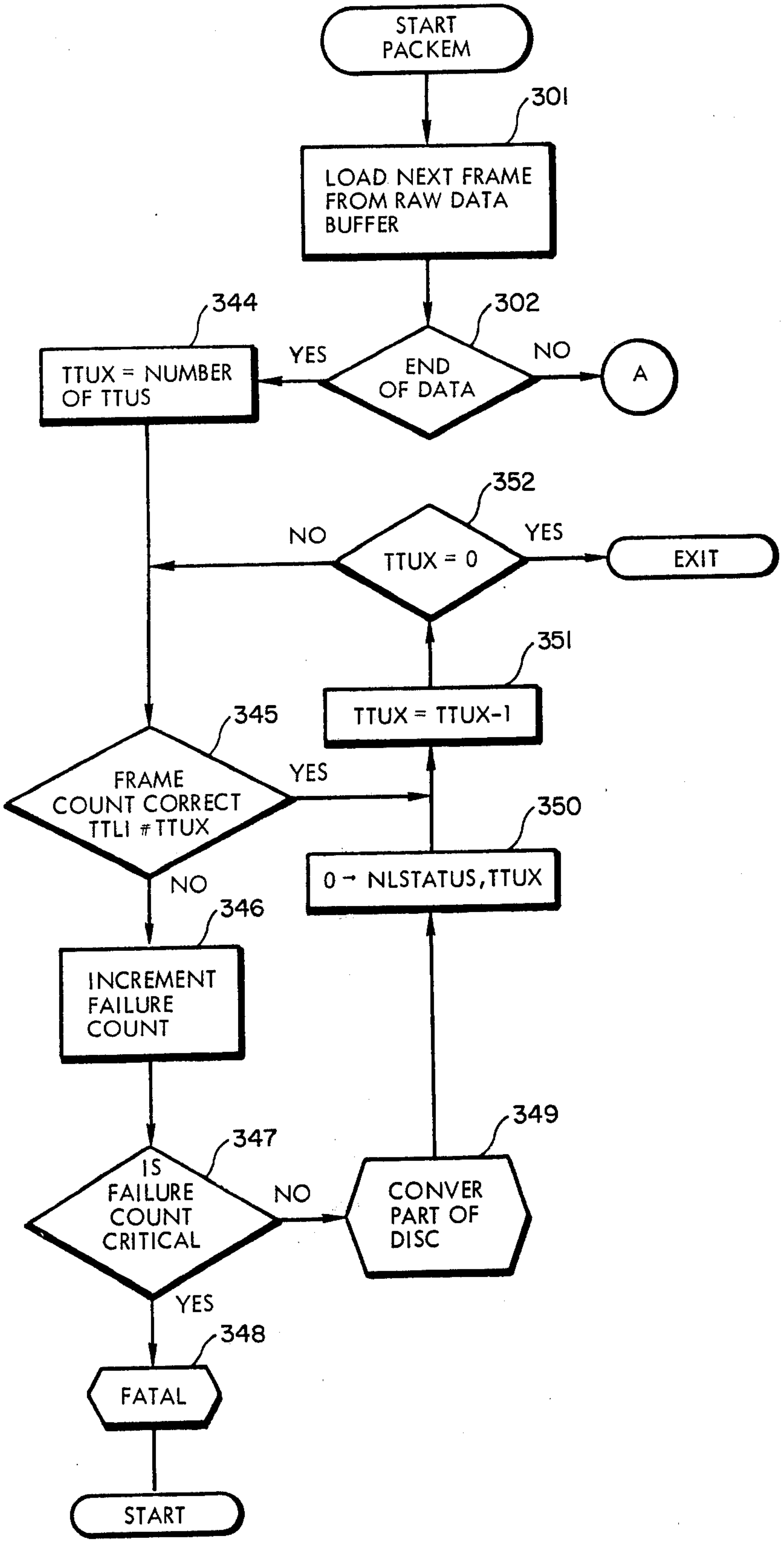
FIGS. 53A – 53D taken together comprise a functional flow chart of the PACKEM data handling subprogram.
Figure 53B:
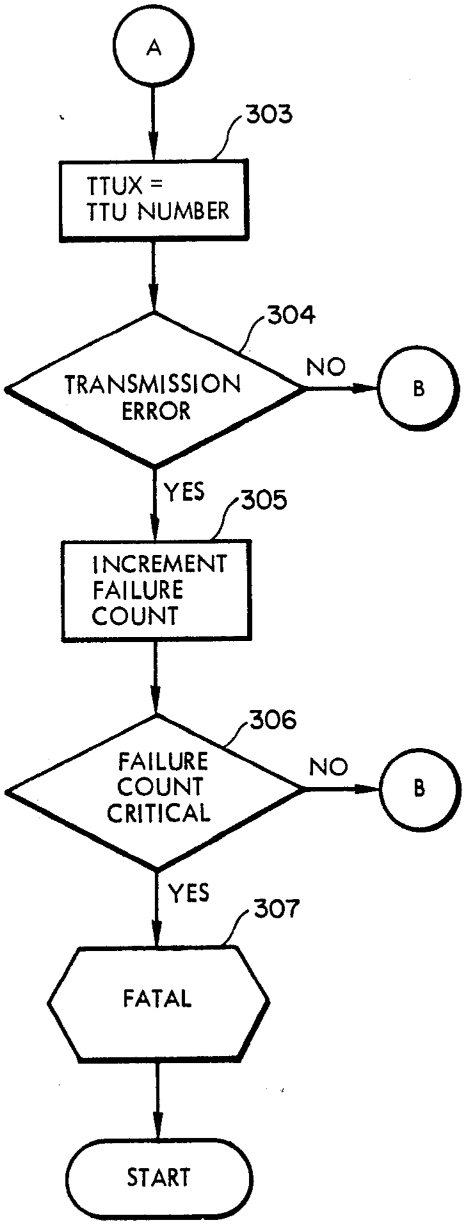
Figure 53C:
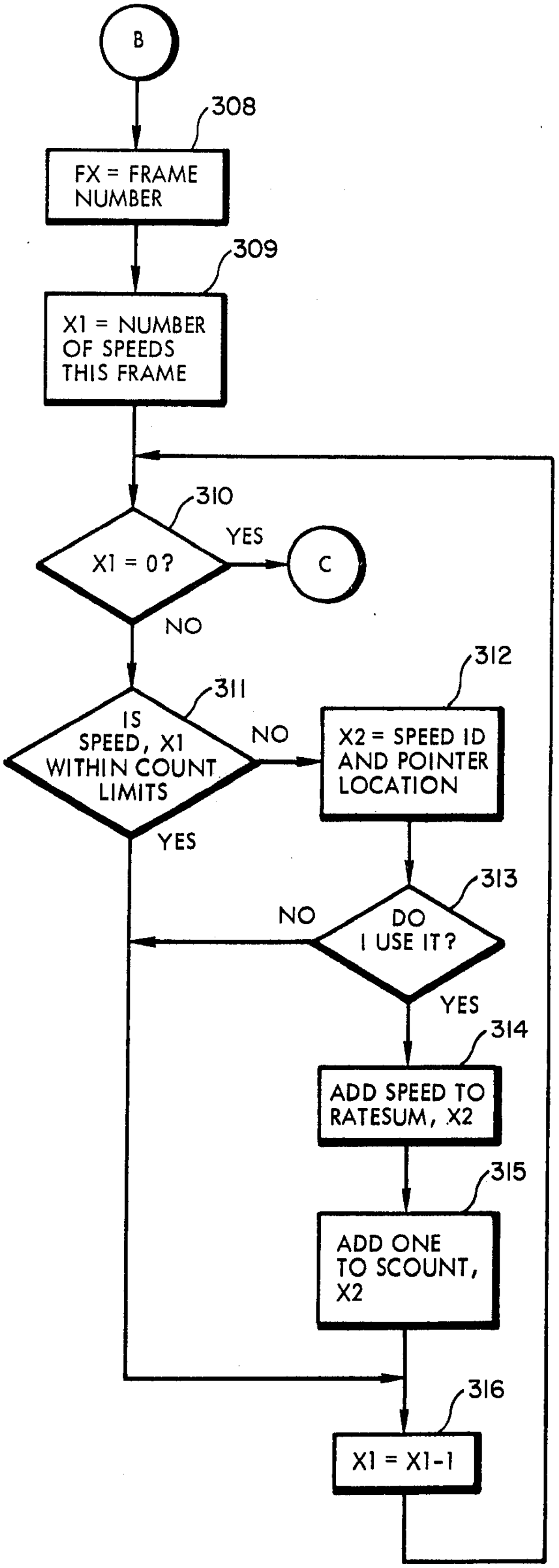
Figure 53D:
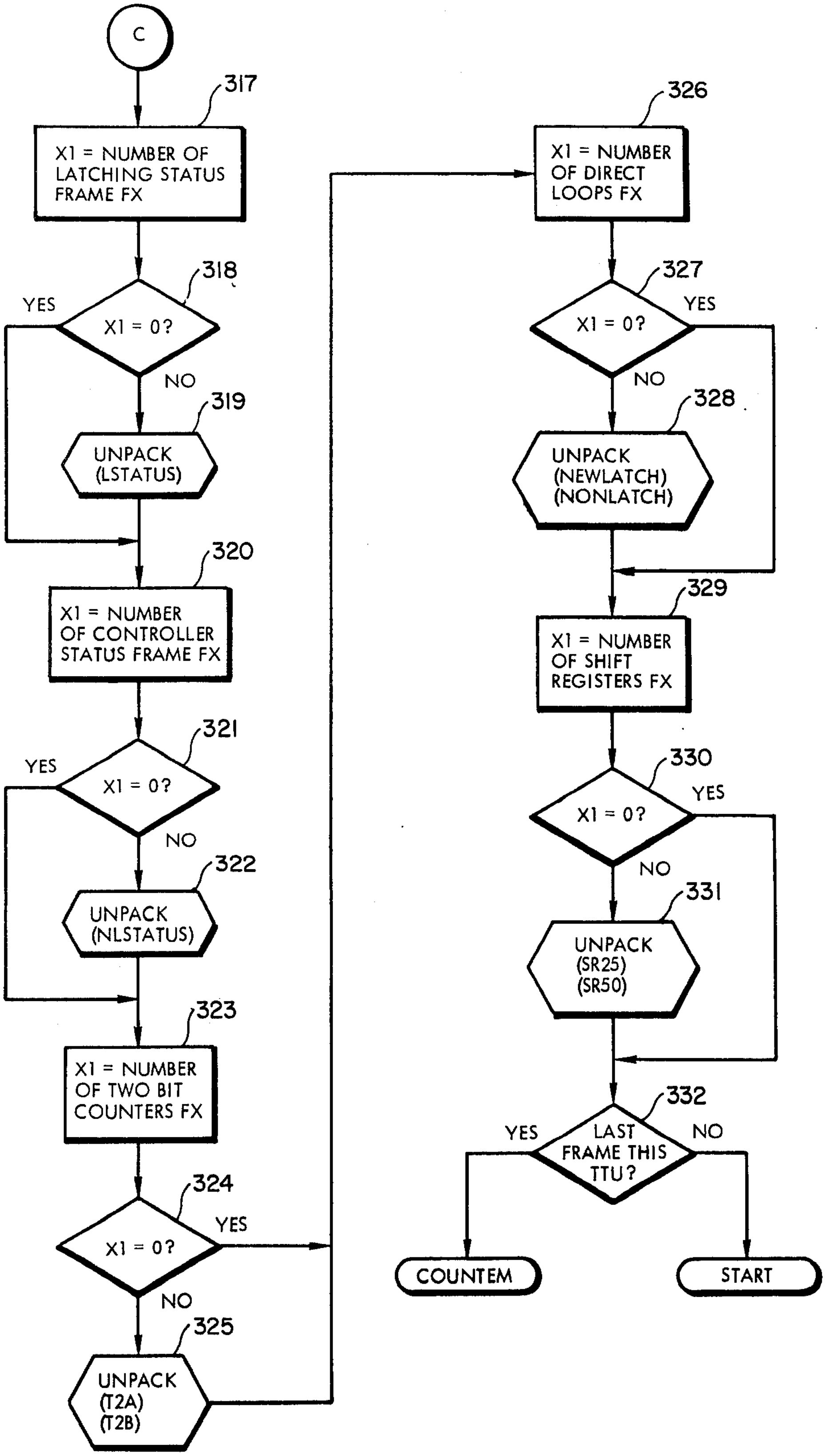

The Surveillance Summary Subprogram shown in FIG. 52 and the corresponding machine listings are attached as Appendix J. The Summary Subprogram is a special applications program which must be tailored to meet the specific requirements of the particular traffic network, the dynamic control algorithms to be applied, and the desired measures of effectiveness for that network. The basic summary logic is designed to extract input/output count data, number of stops, delay, and travel time periodically from the basic set of surveillance data and to compute other required parameters as well as order these in summary tables for subsequent display and/or utilization by other subprocessors. It also normalizes the count data by differencing and zeroing so that the data does not overflow its allocated storage cells.

Referring to FIG. 52 and Appendix J, block 201 corresponds to Statement 128, block 202 corresponds to Statements 131–133, block 203 corresponds to Statement 134, block 204 corresponds to Statements 135–136, block 205 corresponds to Statement 137, block 206 corresponds to Statements 139–161, block 207 corresponds to Statements 136–164 and 166, block 208 corresponds to Statement 162, block 209 corresponds to Statement 165, and block 210 corresponds to Statements 168–170.

Appendix K provides the references and definitions for the programs of this invention.

DATA HANDLING SUBPROGRAM - PACKEM

Figure 54:
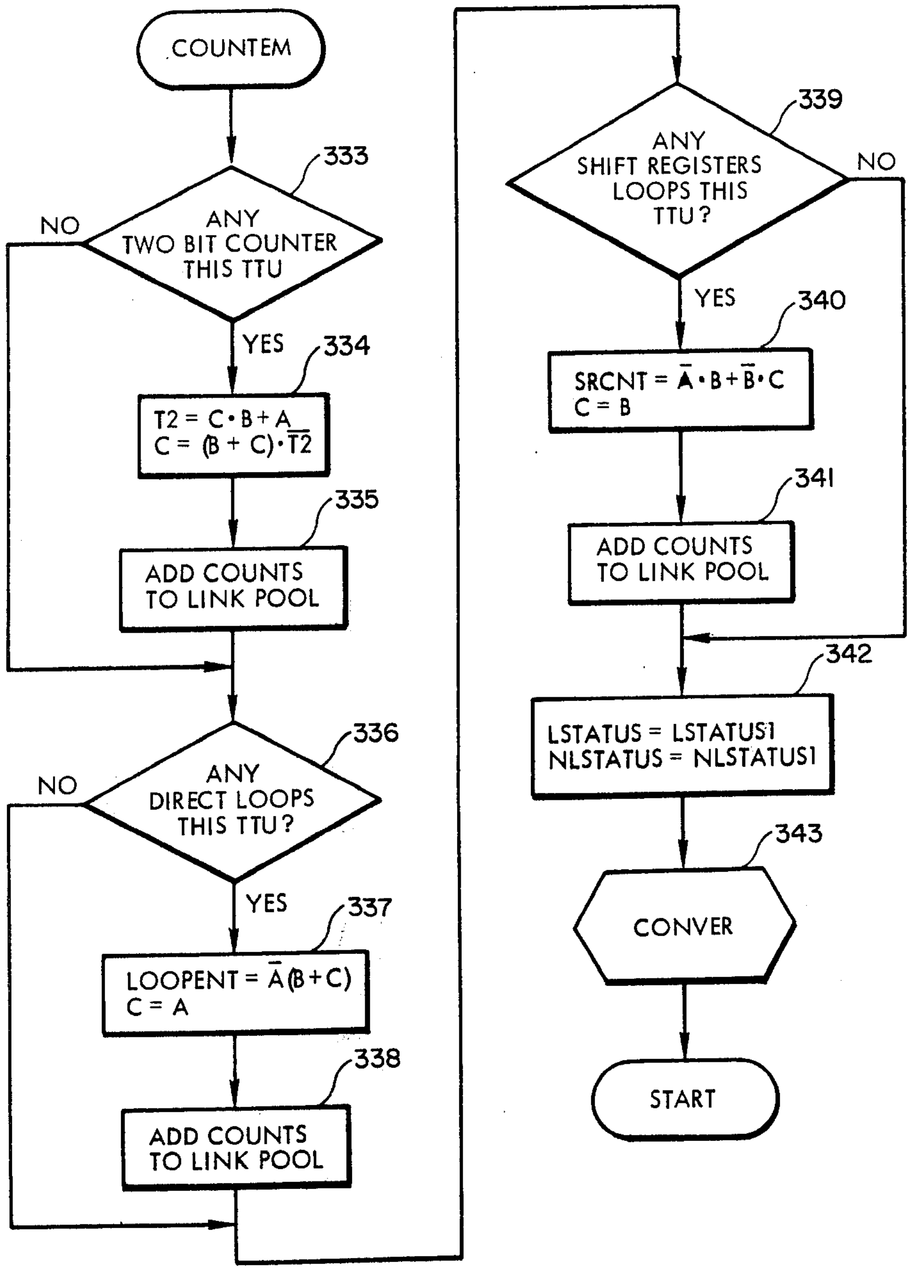
FIG. 54 is a functional flow chart of the COUNTEM subprogram according to the preferred embodiment of the present invention.

Data handling performs four major functions. These functions are: (1) unpack the raw data and store in arrays, (2) check the data for transmission errors and wrong frame count, (3) calculate new arrivals and store in appropriate pools, and (4) accumulate and store speeds. The program operates under the Operating System. It is entered every TTU scan cycle which is every ½ second. The raw data from the TTU's are in a buffer area at the time Data Handling is entered. There are two loops in the program. There is one loop for each incoming frame as shown in FIG. 53 and one for each TTU as shown in FIG. 54. Machine listings corresponding to FIGS. 53 and 54 are attached as Appendix L.

Some assumptions about the data and how they are formatted in the frames were made. They are:

1. only one TTU per line or channel processor
2. lines are numbered sequentially starting at 001
3. each frame will be wired in the following order:
   - A. speed
   - B. pedestrian push button and treadle status
   - C. controller status
   - D. most significant bits of two bit counters
   - E. least significant bits of two bit counters
   - F. latching station direct loops
   - G. non-latching status for direct loops
   - H. first strobe bits of shift register
   - I. second strobe bits of shift register All of the above does not necessarily exist in every frame but when any do, they will be in this order per frame. Where the bits are split, as in D and E, F and G, H and I, the corresponding split bits will be in the same frame.

The first thing PACKEM does, as shown in FIG. 53 and the machine listings of Appendix L, is to load a frame of data from the raw data buffer and check it for transmission errors. If the frame received passed a transmission check made in the Computer Interface Assembly (CIA), a bit is set to one. If the command sent to the TTU passed a transmission check, a bit is set to one in the frame. These bits are checked and recorded if in error. If there are five sequential errors on the same TTU, transfer is made to FATAL, which at the present only informs the operator via teletype and goes on. If the transmission was good, the data is unpacked. The speed is checked to see if it is within some defined frequency limits and if it is, it is checked to determine if this speed byte is used. If it passes these tests, it is accumulated and a vehicle counter incremented. The rest of the data from the frame are stripped out and accumulated in a word per type of data (A through I above) per TTU. By separating the most significant bits from the least significant, latching status from non-latching status, first strobe bit from second strobe bit, and accumulating all data from the TTU's in a word per type, calculation of new arrivals from a TTU can be done simultaneously.

The following table correlates the blocks shown in FIG. 53 with the machine listing in assembly language of Appendix L.

| Block No. | Statement No. |
|---|---|
| 301 | 142 |
| 302 | 143–144 |
| 303 | 145–147 |
| 304 | 148–150; 158–160 |
| 305 | 151–152; 162–163 |
| 306 | 153; 164 |
| 307 | 154–156; 301–303; 165–167 |
| 308 | 169–173 |
| 309 | 175–176 |
| 310 | 178–179 |
| 311 | 180–182 |
| 312 | 183 |
| 313 | 184 |
| 314 | 185–187 |
| 315 | 188 |
| 316 | 190 |
| 317 | 192 |
| 318 | 193 |
| 319 | 194–195; 310–316 |
| 320 | 197 |
| 321 | 198 |
| 322 | 199–200; 310–316 |
| 323 | 202 |
| 324 | 203 |
| 325 | 204–207; 310–316 |
| 326 | 209 |
| 327 | 210 |
| 328 | 211–214; 310–316 |
| 329 | 216 |
| 330 | 217 |
| 331 | 218–221; 310–316 |
| 332 | 223–227 |
| 344 | 279–281 |
| 345 | 282–285 |
| 346 | 286–289 |
| 347 | 290 |
| 348 | 291–292; 301–303 |
| 349 | 294 |
| 350 | 296 |
| 351 | 297 |
| 352 | 298 |

When all the frames from a TTU are in, the program goes through the second loop, shown in FIG. 54, which calculates the new arrivals from the three types of counter, namely: (1) two bit counter from treadles, (2) two bit shift registers, and (3) non-latch and latch status. The equations for the two bit counter are:

New arrival = C . B + A, . = logical AND, + logical OR where $C = (B + C) . \overline{\text{new arrival}}$ B = least significant bit A = most significant bit The equation for latch and non-latch is:

New arrival = $\bar{A}$ (B + C)

C = A where
A = non-latch status
B = latch status
C = old non-latch

The equation for the two bit shift register is:

New arrival = ($\bar{A}$ . B) + ($\bar{B}$ . C)

C = B where
A = first ¼ second strobe
B = second ¼ second strobe
C = last scan second ¼ second strobe After each type of new arrivals are calculated, the counts from each sensor are added to a pool count for surveillance. Also, the controller status is stored and subroutine COMVER is called in DISC to use the intersection status and then a transfer is made to the start of PACKEM for another frame of data.

When it is determined that all of the data have been handled, the program checks all TTU's to determine if the correct number of frames were received from each TTU. If the frame count is not correct for a TTU, an error count is incremented and DISC notified of the discrepancy.

The following table correlates the blocks shown in FIG. 54 with the machine listing in assembly language of Appendix L.

| Block No. | Statement No. |
|---|---|
| 333 | 229–232 |
| 334 | 233–235; 238–243 |
| 335 | 236–237; 317–324 |
| 336 | 245–246 |
| 337 | 247–251; 254–257 |
| 338 | 252–253; 317–324 |
| 339 | 258 |
| 340 | 259–267; 269–270 |
| 341 | 268; 317–324 |

-continued

| Block No. | Statement No. |
|---|---|
| 342 | 271–274 |
| 343 | 275–276 |

The foreground control portion includes two subprograms (COMMAND and TRANS)and one major subroutine (DISC). Subprograms COMMAND and TRANS are called each foreground cycle.

The subprogram COMMAND performs the command verification and generation function for each intersection (major and minor) in the network; COMMAND is discussed first. For major intersections, the COMMAND subprogram calls the DISC subroutine once per network cycle after the first minimum green time has elapsed on main street for each major intersection. The subprogram TRANS performs the function of implementing preselected patterns or ONPOP patterns based on operator selection of network control.

COMMAND VERIFICATION AND GENERATION SUBPROGRAM - COMMAND

Subprogram COMMAND performs the command generation and verification for each intersection. The subprogram sets the intersection controller command bits and verifies controller status bits for correct controller functioning when under computer control or not under computer control. Both step and actuated controllers are handled by this subprogram. All intersections, both major and minor, may be commanded. In addition, all intersections are monitored when not under computer control. The logic used to generate commands performs green shortening/green extension based on the intersection criticality set by DISC. Illegal controller steps are detected by this logic.

The logic used to perform command verification and generation depends strongly on the types of controllers in the street. A description of the various types of controllers and the status indications received from each type follows.

Controller Status Indication Types

There are four basic controllers having different status. These four basic controller types are as follows:

Two-phase controller

One street leading-lagging left turn actuated controller

Multi-phase step controller

Fully actuated controller

The first two types of controllers occur at both major and minor intersections; an additional status bit is included at major intersections to indicate side street green. Considering the additional bit as a separate type of controller, there are six controller systems.

The two-phase controller at minor intersections has only one status indication bit. This bit is associated with main street green; thus, the two amber phases and the side street green all occur as an absence of main street green and are handled as undetected changes with the time check logic. The two-phase major controllers have a separate status bit for both main and side street, and each change is detected. The two-phase controller at the intersection may be either a step or actuated controller at the intersection; the controller mod kit provides the required interface. The software treats the two-phase controller as a step controller. The two-phase controller logic at major intersections has been thoroughly verified using the display board.

The leading-lagging left turn actuated controller has the major arterial as main street at all minor intersections. Each main street straight through signal has a separate green status indicator at minor intersections; the major intersection status indication includes a separate bit for side street green. Thus, during the main street green phase, one or both straight through status bits will always be on. As the leading left movement is terminated, the second straight through status bit will change to an on-bit; similarly, the first status bit will go off prior to the lagging phase.

The multi-phase step controllers have the capability of over 100 distinct subphase combinations per cycle depending on the number of left turns and whether the left turns are leading or lagging. Usually, the traffic engineer uses only one or two of these possible combinations. It appears logical to use a table for each type of multi-phase step controller. The status indications are an indication of a yellow light at any light and main street green indication. To detect a delayed green condition (which allows left turns), the second main street green signal is used to set the status indicator.

The fully actuated controllers have four status indication bits which allow determination of 32 possible movements per street. The fully actuated controller may use different combinations on any given cycle by skipping left turn movements or terminating leading left turn signals in different orders. The logic for the fully actuated controller has been designed and verified for lagging left turn movements using the display board.

For each signal change, the command verification logic determines which signal light has changed (green or yellow) and sets the appropriate surveillance output pointers. For each straight through signal change, the corresponding right turn output pointer is changed also.

Command Verification and Generation Logic

The command verification and generation logic is divided into three distinct processors which handle the four controller types having different status indications. The command verification logic determines if the controller status change corresponds to the command change when under computer control, or is legal when not under computer control. The command generation logic terminates the green phase or subphase and commands the next controller state. The time check logic commands the termination of the yellow movement for step controllers, insures ample duration for yellow movements and minimum green phases, and detects controller failure to respond to issued command.

Figure 55:
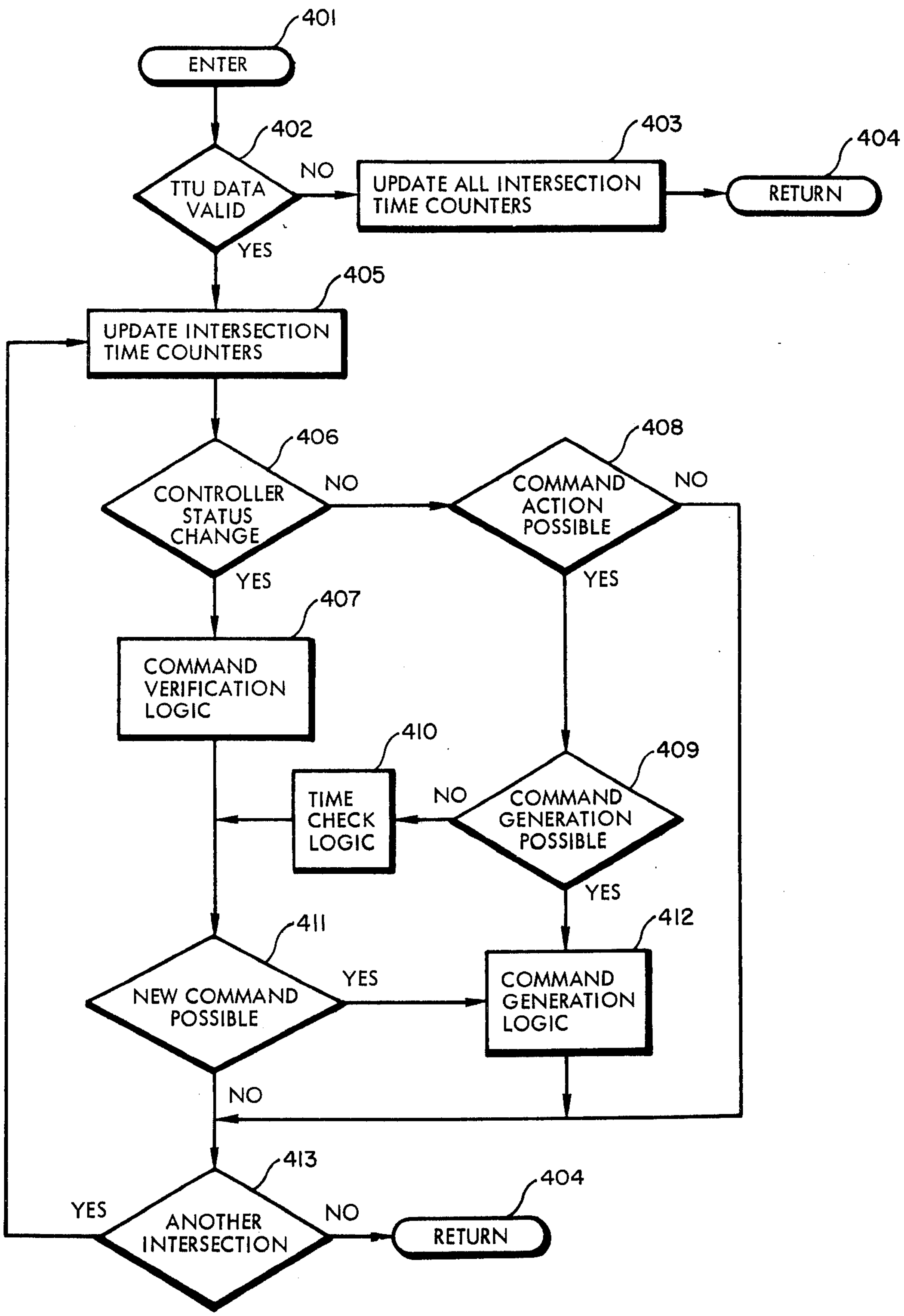
FIG. 55 is a functional block diagram of the command verification and generation logic according to the preferred embodiment of the present invention.

The overall logic is shown in FIG. 55 and in Appendix M. Appendix M comprises an example of machine listings in assembly language for the block diagram shown in FIG. 55. Statement numbers 1–24, or Appendix M, set forth the external references and definitions, and statements 25–63 set forth data statements.

Referring to FIG. 55 and Appendix M, data is entered by block 401, corresponding to statement 64. Block 402, corresponding to statements 65–75 determines if the incoming TTU data is or is not valid. If the incoming TTU data is not valid, block 403, corresponding to statements 428-432 updates all intersection time counters and no action is performed. Return block 404 corresponds to statements 321–323.

If the incoming TTU data is valid, block 405, corresponding to statements 76–82, updates intersection time counters.

The test for command action, block 406, corresponding to statements 83–90, is based on the time of next possible controller change. If no possible change can occur (e.g., waiting for a yellow or minimum green duration), then the logic proceeds to the next intersection. If a green shortening/green extension time has been reached, the command generation logic is called. The time check logic is entered to terminate the yellow movement or at the end of the minimum green time; the DISC subprogram is called at the end of the minimum green time for the first main street subphase. The new command possible test is provided for single light changes (left turns) where it is possible to independently change the other signal.

Each of the three distinct processors within this logic is written with a common initialization subprocessor, separate subprocessors depending on controller status indication type, and a common action parameter subprocessor. The common action parameter subprocessor sets the control bits or words indicating what command action has been initiated or verified.

Block 407 corresponds to statements 91–194, 282–310 and 324–427, block 408 corresponds to statements 195–203, block 409 corresponds to statements 204–205, block 410 corresponds to statements 206–248 and 253–281, block 411 corresponds to statements 248–252, block 412 corresponds to statements 433–464 and block 413 corresponds to statements 311–320.

MAJOR INTERSECTION SPLIT ADJUSTMENT SUBROUTINE DISC

The function of subroutine DISC is to optimize the splits at major intersections on a cycle-by-cycle basis. An overview of the functions performed by DISC and its relationship to other parts of the software package follows.

Figure 56:
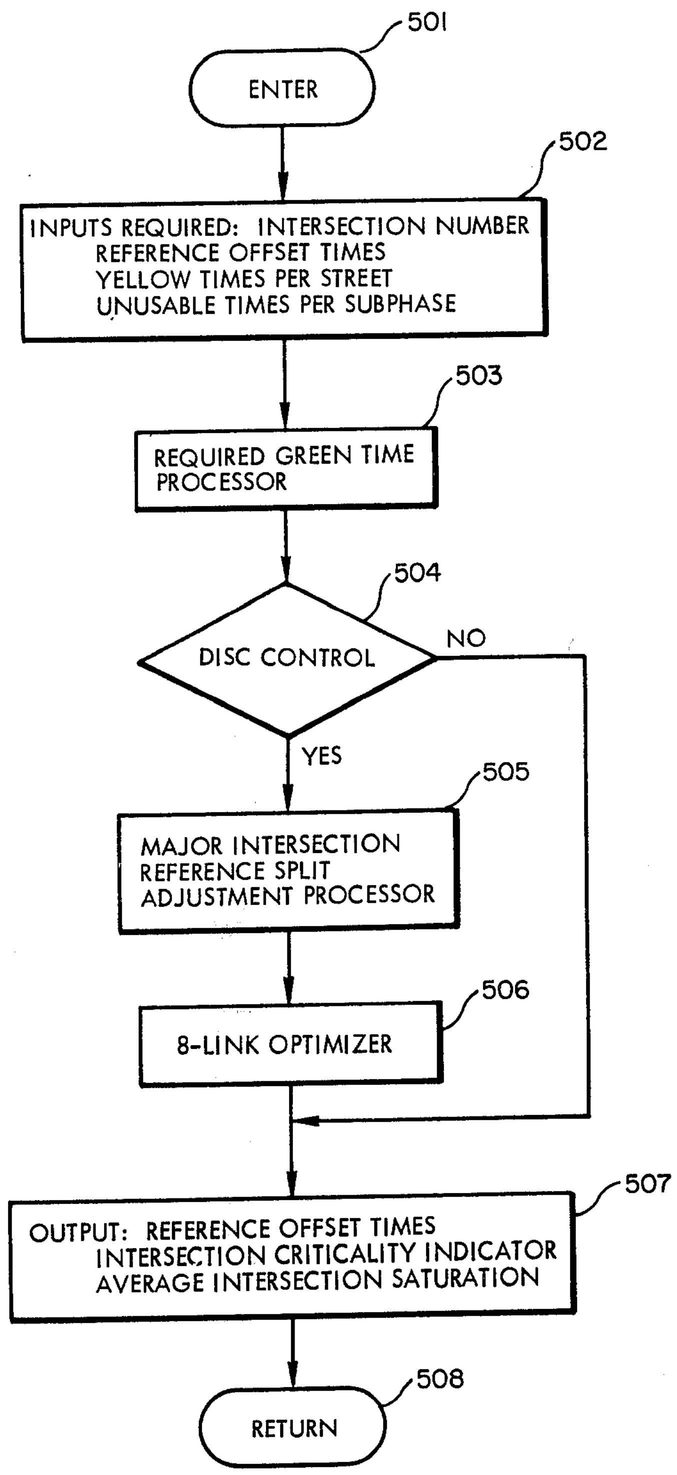
FIG. 56 is a functional flow chart of the DISC subroutine.

A functional flow chart of subroutine DISC appears as FIG. 56. An example of machine listings in assembly language corresponding to FIG. 56 appears as Appendix N.

Major Intersection Split Optimization

A main arterial is a roadway carrying heavy volume during rush hour periods. At a major intersection, where two arterials cross, saturation may result for part of the rush hour period due to a heavier combined demand from the two arterials than the green time available within the cycle length. Saturation may also occur when a fixed green period for one phase or subphase is insufficient to process the current demand, yet more time is allotted to another phase than required during a particular cycle. The objective of the DISC subroutine is to adjust the green times for each phase and subphase to eliminate or minimize saturation while maintaining the network progression. To accomplish this objective, the DISC subroutine serves as a bridge between the level 1 control, establishment of network progressions, and level 3 control, green shortening/green extension.

The level 2 control tasks performed by DISC are as follows:

Adjustments of reference offsets at each major intersection to effectively process the measured traffic flow based on a five cycle average of input volume data Calculation of intersection criticality The reference offsets for main and side street green initiation are provided by ONPOP which established the optimum network progression. ONPOP is fully disclosed in a co-pending application assigned to the same assignee as the present invention and filed concurrently herewith. The current split is simply the difference between these two offsets. To adjust the split necessitates changing one or both of the reference offsets which will change the current network progression. To minimize the perturbation to the network progression, an 8-link optimization technique is used to implement the required splits. By considering the four links approaching the intersection and the four links downstream of the intersection, the 8-link optimizer adjusts the reference offsets to minimize both stops and delay and to eliminate cycle failure where possible along all 8 links, and thus maintain the network progression.

The intersection criticality is a parameter indicating whether the intersection is servicing low volume, medium volume, heavy volume, or is saturated. Volume fluctuations can be handled quite well under low or medium volume conditions. Under heavy volume conditions, an increase of volume along one street can exceed the normal split in effect for this cycle and require a green extension period. Similarly a decrease of volume along one street will yield a green shortening interval which can be utilized by the other street. The intersection criticality parameter is used to detect gaps under saturation, and the green shortening/green extension interval is used to insure maximum throughput and thus clear the cycle failure volume as quickly as possible.

The intersection criticality parameter is set using the average input volume plus the cycle failure volume to determine the level of saturation.

The split is adjusted based on using a five cycle average of input volume plus the cycle failure volume. Thus cycle failure has a weight of one when used for setting the intersection criticality and a weight of one-fifth for computing the desired split. This weighting allows a stability of the normal split while allowing the command generation logic to solve the problem of local fluctuations of input volume.

Referring to Appendix N, statements 1–23 provide external references and definitions. Statements 24–52 provide data for said DISC subroutine.

Referring to FIG. 56 and Appendix N, block 501 corresponds to statement 53, block 502 is explanatory and corresponds to no code, block 503 corresponds to statements 54–170, block 504 corresponds to statements 171–199, block 505 corresponds to statements 200–280, block 506 corresponds to statements 281–426, block 507 is explanatory and corresponds to no code, and block 508 corresponds to statement 427.

DISC Logic

Subroutine DISC performs the major intersection split optimization using three separate processors linked together i.e., the required green time processor, the major intersection reference split adjustment processor, and the 8-link optimizer. The required green time processor determines the green times required per phase or subphase on the latest measurements of input volume and cycle failure. The major intersection reference split adjustment processor computes a new split using three saturation criteria tests: no saturation, saturation in two directions, and saturation on all four approaches. The 8-link optimizer implements the split.

Subroutine DISC is called once per cycle by the command verification and generation logic after the minimum green time has elapsed for the main street. If dynamic intersection signal control (DISC) is not to be performed, the computations are terminated after the required green time processor has been executed. The average saturation level is thus always updated for ONPOP. Without DISC control, there is no method for updating the major intersection splits except through the teletypewriter key in processor. The intersection criticality parameter is also updated even through DISC control is not selected.

The inputs required are the reference offset time for both main and side streets. In addition, the yellow times are required for both streets; the yellow duration may be set differently for each street based on intersection width. The time not usable per subphase is computed as the starting delay plus the portion of the yellow time that vehicles do not enter the intersection. The required subphase time allotted is equal to the sum of the required green time plus the unusable time.

The following paragraphs contain discussions of the three processors contained in DISC.

Figure 57A:
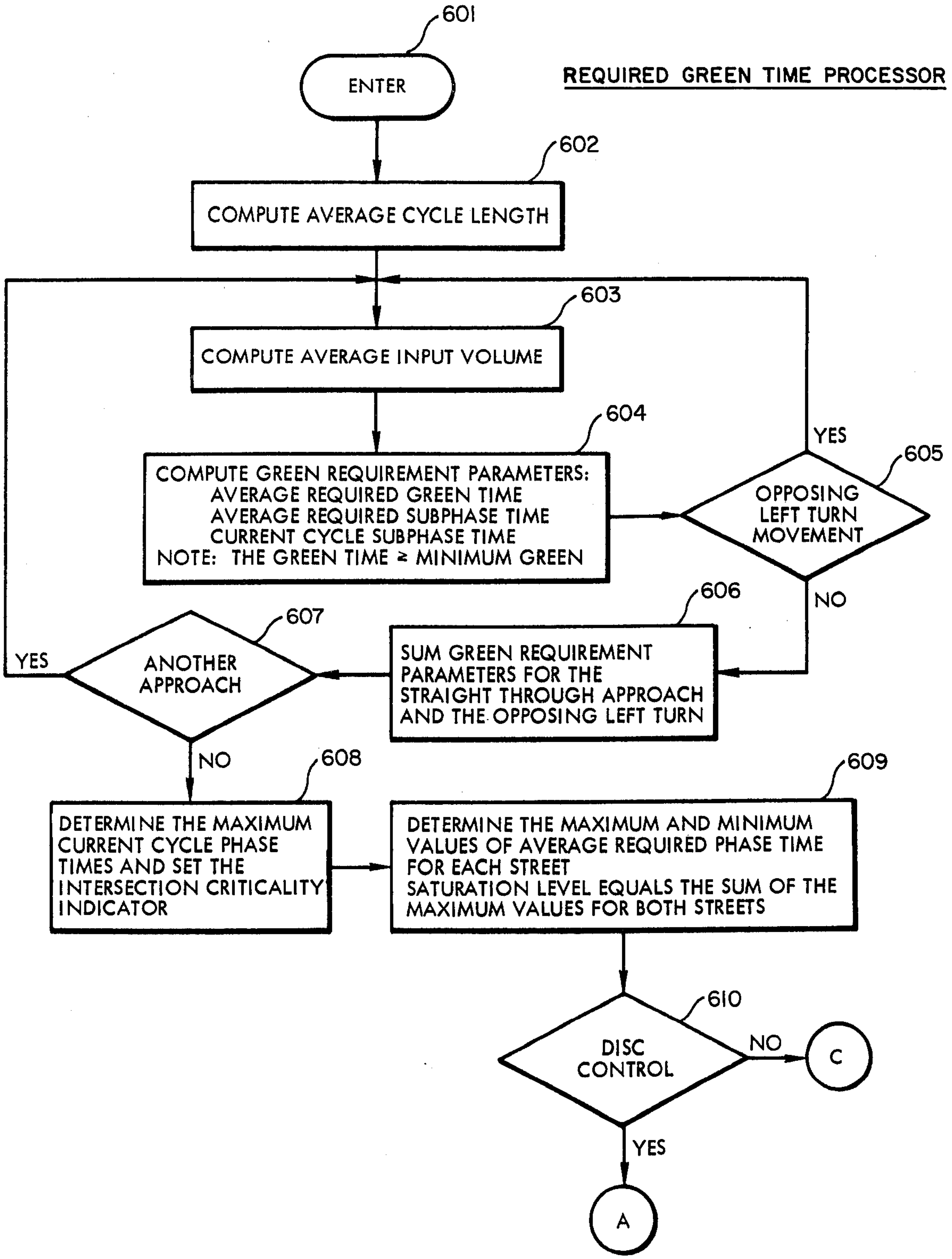
FIG. 57A is a functional flow chart of the required green time processor to the DISC subroutine of FIG. 56.

A functional flow chart of the Required Green Time Processor appears as FIG. 57A. An example of machine listings in assembly language corresponding to FIG. 57A appears as Appendix M1.

Required Green Time Processor

The required green time processor computes three green time requirement parameters for each controlled signal at the intersection; the average required green time, the average required subphase time, and the current cycle subphase time. The average required green time is the sum of the average input volume and one-fifth of the cycle failure volume multiplied by the total discharge headway for all lanes. If the average required green time is less than the minimum green time, it is set equal to the minimum green time. The average required subphase time is obtained by adding the unusable time to the average required green time. The current cycle subphase time is computed in the same way as the average required green time except the cycle failure volume is given a weight of one.

The average input volume is the sum of the previous four cycle history of input volumes plus the predicted input volume on the current cycle. For peripheral intersections, the predicted volume is not available and is set equal to the average input volume on the previous four cycles. Whenever a change in network cycle length occurs, the sum of times during which the input volumes were collected differs from the current cycle length. The average input volume is adjusted to correspond to the current cycle length by using the average cycle length over the previous four cycles.

The order of considering each link starts with the north intersection straight through approach. If an opposing left turn movement (south left turn approach) is controlled, then the three green requirement parameters for it are next computed. The total phase times are determined by summing the three green requirement parameters for the straight through and left turn movements. This procedure is repeated for the east, south and west straight through and opposing left turn approaches.

Next, the maximum values of phase times for the north-south street and the east-west street of current cycle phase time are summed. The ratio of this maximum value to the cycle length is compared against preset saturation levels to set the intersection criticality indicator. Since the current cycle subphase times are based on the average input volume plus the cycle failure volume, the green shortening/green extension logic will automatically attempt to clear this situation on the current cycle. The intersection criticality indicator may fluctuate from cycle to cycle due to numerous causes such as platoon dispersions or a network transition.

Both the maximum and minimum values of average required phase time for the north-sourth street and the east-west street are determined. Knowledge of which direction along the street has the maximum value or minimum value is used to compute the optimum split. The saturation level is computed for the intersection as the sum of the maximum value of average required phase time and store for use by ONPOP. If DISC control is not in effect, subroutine exit is made.

Block 601 corresponds to statement 53, block 602 corresponds to statements 54–90, block 603 corresponds to statements 91—133, block 604 corresponds to statements 134–160, block 605 corresponds to statements 161 and 162, block 606 corresponds to statements 163 and 167, block 607 corresponds to statements 168–170, blocks 608 and 609 correspond to statements 171–194, block 610 corresponds to statements 195–199.

Figure 57B:
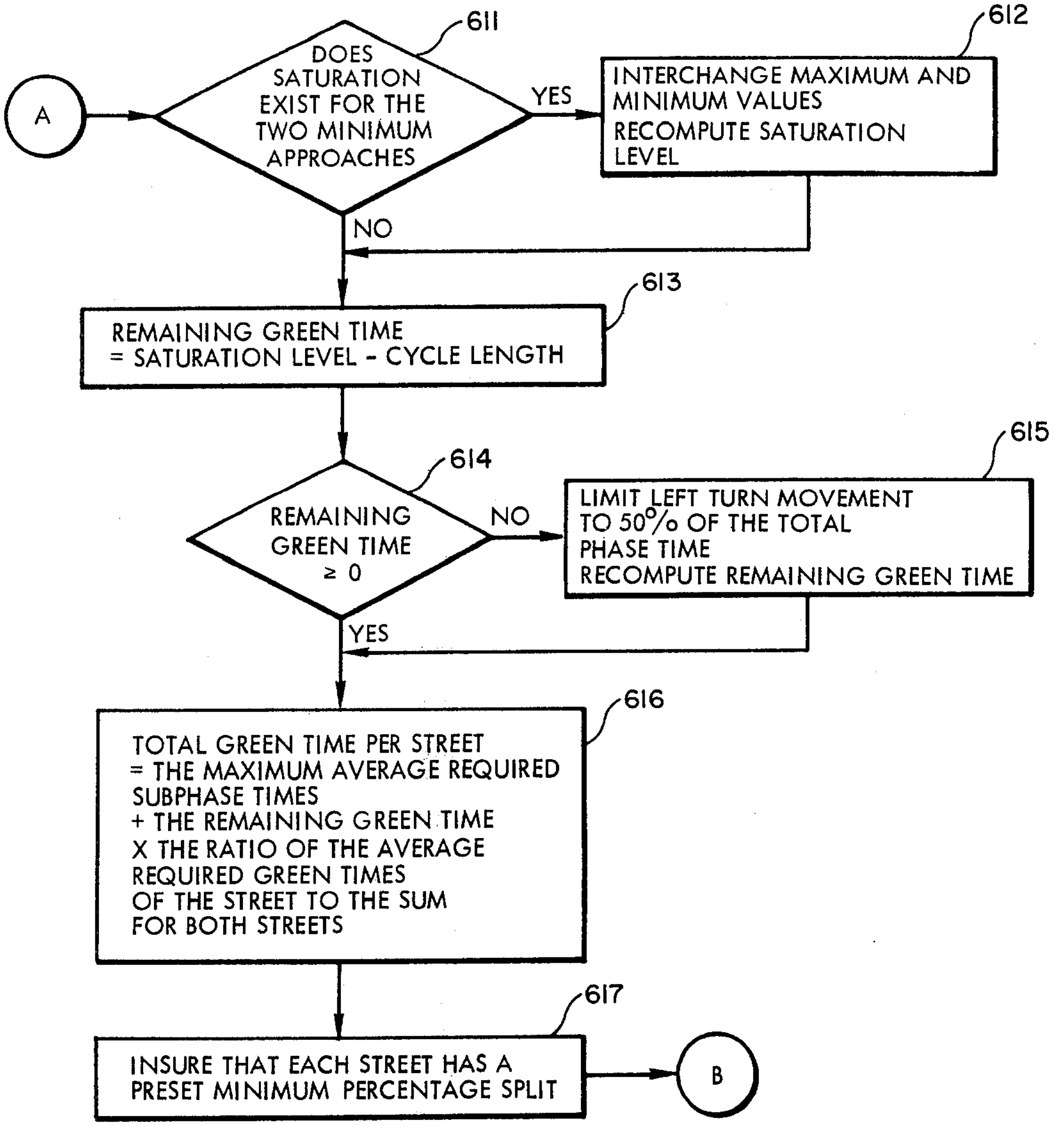
FIG. 57B is a functional flow chart of the major intersection reference split adjustment processor of the DISC subroutine of FIG. 56.

A function a1 flow chart of the Major Intersection Reference Split Adjustment Processor appears as FIG. 57B. An example of machine listings, in assembly language corresponding to FIG. 57B appears as Appendix N2.

Major Intersection Reference Split Adjustment Processor

Under DISC control, the optimum split is computed for three conditions: no saturation, saturation in two directions, or saturation in all four directions. If saturation exists in all four directions, the split is based on the minimum flow directions on each street. This will insure processing the maximum volume per cycle. From a logic standpoint, the values of maximum and minimum parameters are simply interchanged when saturation occurs in all four directions, permitting the split to be computed with a single set of equations.

The remaining green time is computed as the saturation level minus the cycle length. This difference represents the amount of time to be apportioned between the two streets. If the remaining green time is greater than zero, the intersection is not saturated, and the excess green time is proportioned between the streets based on the average required green times of each street. If the remaining green time is less than zero, the intersection is saturated, and the negative green time is removed using the same street proportioning method. However, if saturation occurs, the left turn movements are limited to 50 percent of the cycle prior to computing the split. This test is to prevent one left turn land from unreasonably delaying the multilane straight through processing.

The ratio of the average required green time per street to the sum of these green times for both streets is used to proportion the positive or negative remaining green time. The ratio of the computed total green time per street to the cycle length is the new split. The new split is checked against a preset minimum green time, and reset if either street split falls below the minimum percentage. The present minimum percentage split provides a safeguard against sensor failures and enables the traffic engineer to preselect the split.

Block 611 corresponds to statements 200–207, block 612 corresponds to statements 216–219, block 613 corresponds to statements 208 and 209, block 614 corresponds to statement 210, block 615 corresponds to statements 220–232, block 617 corresponds to statements 250–280.

Figure 57C:
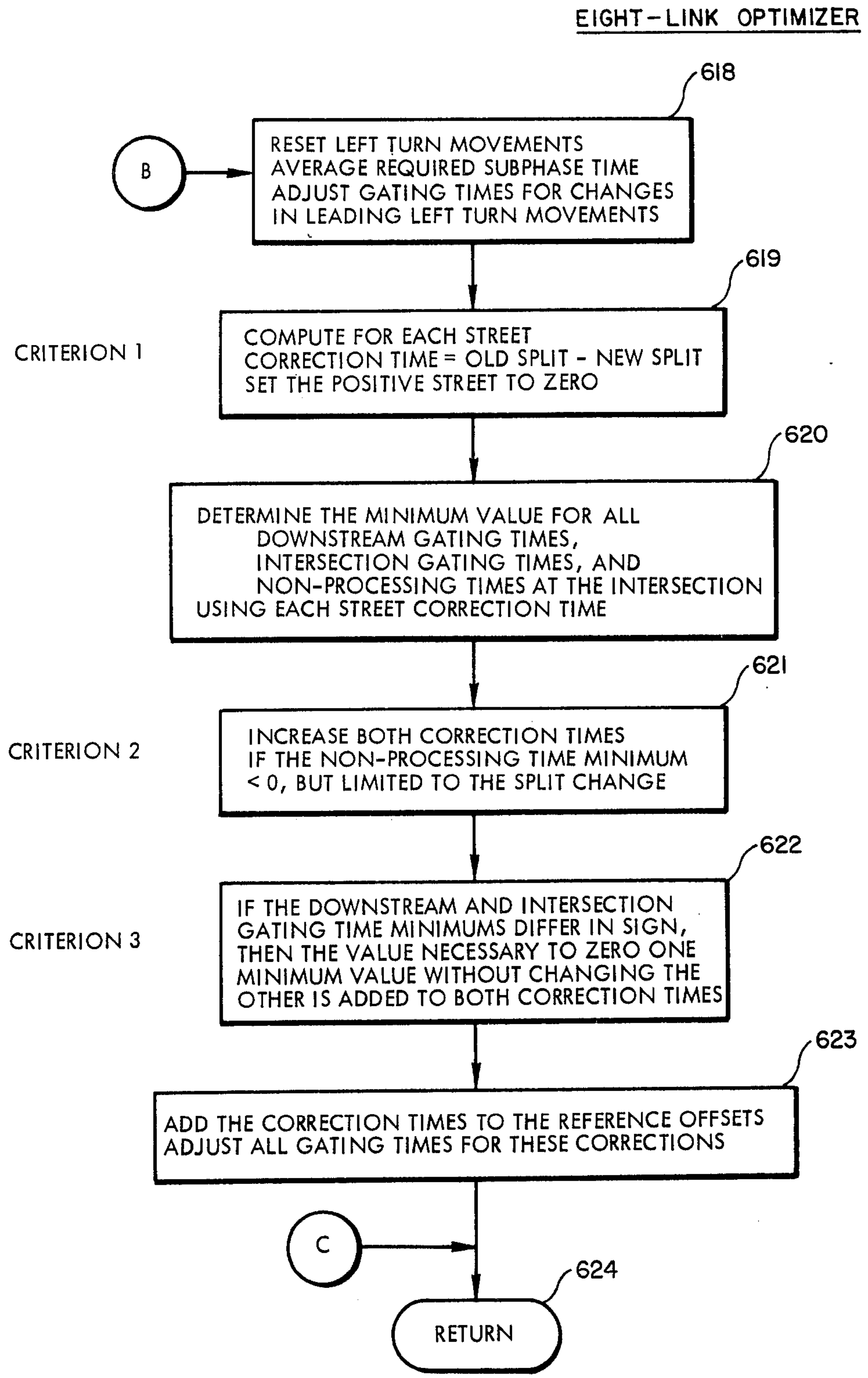
FIG. 57C is a functional flow chart of the eightlink optimizer of the DISC subroutine of FIG. 56.

A functional flow chart of the 8-link optimizer appears as FIG. 57C. An example of machine listings in assembly language corresponding to FIG. 57C appears as Appendix N3.

8-Link Optimizer

The objective of the 8-link optimizer is to implement the adjusted split while maintaining the optimum network progression. Offsets for main street, side street or both streets may be changed to achieve the adjusted split. The 8-link optimization technique will change either one or both reference offsets depending on three separate criteria. The first criterion reduces the reference offset for the street receiving the additional green time. The second criterion will increase both street reference offsets if the first criterion has not allowed the street that has lost the additional green time to process all vehicles. The third criterion attempts to reduce delay along all 8-links. The success of the third criterion depends on the network geometry and provides a method to correct for changes at neighboring intersections.

Before implementation of the new split, the left turn movements average required subphase time is reset for the command generation logic. If the duration of a leading left turn movement has changed, the gating time for the opposing straight through link must be changed accordingly. Whenever the gating time changes at the intersection, the arrival of the platoon relative to the initiation of green for the downstream link has changed. The downstream gating time is also changed by adding the negative of the gating time changed. For example, consider a downstream link with gating time equal to zero; the traffic proceeding from the major intersection along this link will arrive at exactly the start of green at the downstream intersection. If the reference offset is decreased (yielding negative gating) at the intersection, traffic will arrive downstream prior to the start of green and be delayed by the corresponding amount, a positive gating time increment.

If one of the streets require additional green time, criterion 1 is satisfied and the associated actions are taken. The correction time is computed as the difference between the old split and the new split for the street receiving the additional green time. The street losing green time is given a correction time of zero. The new split can thus be implemented by adding the correction times to the reference offsets. The result of this action is to decrease the offset (i.e., initiate green earlier) for the street receiving the additional green.

The minimum values for three separate parameters are next computed using east street correction time. The minimum values for the first parameter, non-processing time, are used for evaluating the second criterion.

The offset reduction performed in connection with the first criterion could result in a negative gating time (i.e., vehicles arriving after the start of green). In this case, the additional green time would be wasted. Action taken in connection with the second criterion to rectify this condition is described in the following paragraph.

The value of non-processing time is computed for each intersection link to determine how much additional green time is required to service the average volume if this link has a negative gating time. The time required to process the current cycle failure volume is added to the non-processing time for each link. If the minimum value of non-processing time is negative, then one of the links cannot process its normal input volume by using the first criterion. Correspondingly, the correction time is increased by the non-processing time minimum. This correction is limited to the original split correction change. The second criterion thus provides a method for increasing the reference offsets. The combination of the first and second criteria will tend to balance any series of alternating street split corrections over a long period of time.

The third criterion considers the effects of both the gating time changes at the intersections and along the four downstream links, which have been changed by use of the 8-link optimizer for other intersections in the network. If the minimum value of gating time at either the intersection or along the four downstream links is positive, then all four links suffer a delay at least equal to this minimum value. If the other set of four links has a minimum value that is negative, then traffic along at least one link is arriving after the start of green. Action associated with the third criterion reduces the delay to the four links having a positive gating time by the lesser of the absolute value of the two minimum values.

The sum of correction times made in connection with all three criteria is added to the reference offsets. The gating times are appropriately adjusted to correspond to these corrections. A return is then made to the command verification and generation logic.

Block 618 corresponds to statements 281–315, block 719 is explanatory and was previously stored in statement number 276 of Appendix N2, block 620 corresponds to statements 316–347, block 621 corresponds to statements 348–354, block 622 corresponds to statements 355–376, block 623 corresponds to statements 377–416, and block 624 corresponds to statements 417–427.

Figure 58:
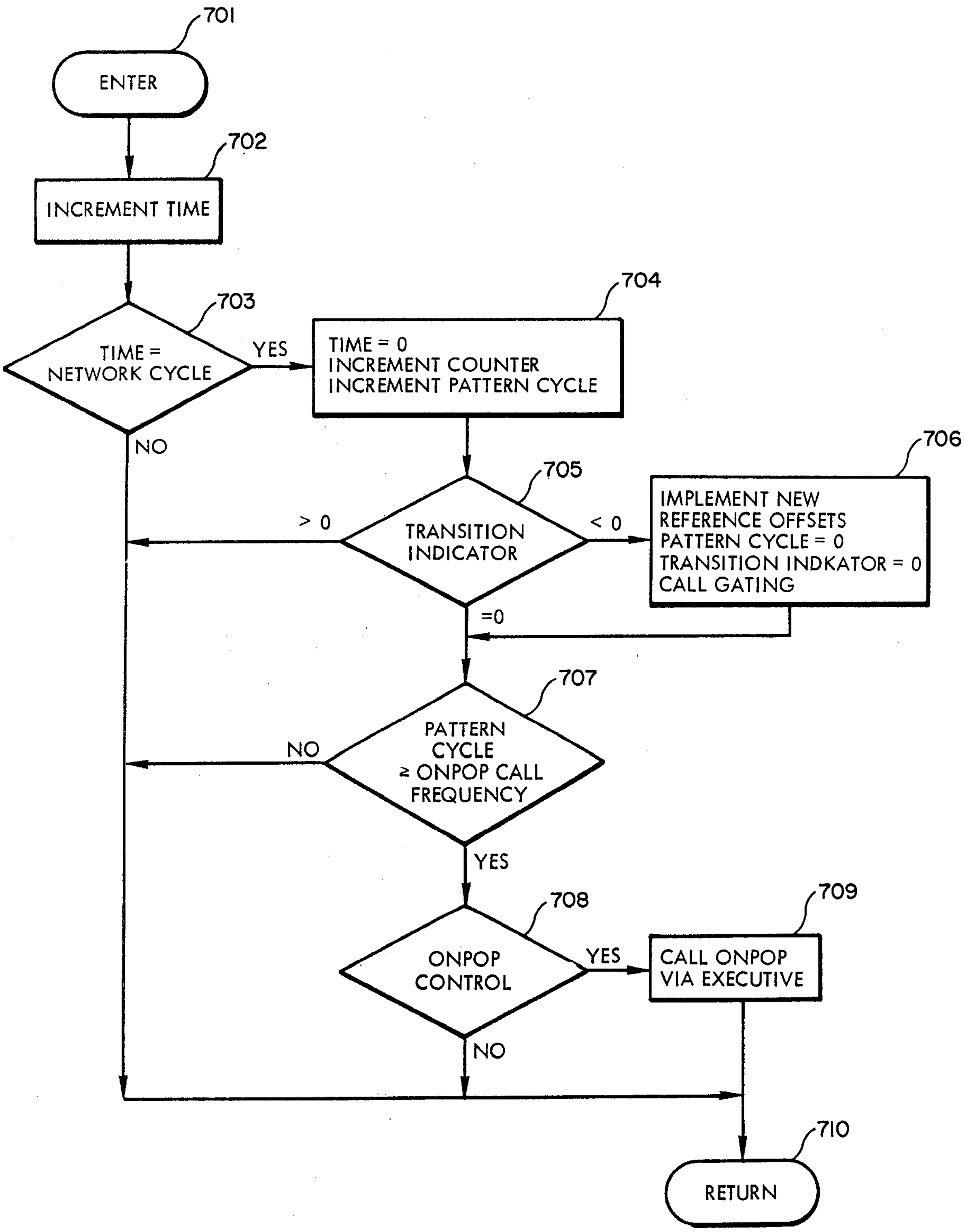
FIG. 58 is a functional flow chart of the network transition logic.

A functional flow chart of the Network Transition Logic appears as FIG. 58. An example of machine listings in assembly language corresponding to FIG. 58 appears as Appendix 0.

NETWORK TRANSITION LOGIC

The network transition logic updates the time in the network cycle, calls ONPOP, and implements the new control pattern. The time for calling ONPOP and implementing a new pattern has been selected as the start of a network cycle based on two indicators: a transition indicator and the pattern cycle. Both the transition indicator and the pattern cycle are set to zero at the time of each new signal pattern implementation. The pattern cycle is incremented by one each cycle thereafter. When the ONPOP call frequency equals the pattern cycle, ONPOP is called and the transition indicator is set to one by XCHEI (a part of ONPOP). Thus, ONPOP cannot be called a second time while in execution. If ONPOP selects a new signal pattern, the transition indicator is set negative, and the new pattern will be implemented at the start of the next cycle. If ONPOP determines that a new signal pattern is not required, then the transition indicator is reset to zero, and ONPOP will be called again at the start of the next cycle.

For the display board system, preselected patterns may abe requested and are implemented by setting the transition indicator to a negative number. The preselected pattern must have been stored in the ONPOP signal pattern array for implementation. The parameter, counter, is also updated each cycle and is used for the network summary printouts. A special counter is also used to eliminate calls to ONPOP during the network initialization period for the display board system. It is also possible to stop the calls to ONPOP by a special switch on the display board.

To integrate the new network pattern into the foreground split optimization performed by the DISC subroutine, special gating time calculations are computed for each major intersection. The basic gating time calculations are discussed below and performed by a subroutine called GATING.

The network transition logic is shown in FIG. 58 and corresponding machine listings are shown in Appendix O.

Referring to FIG. 58 and Appendix O, block 701 corresponds to statement 44, block 702 corresponds to statements 45–47, block 703 corresponds to statements 48–49, block 704 corresponds to statements 50–57, block 705 corresponds to statements 58–59, block 706 corresponds to statements 60–104 and 428–481, block 707 corresponds to statements 105–110, block 708 corresponds to statements 111–112, block 709 corresponds to statement 113 and block 710 corresponds to statements 114–115.

Gating Time Calculations

The optimization parameter used by the 8-link optimizer is called the gating time for each straight through link. The gating time is calculated as follows:

$$\Delta T_{G_{ij}} = (T_{REF_I} - T_{REF_J}) \text{ modulus } (N_{CYCLE}) - I_{OFFSET_{ij}}$$

where the reference offsets, $T_{REF}$, are the appropriate start of green for the straight through movement along link $ij$ connection intersections I and J. The idealized offset, $I_{OFFSET}$, is the travel time between the two intersections determined by the average speed computed by the surveillance subprogram. If the gating time can be maintained as zero, then a perfect progression would be in effect. The 8-link optimizer attempts to reduce this gating to as close to zero as possible for all 8-links.

After any change in the network signal pattern, subroutine GATING is called by the network transition logic to compute the value of gating time for all links within the network. Subroutine DISC which performs the major intersection split optimization updates the value of gating time for all 8-links optimized whenever a new split is implemented. The value of gating time is also updated whenever the duration of a leading left turn movement changes since this changes the start of the straight through green.

The background control program contains two major modules; XCHGI/XCHGO and ONPOP. ONPOP is an acronym for "online network progression optimization program," and XCHGI/XCHGO are acronyms for "exchange-in" and "exchange out" respectively. The ONPOP subroutine computes optimum network signal patterns, and XCHGI/XCHGO interfaces the FORTRAN language ONPOP subroutine with the assembly language foreground programs. ONPOP is discussed first, followed by XCHGI/XCHGO.

OVERVIEW OF ONPOP

The basic function of the ONPOP Subroutine is to compute signal cycle lengths and offsets for each major intersection in the street network. These computations are made based on splits, idealized offsets, and traffic data supplied by subprogram DISC which is described in a copending application assigned to the same assignee as the present application and filed simultaneously herewith. The cycle length and offsets are computed so that the weighted sum of vehicle stops and delays over the network are minimized.

The subroutine is executed every third signal cycle; however, the capability exists in the traffic control system of the present invention to alter the frequency of execution. The subroutine runs in the background mode in the system, that is, it is frequently interrupted during its execution so that the CPU may execute the foregoing tasks of the software for the traffic control system. The background task is scheduled by the DISC subprogram.

Several subfunctions are performed by the subroutine in order to accomplish the basic function. These subfunctions are subroutine input/output, input error detection, subnetwork link and intersection numbering, signal cycle range selection, optimization decision, network optimization, solution evaluation, and subnetwork interfacing. The subfunctions are described below.

ONPOP Subroutine Input and Output

Figure 59A:
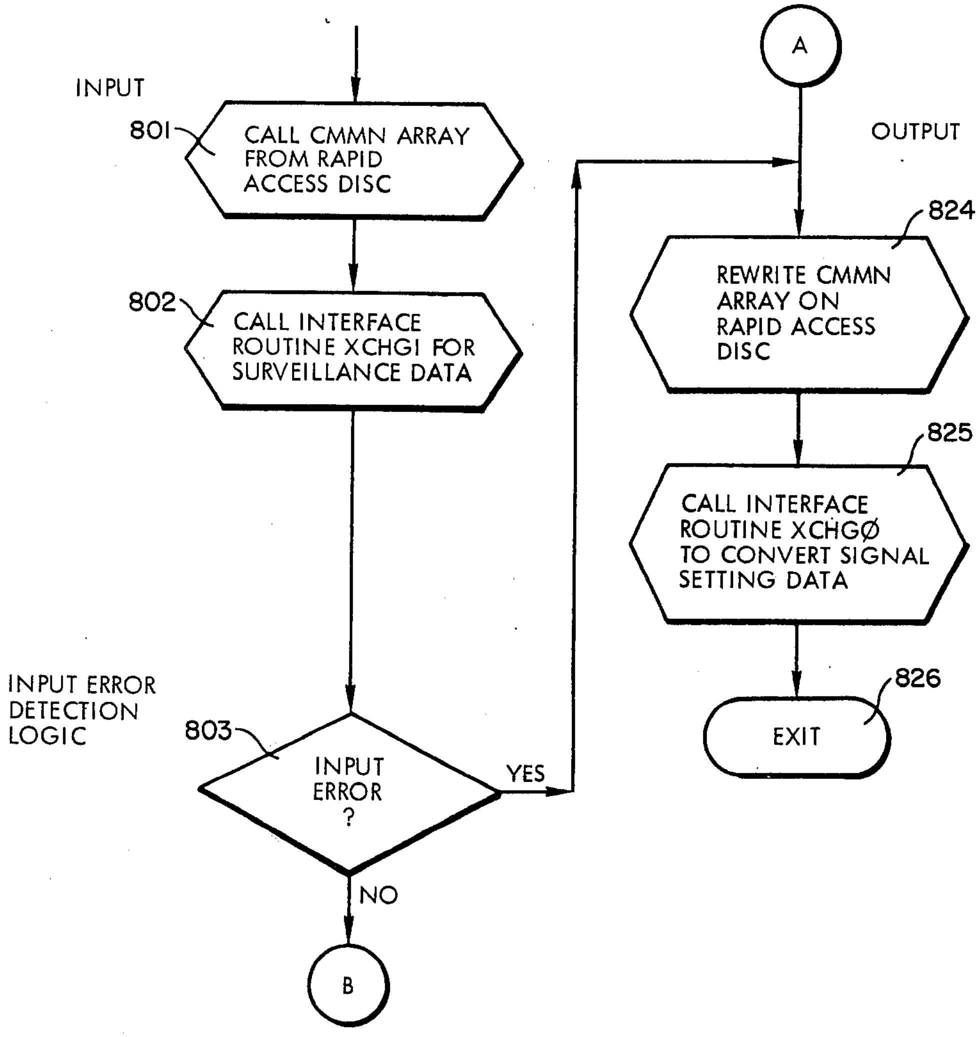
FIGS. 59A – 59F is a functional flow chart of the ONPOP algorithm.

These input/output subfunctions are shown schematically in FIG. 59A. Inputs to the subroutine are supplied by two sources. One source is the Dynamic Intersection Signal Control (DISC) Program; the other is the Rapid Access Disc (RAD). The data obtained from DISC enters through the calling arguments of subroutine XCHGI shown in FIG. 60. This subroutine is described below. The data is converted from fixed point to floating point format immediately after having been obtained from the XCHGI subroutine. The data obtained from the RAD is read back into the RAD when ONPOP is exited.

Figure 60:
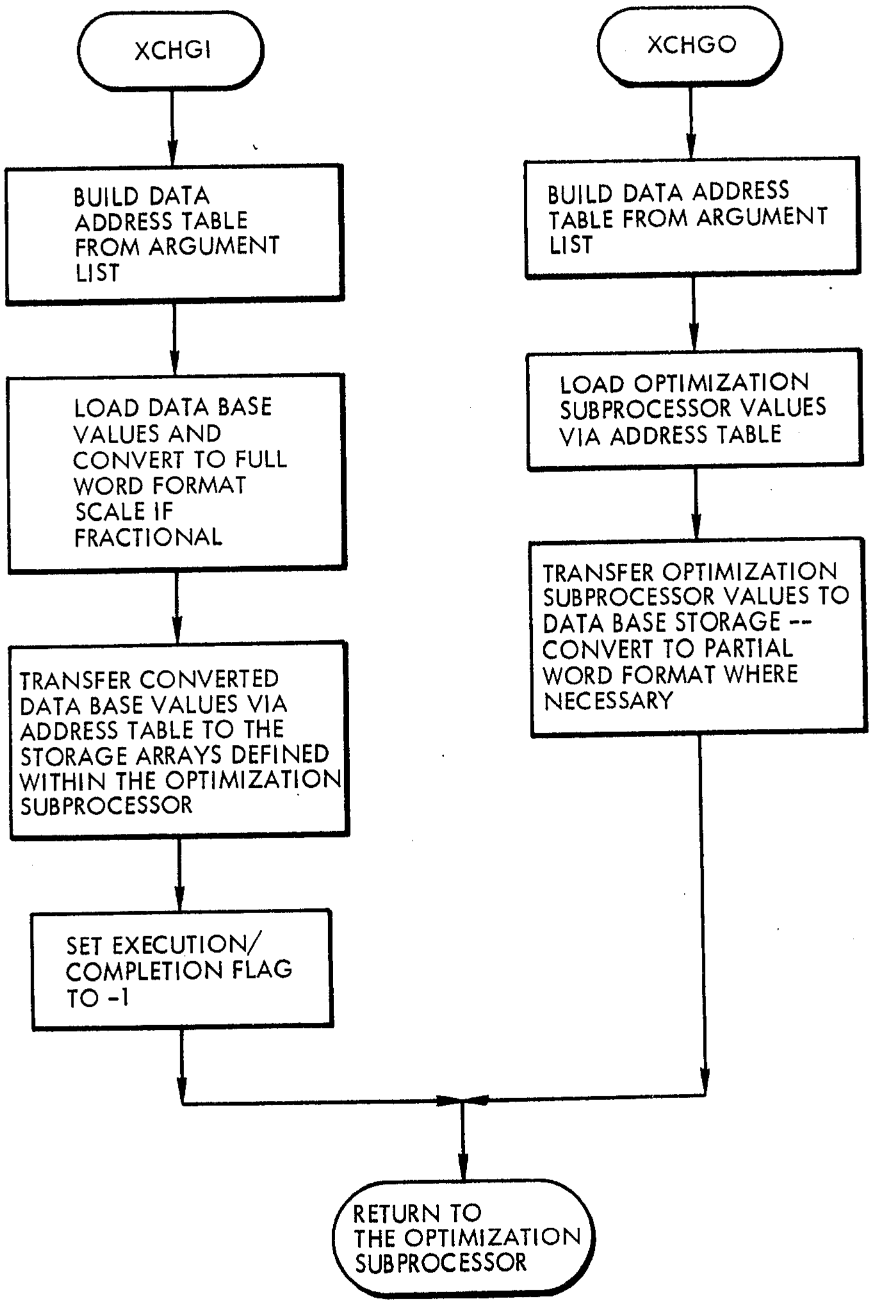
FIG. 60 is a functional flow chart of data exchange routines used with the ONPOP algorithm.

The basic outputs of the ONPOP subroutine are the optimum offsets for each traffic signal, north-south and east-west, and the network or subnetwork signal cycle lengths. This data is converted by subroutine XCHGO as shown in FIG. 60 so that the data is acceptable to the DISC subroutine.

Appendix P comprises an example of a FORTRAN source listing for ONPOP. The first column indicates the machine listing number and provides a convenient reference number for listing.

As shown in Appendix P, card numbers 1-50 provide machine instructions for dimensioning and equivalencing. Listings 51-54 provide for miscellaneous instructions. The remainder of the instructions will be explained with reference to the flow chart shown in FIG. 59. Notation used in the flow charts is given below.

| Schematic Drawing | Definition |
| --- | --- |
| 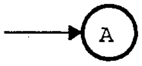 | Connector |

–Continued

| Schematic Drawing | Definition |
|---|---|
|  | Predefined operation |
|  | Processing |
| 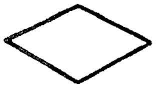 | Decision |
| 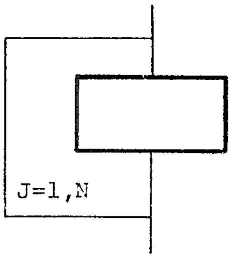  | 'Do' loop with J as index |

Input Error Detection Logic

The relative position of the input error detection logic in the ONPOP logic is shown in FIG. 59A. This logic insures that no gross errors or discrepancies exist in the quantities input by the traffic engineer. If an error or discrepancy exists, the ONPOP subroutine is exited.

Block 801, corresponding to listings 55 and 56 of Appendix A call the CMMN array from the rapid access disc.

Block 802, corresponding to listings 57-60 calls interface routine XCHGI for surveillance data.

Block 803, corresponding to listings 61-121 runs through a series of error checks. If an error or discrepancy exists, the ONPOP subroutine is exited via exit block 826. The exit routine is as follows, block 824, corresponding to listings 749–750, rewrites the CMMN array on the rapid access disc. Block 825, corresponding to listings 751–754, calls the interface routine XCHGO to convert signal setting data, and exiting block 826, occurs.

Eighteen tests are performed. These tests and their functions are listed in Table 2. If any of the tests fail, no network optimization is performed; the ONPOP subroutine is simply exited. Tests 1 and 3 are temporary and will be altered when ONPOP is expanded.

Table 2.

Input Variable Tests in φNPφP

| | Test | Function |
|---|---|---|
| 1. | ISSW1 > 0 | Insures that only backup signal cycle table is used (Temporary) |
| 2. | IRNG = 1 or 2 | Insures subscripts for backup signal cycle are in range |
| 3. | ISSW5 ≦ 0 | Insures that map generator option is not selected (Temporary) |
| 4. | 1 NφLNK 120 | Insures that number of network links is in range of present φNPφP capability |
| 5. | 2 ≦ NφINT ≦ 30 | Insures that number of network intersections is in range of present φNPφP capability |
| 6. | ILIM ≧ 1 | Insures at least one major north/south arterial to be optimized |
| 7. | JLIM ≧ 1 | Insures at least one major east/west arterial to be optimized |
| 8. | ILIM * JLIM ≧ 2 | Insures more than one major intersection has been input |
| 9. | INET = 1 or 2 | Insures number of subnetworks is within range of current φNPφP capability |
| 10. | INTFC = 0 or INET - 1 | Insures number of subnetwork interfaces is within range of current φNPφP capability |
| 11. | NφINT = MDATA (i,1) + MDATA (2,1) + MDATA (3,1) | Insures number of intersections input is sum of number in subnetworks and interfaces |
| 12. | NφLNK = MDATA (1,2) + MDATA (2,2) + MDATA (3,2) | Insures number of links input is sum of number in subnetworks and interfaces |
| 13. | (HSCL(i,1) - HSCL(i,2)) /9. ≧ HSCL(i,6) | Insures that actual increments in historical signal cycle data are |
| 14. | (HSCL(i,2) - HSCL(i,3)) | greater than or equal to specified |

Table 2.-continued

| Input Variable Tests in φNPφP Test | Function |
|---|---|
| /9. ≥ HSCL(i,7) | increments for high and low ranges, respectively. |
| 5. HSCL(i,1) > HSCL(i,4) | Insures that largest historical signal cycle is greater than midpoint of high range. |
| 6. HSCL(i,2) < HSCL(i,4) | Insures that midpoint of historical signal cycle range is less than midpoint of high range |
| 17. HSCL(i,2) > HSCL(i,5) | Insures that midpoint of historical signal cycle range is greater than midpoint of low range |
| 18. HSCL(i,3) < HSCL(i,5) | Insures that smallest historical signal cycle is less than midpoint of low range |

Subnetwork Link and Intersection Numbering

Figure 59B:
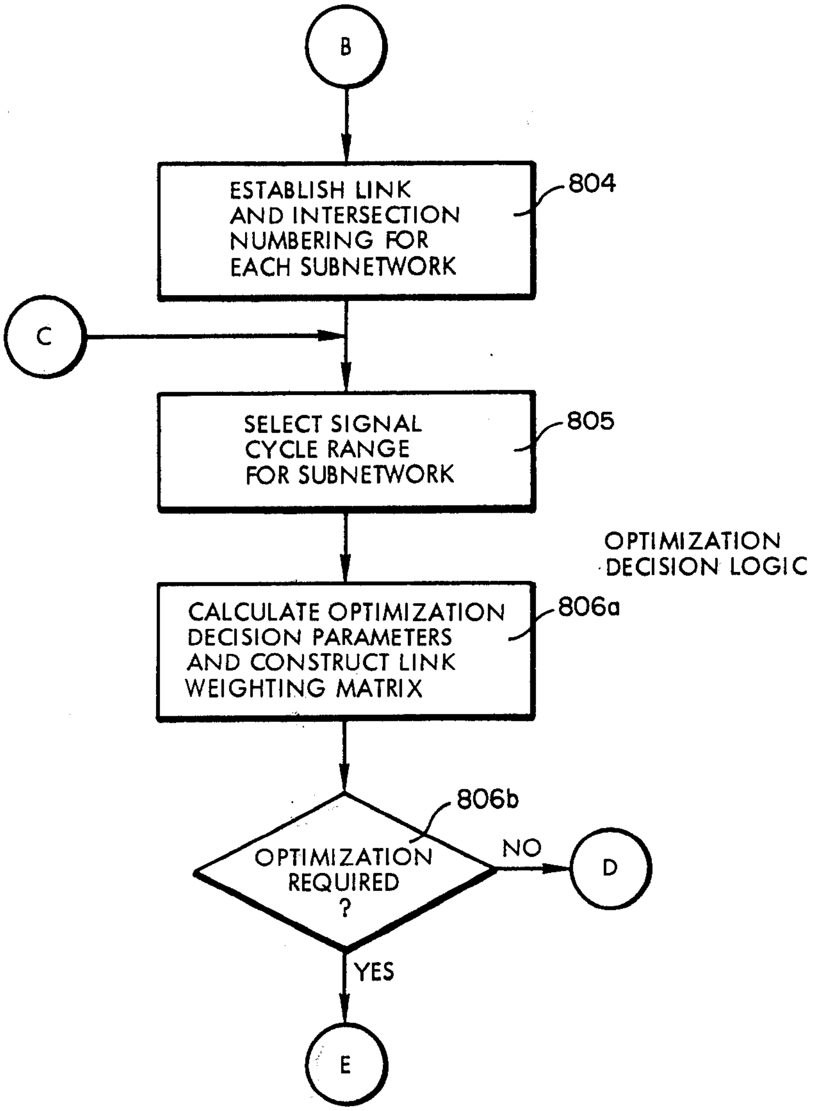
Figure 59C:
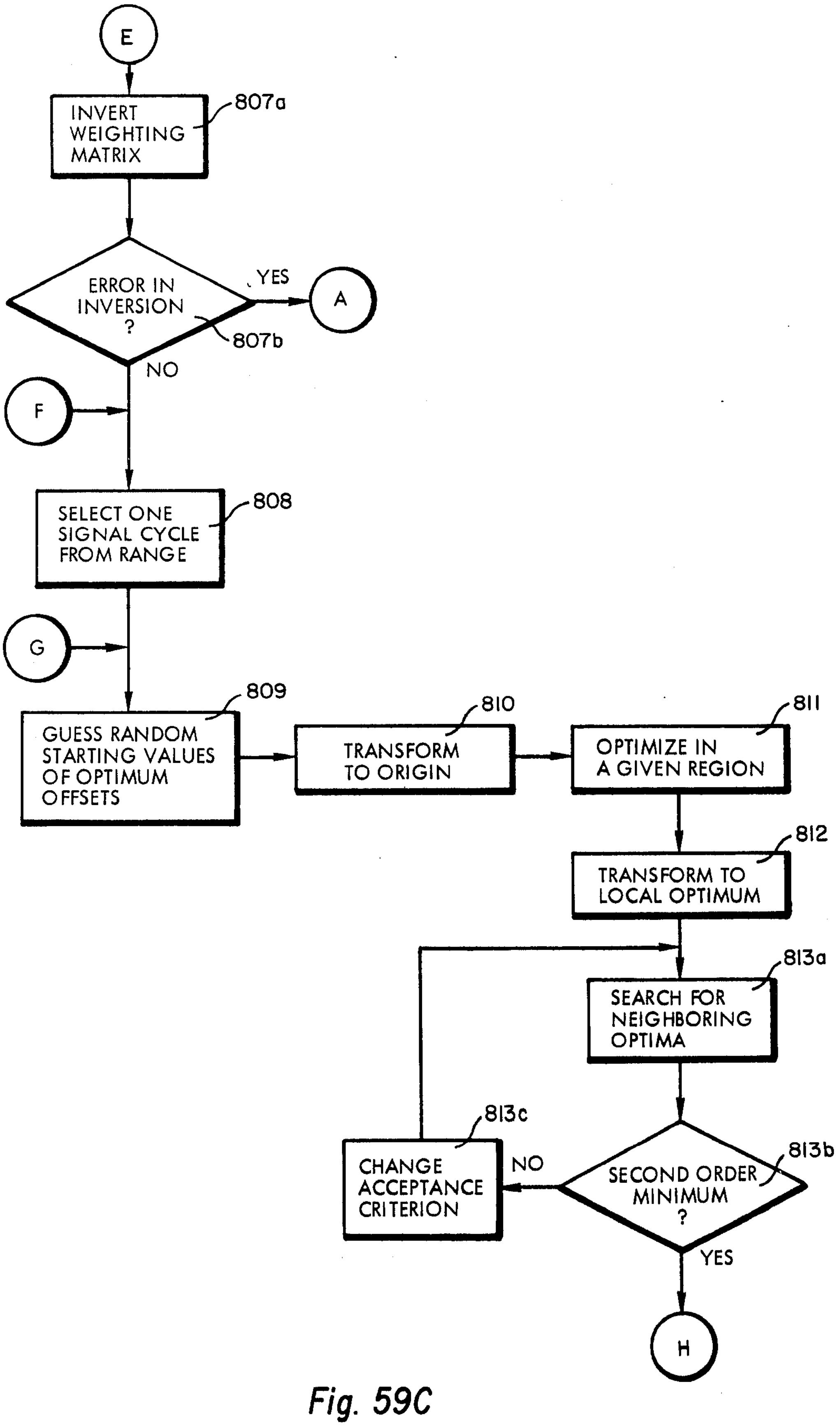
Figure 59D:
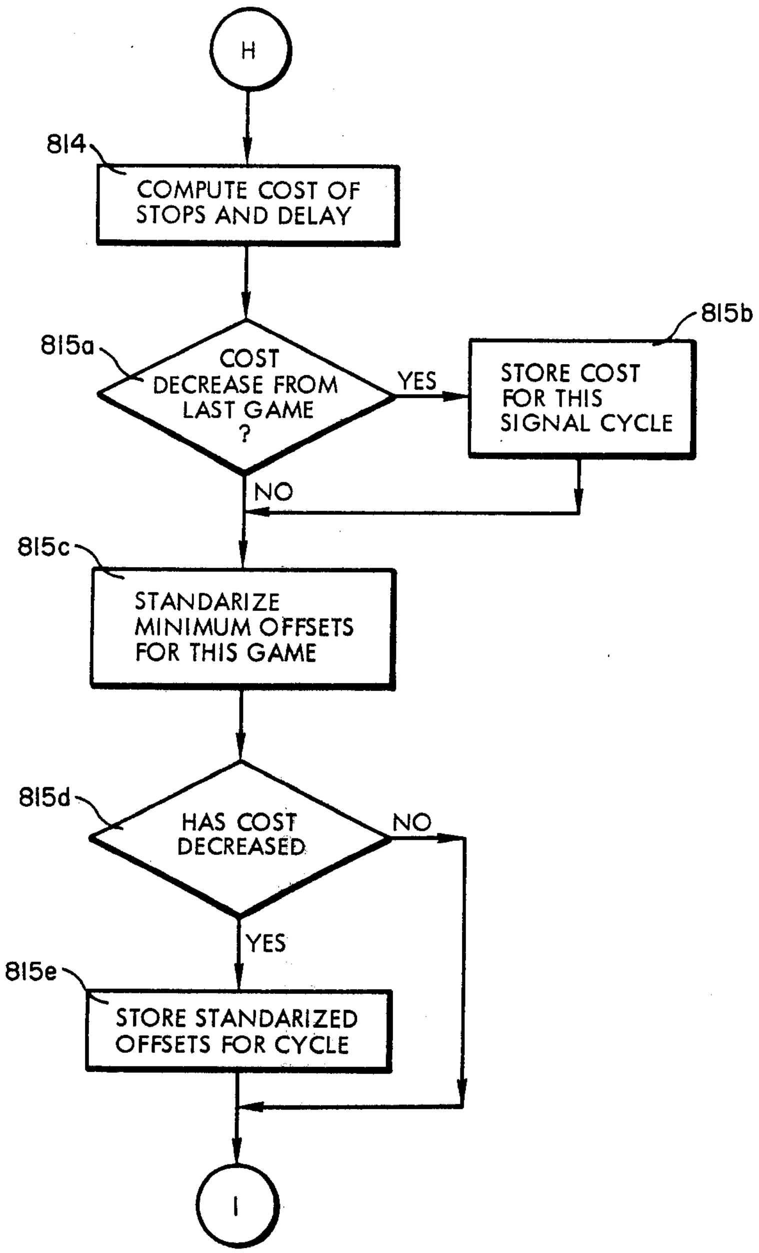
Figure 59E:
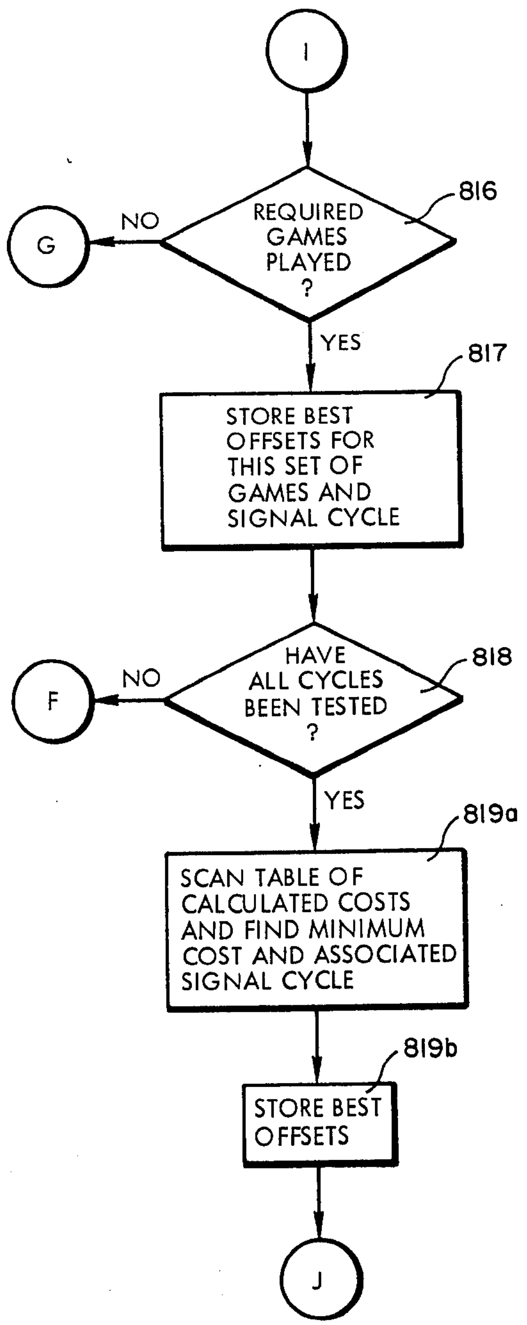

The logic for this subfunction is shown in block 804 of FIG. 59B. This corresponds to listings 122-178. The optimization logic calculates optimum offsets for the nodes (intersections) which are connected by links. To accomplish this optimization, a numbering system for links and intersections must be used in order to keep track of the incoming surveillance information and the outgoing solution data.

In the optimization calculations, each link is a one-way arterial connecting two optimizable nodes. Thus, a two-way street is considered as two links. Each link is assigned a 'tag' as is each node. Each node must be cross-referenced with each link. This cross-referencing is contained in the NDATA array of the ONPOP subroutine during execution of the optimization logic. The downstream and upstream intersection numbers are given for each subsetwork link by this array.

The NDATA array is loaded from a combination of the IDATA and MAP arrays. The information contained in the IDATA is never changing and represents a 'background' ordering for all links and intersections in the total network. The MAP array provides for dynamic capability. This array contains cross-referencing information tying background link numbers to optimization routine subnetwork link numbers.

Signal Cycle Range Selection Logic

This logic is shown in block 805 of the functional flowcharts of FIG. 59B and corresponds to listings 179–190. Two basic modes exist for selecting a signal cycle range to be tested by the optimization package. The mode selected depends upon the setting of the flag ISSW1 which is input into the program. If ISSW1 is greater than zero, a fixed input range of signal cycles is used. This option is used on the initial pass through the ONPOP subroutine. This fixed range is subdivided into a 'high' and a 'low' range; the high range has larger values of signal cycle than the low range; both ranges above have ten values each. The subrange selected depends upon the setting of the flag IRNG. If IRNG is set to 1 the high range is selected; if IRNG is set to 2 the low range is selected. On the first pass through the subroutine, the low range is arbitrarily selected. Thereafter, the subranges are selected based upon the percentage of subnetwork intersections having saturation above or below a threshold. The establishment of the setting for IRNG is summarized in Table 3.

The other mode for selecting a signal cycle range to be tested in the optimization logic involves computing a 'carryover' signal cycle range based upon current historical signal cycle data. The carryover range is computed just prior to exiting the subroutine and is stored for use on the next pass. This mode is selected if the flag ISSW1 is set less than or equal to zero.

Table 3.

| Range Selected | Criterion | Signal Cycle Range Selection Criterion for Backup, Startup Mode<br>Definition of Symbols | Current Values of Constants & Thresholds |
|---|---|---|---|
| High Range | IPCT > KCφNS(10)<br>where<br>IPCT=ISAT*100/MDATA(I,1) | IPCT = Decision parameter representing percentage of subnetwork intersections having saturation threshold, SAT<br>KCφNS(10 = Threshold on percentage of subnetwork intersections<br>MDATA(I,1) = Number of intersections in subnetwork, I<br>ISAT = Incremented for each subnetwork intersection having saturation greater than SAT<br>SAT = Intersection saturation threshold<br>SAT = XCφNS(10), if current signal cycle is in high range<br>SAT = XCφNS(9), if current signal cycle is in low range | KCφNS(10) = 25 |
| Low Range | IPCT ≤ KCφNS(10) | See above | |

The carryover data which is generated depends upon the relationship of the just calculated optimum solution and the historical signal cycle data. The carryover signal cycle data is generated assuming the just calculated optimum as the midpoint of the range. However, if either of the endpoints of this range is outside the range specified by the historical signal cycle data, the limiting value of the historical signal cycle data is used to calculate the carryover data. The increments between values of signal cycle in the carryover data are specified by historical data. Ten values of signal cycle data are loaded into the carryover array.

Optimization Decision Logic

On each pass through the ONPOP subroutine, the optimization decision logic is cycled to determine if a new signal pattern should be generated. If the logic shows that no optimization is required, the ONPOP subroutine is exited and past optimum signal patterns are used. This function is shown as blocks 806*a* and 806*b* in FIG. 59B and corresponds to listings 191–281 of Appendix P.

Decisions are made based on the following criteria:

1. Changes in network or subnetwork map
2. Changes in TTU status
3. Percentage of links having significant changes in weighted volume
4. Sum of absolute values of changes in weighted volume over subnetwork
5. Percentage of links having significant changes in idealized offset
6. Sum of absolute values of changes in idealized offsets over subnetworks
7. Percentage of intersections having significant changes in splits
8. Sum of absolute values of changes in splits over subnetwork
9. Percentage of intersections having significant changes in saturation
10. Sum of absolute values of changes in saturation over subnetwork.

The specific tests which are made to determine if optimization should take place are listed in Table 4. Weighting 'flags' (0 or 1) are used to establish the tests used during a day. Optimization takes place if any of the selected tests fail. Also given in Table 4 are definitions of variables along with the values of the constants and thresholds used in each of the tests and decision calculations. The constants and thresholds are read from the RAD on every entry to the subroutine.

Table 4.

Optimization Decision Criterion
(Optimization Occurs if Test Fails)

| Test Criterion | Specific Test | Definitions of Test Variables | Preliminary Values of Constants |
|---|---|---|---|
| 1. Change in map number | MAPNφW $\overset{?}{=}$ MAPφLD | MAPNOW = Current Map Number read from RAD each pass | — |
| | | MAPφLD = Carryover map number | |
| 1a. Change in intersection subnetwork affiliation | ISUBN $\overset{?}{=}$ O | ISUBN = Incremented for each intersection for which subnetwork affiliation has changed since last pass | — |
| 2. Change in TTU status | ITTU*IFLG(9) $\overset{?}{=}$ O | ITTU = Incremented for each TTU which has changed from operational to fail status or from fail to operational status since last pass | |
| | | IFLG(9) = Flag used to activate/inhibit TTU status criterion | IFLG(9) = 0 |
| 3. Percentage of links having significant changes in weighted volume | IVφL*100*IFLG(1) $\overset{?}{<}$ KCφNS(1) *MDATA(I,2) | IVφL = Incremented for each link having significant change in weighted volume, i.e., having absolute change in weighted volume greater than largest of XVAL(1)*PREV1(K1,1) or XVAL(2) | PVC |
| | | XVAL(1) = Fraction of previous weighted link volume to be used for threshold for establishing significant change in weighted volume | XVAL(1) = .1 |
| | | XVAL(2) = Smallest value of significant volume change threshold | XVAL(2) = 100. |
| | | PREV1(K1,1) = Previous weighted volume on link K1 | IFLG(1) = 1 |
| | | IFLG(1) = Flag used to activate/inhibit percentage volume test | KCφNS(1) = 3 |
| | | KCφNS(1) = Threshold on percentage of intersections having significant weighted volume changes above which optimization occurs | |
| | | MDATA(I,2) = Number of links in subnetwork | |
| 4. Sum of Absolute Values of changes in volume over subnetwork | XVφL(IFLG(2)<< XCφNS(1) *MDATA(I,2) | XVφL = Sum of absolute values of changes in weighted link volumes in subnetwork | |
| | | IFLG(2) = Flag used to activate/inhibit sum of weighted volume test | IFLG(2) = 1 |
| | | XCφNS(1) = Value of average change in weighted volume per link above which optimization should occur | XCφNS(1) = 300. |
| | | MDATA(I,2) = Total number of links in subnetwork, I | |
| 5. Percentage of links having significant changes in idealized offset | IφFST*100*IFLG(3) $\overset{?}{<}$ KCφNS(2)*MDATA(I,2) | IφFST = Incremented for each subnetwork link having significant change in idealized offset, i.e., having absolute change in idealized offset, greater than largest of XVAL(3)*PREVi(K1,2) or XVAL(4) | XVAL(3) = .1 |
| | | XVAL(3) = Fraction of previous idealized offset for link to be used for threshold for establishing significant change in idealized offset | XVAL(4) = 2. |

Table 4.-continued

| Test Criterion | Specific Test | Optimization Decision Criterion (Optimization Occurs if Test Fails) Definitions of Test Variables | | Preliminary Values of Constants |
|---|---|---|---|---|
| | | XVAL(4) = | Smallest value of threshold for establishing significant change in idealized offset | IFLG(3) = 1 |
| | | IFLG(3) = | Flag used to activate/inhibit idealized offset percentage test | KCφNS(2) = 3 |
| | | KCφNS(2) = | Threshold on idealized offset above which optimization occurs | |
| | | MDATA(I,2) = | Number of links in subnetwork, I | |
| 6. Sum of absolute values of changes in idealized offset over subnetwork | XφFST*IFLG(4) ? < XCφNS(2) *MDATA(I,2) | XφFST = | Sum of absolute values of changes in link idealized offsets in subnetwork | IFLAG(4) = 1 |
| | | IFLG(4) = | Flag used to activate/inhibit sum of idealized offset test | |
| | | XCφNS(2) = | Value of average change in idealized offset per link above which optimization should occur | XCφNS(2) = 10. |
| | | MDATA(I,2) = | Total number of links in subnetwork, I | |
| 7. Percentage of intersections having significant changes in splits | ISPLT*100*IFLG(5) ? < KCφNS(3) *MDATA(I,1) | ISPLT = | Incremented for each subnetwork intersection having significant split change, i.e., having absolute change in split greater than XVAL(5). | |
| | | XVAL(5) = | Threshold for establishing significant change in split | XVAL(5) = .05 |
| | | IFLG(5) = | Flag used to activate/inhibit percentage split criterion | IFLG(5) = 1. |
| | | KCφNS(3) = | Threshold on average split change above which optimization should occur | KCφNS(3) = 3 |
| | | MDATA(I,1) = | Total number of intersections in subnetwork, I | |
| 8. Sum of absolute values of changes in splits over subnetwork | XSPLT*IFLG(6) ? < XCφNS(3) *MDATA(I,1) | XSPLT = | Sum of absolute values of changes in split over subnetwork | |
| | | IFLG(6) = | Flag used to activate/inhibit sum of split change test | IFLG(6) = 1 |
| | | XCφNS(3) = | Value of average change in split per intersection above which optimization should occur | XCφNS(3) = .1 |
| | | MDATA(I,1) = | Number of intersections in subnetwork | |
| 9. Percentage of intersection having significant changes in saturation | ISAT*100*IFLG(7) ? < KCφNS(4) *MDATA(I,1) | ISAT = | Incremented for each intersection in subnetwork having significant change in saturation, i.e., having absolute change in saturation greater than XVAL(6) | |
| | | XVAL(6) = | Threshold for establishing significant change in saturation | XVAL(6) = .05 |
| | | IFLG(7) = | Flag used to activate/inhibit percentage saturation test | IFLG(7) = 1 |
| | | KCφNS(4) = | Threshold on saturation above which optimization should occur | KCφNS(4) = 3 |
| | | MDATA(I,1) = | Number of intersections in subnetwork, I | |
| 10. Sum of absolute values of changes in saturation over subnetwork | XSAT*IFLG(8) ? < XCφNS(4)*MDATA(I,i) | XSAT = | Sum of absolute values of changes in intersection saturation over subnetwork | |
| | | IFLG(8) = | Flag used to activate/inhibit saturation criterion | IFLG(8) = 1 |
| | | XCφNS(4) = | Value of average change in saturation per intersection above which optimization should occur | XCφNS(4) = .1 |
| | | MDATA(I,i) = | Number of intersections in subnetwork, I | |

Optimization Logic

This logic is the heart of the ONPOP subroutine. The logic solves for a subnetwork signal cycle and the intersection offsets such that a quadratic function which represents delay is minimized. The logic appears in FIGS. 59C–59E.

The specific function which is minimized with respect to intersection offsets is $$D = \sum_{i-1}^{\text{no. of links}} \text{Weight}_i \left\{ \frac{\text{Idealized Offset}_i}{\text{Signal Cycle}} - \left\{ \left(\begin{array}{c}\text{Offset of}\\ \text{Upstream}\\ \text{Intersection}\end{array}\right)_i - \left(\begin{array}{c}\text{Offset of}\\ \text{Downstream}\\ \text{Intersection}\end{array}\right)_i \right\} \right\}^2$$

Here, the offsets of the upstream and downstream intersections are measured relative to some arbitrary time base and are in units of fractions of a signal cycle. The link weights are the products of a link importance factor, which may be the subjective evaluation of a traffic engineer, and link volume which is obtained from surveillance data. The idealized offset for each link is roughly the travel time between the upstream and downstream intersections. The idealized offsets are calculated based upon vehicle speeds along each link. These speeds are obtained from the upstream surveillance sensors.

A predetermined range of signal cycles is tested and the upstream and downstream intersection offsets which minimize the function, D, for each signal cycle are calculated. Blocks 807*a* and 807*b* triangularize and invert a weighting matrix constructed by block 806 and determine if an error was made in the inversion. Listings 282–366, of Appendix P, correspond to block 807.

Blocks 808–818 play a series of Monte Carlo games for each signal cycle and then use a gradient search technique to determine the optimum signal offsets for minimum delay and stops. Block 808 corresponds to listings 367–375, block 809 corresponds to listings 376–400, block 810 corresponds to listings 401–413, block 811 corresponds to listings 414–425, block 812 corresponds to listings 426–431 and block 813 corresponds to listings 432–475.

Each set of cycle-offset results is put through a delay stops estimation routine shown as blocks 814–819 of FIG. 59. Block 814 corresponds to listings 476–553, block 815 corresponds to listings 554–575, block 816 corresponds to listings 576–579, block 817 corresponds to listings 580–608, and block 818 corresponds to listings 609–610. The combination of offsets and signal cycle which gives the smallest value of delay/stops is selected as the control setting for the subnetwork.

Because of the periodic nature of the function D, many minima exist for any given cycle. That is, for each specific signal cycle tested there are many values of intersection offsets which satisfy the necessary conditions for a minimum. Among these solutions are values of offsets which give a true minimum - a 'second order' minimum. The global minimum exists in a set of possible 'second order' minima.

Hence, the algorithm used in the ONPOP subroutine involves a gradient search technique which converges to the candidate 'second order' optima. The search is initiated by supplying guesses for the intersection offsets. The 'second order' minima obtained are functions of the starting point of the search. Therefore, to give all 'second order' minima an equal chance of being found, a series of Monte Carlo games are played in which random numbers are supplied for the offsets which are used to initiate the search. In one embodiment, 15 games are played for each signal cycle; nine or 10 games are usually sufficient.

Solution Evaluation Logic

Figure 59F:
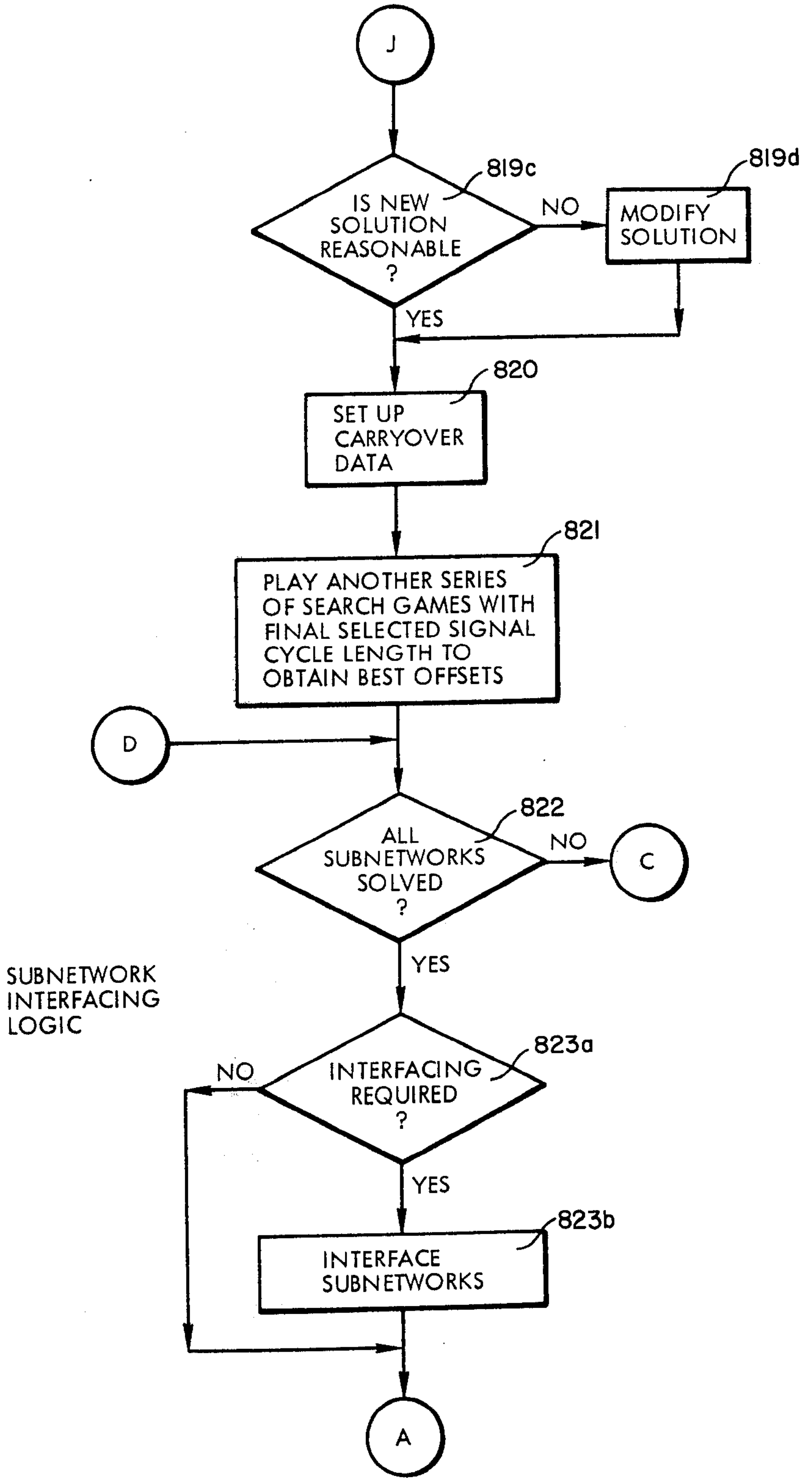

This logic is shown in blocks 819–821 of FIG. 59F. The purpose of the logic is to determine if a just calculated solution for signal cycle should be implemented or whether the current signal cycle should be retained. Thus, unnecessary changes in cycle and the costs associated with a change in cycle are avoided. Blocks 819*a* and 819*b* correspond to listings 611–670, block 820 corresponds to listings 671–681 and block 821 corresponds to blocks 682–684.

The conditions under which the new optimum is implemented are summarized in Table 5. If any of the tests shown in Table 5 are not satisfied, the new optimum is implemented. If all are satisfied, the current signal cycle is used.

Table 5.

Solution Evaluation Criterion

New optimum is implemented if any of tests fail. Otherwise current cycle is used.

| Functional Description | Specific Test |
|---|---|
| 1. New optimum is not equal to the old optimum | YI ≠ φLDφP |
| 2. Current cycle and new optimum are in the same historical cycle range | IYI – INW |
| 3. Absolute difference between new optimum and current cycle is less than 1.5 times the delta between values of signal cycle in appropriate historical signal cycle range | \|YI – CYNφW(I)\| <1.5*HSCL(I,INW+5) |
| 4. Absolute difference between old optimum and current cycle is less than 1.5 times the delta between values of signal cycle in appropriate historical signal cycle range | \|φLDφP(I) – CYNφW(I)\| <1.5*HSCL(I,INW+5) |

Block 822, corresponding to listings 685–687 determines if all the subnetworks are solved. If all the subnetworks are solved, the program continues to the subnetwork interfacing logic.

Subsetwork Interfacing Logic

This logic appears as blocks 823*a* and 823*b* in FIG. 59F and corresponds to listings 688–734. The purpose of the logic is to adjust the optimum offsets of one of two subnetworks such that the traffic flow along the links between the networks gets minimum delay. The offsets for one subnetwork are adjusted by a delta which is computed as a function of the difference between the optimum offsets and the idealized offsets on the links connecting the two subnetworks. The specific function used to calculate the delta time is $$\mathrm{DEL} = \frac{\sum_{i\ \text{interface links}} \text{Weight}_i \left\{ \text{Offset of Downstream Intersection} - \text{Offset of Upstream Intersection} - \text{Offset} \right\}_i}{\sum_{i\ \text{interface links}} \text{Weight}_i}$$

DEL is then adjusted to be modulo one signal cycle of the subnetwork having the smallest cycle and added to each of the optimum offsets of the second subnetwork.

ONPOP DATA EXCHANGE SUBROUTINE - XCHGI/XCHGO

The ONPOP Data Exchange Subroutine shown in FIG. 60 is an Assembly Language, FORTRAN compatible interface routine. It performs two primary functions; data conversion and data transfer. It is used to convert and transfer data between the real-time data base maintained by the Assembly Language foreground tasks and the FORTRAN Language, ONPOP subroutine which executes as a background task. Machine listings in assembly landuage are shown in Appendix Q.

The Data Exchange Subroutine is loaded with and is called from ONPOP. It has two entry points; XCHGI and XCHGO. A FORTRAN call to the first entry point, i.e., call XCHGI (argument list) causes data to be transferred from the real-time data base through the argument list to storage arrays defined within ONPOP. A call to the second entry point, i.e., call XCHGO (argument list) causes data generated by ONPOP to be transferred through the argument list to the real-time data base. The data is transferred item by item and is converted from partial word to word format or vice-versa as required for compatibility. All data transferred is assumed to be fixed point with data items normally expressed as franctional values scaled by a factor of 1000 and truncated to integer fixed point values prior to transfer.

Table 6 shows the argument lists and corresponding variables transferred by the data.

Table 6.

Exchange Subroutine

Entry Point – XCHGI

| Argument No. | FORTRAN Array Name | Variable Definition |
|---|---|---|
| 1 | ND1 | Average hourly volume/link |
| 2 | ND2 | Idealized offset/link |
| 3 | ND3 | Average speed/link |
| 4 | ND4 | Effective green fraction/link |
| 5 | ND5 | Percentage split/link |
| 6 | ND6* | Historical hourly volume/link |
| 7 | JD1 | Percentage north-south split/intersection |
| 8 | JD2 | Percentage saturation level/intersection |
| 9 | JD3* | TTU failures |
| 10 | LD | Current signal cycle length |

Entry Point – XCHGϕ

| Argument No. | FORTRAN Array Name | Variable Definition |
|---|---|---|
| 1 | IO | North-South green phase initiation time/intersection |
| 2 | IO (1,2) | North-South green phase termination time/intersection |
| 3 | IO (1,3) | Optimum signal cycle length/subnetwork |
| 4 | IO (1,4)* | Subnetwork affiliation/intersection |
| 5 | NϕPE** | Least squares execution/completion flag |

*No data is currently transferred for these variables.

What is claimed is:

1. An on-line, real-time traffic control apparatus for optimizing the flow of traffic between a plurality of intersections in a controlled network, said apparatus comprising:

at least one automated detector means in proximity to each of selected ones of the intersections, each of said detector means adapted to generate, in response to the proximate presence of a vehicle, an electrical signal pulse, the commencement of which indicates the commencement of the vehicle presence and the termination of which indicates the termination of the vehicle presence;

at least one signal head in proximity to each of the intersections, said signal head adapted to successively display traffic flow directing lights;

controller means adapted to control the operation of said signal heads;

electronic computer means;

means for electrical communication between said detector means and said computer means and between said computer means and said controller means, said communication means including signal processor means adapted to receive the signal pulses from a plurality of said detector means and to generate, in response to said signal pulses, an encoded binary electrical signal representing both the total number of signal pulses received by said processor means during a specified time span, and the duration of each, said total number indicative of vehicle count and each of said durations indicative of the speed of a vehicle in proximity to one of said detectors; said computer means being adapted to receive said encoded binary electrical signals from said processor means and, based thereupon, to generate necessary command electrical signals for said controller means, said command signals transmitted to said controller means through said communication means.

2. The apparatus as recited in claim 1 wherein said signal processor means is adapted to respond to signal pulse discontinuities.

3. The apparatus as recited in claim 2 wherein said discontinuities comprise signal pulse leading edges.

4. The apparatus as recited in claim 2 wherein said discontinuities comprise signal pulse trailing edges.

5. The apparatus as recited in claim 1, wherein said electronic computer means comprises:

a. foreground computation means adapted to receive said encoded binary electrical signals from said processor means and, based thereupon, to generate necessary command electrical signals for said controllers, said command signals transmitted to said controllers through said communication means, b. background computation means in mutual electrical data signal communication with said foreground means, said background means adapted, in response to data from said foreground means, to generate a plurality of electrical data signals together representing an optimized pattern of commands for those of said controllers which control the operation of those said signal heads in proximity with said selected ones of the intersections, and c. executive operational means adapted to schedule the operation and the mutual interaction of said foreground means and background means.

6. The apparatus as recited in claim 5, wherein said executive operational means comprises:

electronic computer means for clocking an interval of time known as an execution cycle, which is defined as the sum of time allotted for completion of all foreground programs:

electronic computer means for generating a program interrupt at the completion of an execution cycle;

electronic computer means in response to said program interrupt for:

stopping execution of a background program so as to perserve the background program environment, and executing the next and succeeding foreground programs in queue;

electronic computer means for reactivating the interrupted background program and executing the next background program in queue at the completion of execution of all foreground programs; and electronic computer means for cyclically repeating above.

7. The apparatus as recited in claim 5, wherein said foreground computation means includes apparatus for converting, in real time, speed and count data into relevant traffic parameters comprising:

electronic computer means for constructing and updating a vehicle position/speed/direction matrix;

electronic computer means for propagating vehicle counts at the measured speeds through a representation of a system of streets comprising the traffic control network; and electronic computer means for calculating link input and output volume, number of stops, stop delay time, queue length, and travel time.

8. The apparatus as recited in claim 7, wherein said means for constructing and updating said vehicle position/speed/direction matrix comprises:

electronic computer means for constructing each column of said matrix to correspond to one-directional links within said network;

electronic computer means for constructing the row elements of a specific column to correspond to fixed travel time units along said link; and electronic computer means for defining surveillance pointers corresponding to specific ingress or egress points along the link with respect to matrix elements where count data is to be entered, summed, modified or deleted.

9. The apparatus as recited in claim 8, wherein said means for propagating vehicle counts at the measured speeds through a representation of a system of streets comprising the traffic control network comprises:

electronic computer means for adjusting the relative positions of said surveillance pointers with respect to said matrix elements in unit travel time increments to account for variation in speed between surveillance points; and electronic computer means for decrementing the starting row number in a circular fashion for a preselected group of rows and columns within said matrix as each unit travel time elapses to advance unimpeded traffic forward in time and distance.

10. The apparatus as recited in claim 9, wherein said means for calculating link input and output volume, number of stops, stop delay time, queue length and travel time comprises:

electronic computer means for defining a set of surveillance pointers for each link;

electronic computer means for summing and differencing input and output counts in each propagation time interval;

electronic computer means for computing stops and delays from propagated vehicle counts and current signal light status;

electronic computer means for computing queue length from said input and output count difference; and electronic computer means for summing said queue length each propagation time interval to determine travel time.

11. The apparatus as recited in claim 7, further including:

electronic computer means for computing signal phase termination times for minor intersections, said minor intersections located between major intersections and having minimal instrumentation using a pressure function.

12. The apparatus as recited in claim 7, further including:

electronic computer means for computing additional required measures of effectiveness from a basic set of surveillance parameters;

electronic computer means for arranging said set of surveillance parameters in summary tables; and electronic computer means for normalizing surveillance count data by differencing and zeroing to prevent storage cell overflow.

13. The apparatus as recited in claim 5, wherein said foreground computation means includes apparatus for optimally calculating and implementing splits at each intersection on a cycle-by-cycle basis within the constraint of maintaining the network progression comprising:

electronic computer means for calculating the required effective green time for each signalized approach;

electronic computer means for computing a first difference between the network cycle length and the maximum sum of green time required for each street at an intersection;

electronic computer means for apportioning said first difference between each street based on the ratio of effective green times between any adjacent streets in said intersection;

electronic computer means for calculating a new split based on said apportionment of total green time per street; and electronic computer means for optimally implementing the difference between the new split and the old split for each signalized approach.

14. The apparatus as recited in claim 13, wherein the means for calculating the required effective green time for each signalized approach comprises:

electronic computer means for averaging the traffic volume over n cycles through each signalized approach to an intersection, whether left turn or straight through;

electronic computer means for calculating the effective green time required to service the average volume in accordance with the following formula:

$t_G = V \cdot H_D/n$ where $t_G$ is the effective green time

V is the average volume $H_D$ is the discharge headway per lane and $n$ is the number of lanes per signalized approach; and electronic computer means for performing the first two steps for each signalized approach at said intersection.

15. The apparatus as recited in claim 13, wherein the means for computing a first difference between the network cycle length and the maximum sum of green time required for each street and intersection comprises:

electronic computer means for summing the green times per conflicting signal movements on each street;

electronic computer means for summing the maximum green time for each street based on said sums of the green times per conflicting signal movements; and electronic computer means for computing said first difference between the network cycle length and said sum of maximum green times for each street.

16. The apparatus as recited in claim 15, wherein the means for apportioning said first difference between each street based on the ratio of effective green times between any adjacent streets in said intersection comprises:

electronic computer means for calculating the ratio of effective green time per street by dividing said sum of green times per conflicting signal movements by said sum of the maximum green times for each street;

electronic computer means for calculating the split per street as follows:

multiplying said ratio of effective green times per street by said first difference;

adding said sum of the green time per conflicting signal movement; and electronic computer means for repeating the above two steps for each street in said intersection.

17. The apparatus as recited in claim 16, further including:

electronic computer means for comparing said new split with a preselected minimum value; and electronic computer means for adjusting said new split to be equal to said minimum value if said new split is less than said minimum value.

18. The apparatus as recited in claim 5, wherein said background computation means includes apparatus for calculating optimum traffic signal settings for a traffic control network, in real time, including breaking down said network into subnetworks, optimizing each subnetwork, and interfacing each subnetwork wherein the means for optimizing each subnetwork comprises:

electronic computer means for selecting a signal cycle range;

electronic computer means for determining whether or not to reoptimize;

electronic computer means for playing a series of Monte Carlo games for each signal cycle and using a gradient search technique to determine the optimum signal offsets for minimum delay and stops; and electronic computer means for determining the optimum signal cycle and corresponding offsets.

19. The apparatus as recited in claim 18, wherein said background computation means further includes:

electronic computer means for constructing a link weighting matrix, and electronic computer means for triangularizing and inverting said weighting matrix.

20. The apparatus as recited in claim 18, wherein said apparatus is adapted to minimize the following function with respect to intersection offsets:

$$D = \sum_{i-i}^{\text{no. of links}} \text{Weight}_i \left\{ \frac{\text{Idealized Offset}_i -}{\text{Signal cycle}} - \left\{ \left( \begin{matrix}\text{Offset of}\\ \text{Upstream}\\ \text{Intersection}\end{matrix} \right)_i \left( \begin{matrix}\text{Offset of}\\ \text{Downstream}\\ \text{Intersection}\end{matrix} \right) \right\}^2 \right\}_i .$$

21. The apparatus as recited in claim 18, wherein said apparatus is adapted to employ the following function to calculate delay time:

$$\Sigma_i \quad \text{Weight}_i \left\{ \begin{matrix}\text{Offset of}\\ \text{Downstream}\\ \text{Intersection}\end{matrix} - \begin{matrix}\text{Offset of}\\ \text{Upstream}\\ \text{Intersection}\end{matrix} - \begin{matrix}\text{Idealized}\\ \text{Offset}\end{matrix} \right\}_i$$

$$\text{DEL} = \frac{\text{interface links}}{\sum \text{Weight}_i \text{ interface links.}}$$

* * * * *